United States Patent
Shibasaki et al.

(10) Patent No.: US 7,686,516 B2
(45) Date of Patent: Mar. 30, 2010

(54) ROLLING BEARING UNIT WITH LOAD MEASURING UNIT

(75) Inventors: Kenichi Shibasaki, Kanagawa (JP); Koichiro Ono, Kanagawa (JP); Kinji Yukawa, Kanagawa (JP); Mamoru Aoki, Kanagawa (JP); Junji Ono, Kanagawa (JP); Taketoshi Chifu, Kanagawa (JP)

(73) Assignee: NSK Ltd., Tokyo (JP)

( * ) Notice: Subject to any disclaimer, the term of this patent is extended or adjusted under 35 U.S.C. 154(b) by 665 days.

(21) Appl. No.: 11/597,567

(22) PCT Filed: May 12, 2005

(86) PCT No.: PCT/JP2005/009106

§ 371 (c)(1),
(2), (4) Date: Nov. 27, 2006

(87) PCT Pub. No.: WO2005/116602

PCT Pub. Date: Dec. 8, 2005

(65) Prior Publication Data

US 2008/0075399 A1    Mar. 27, 2008

(30) Foreign Application Priority Data

| May 26, 2004 | (JP) | ............................. 2004-156014 |
| Aug. 6, 2004 | (JP) | ............................. 2004-231369 |
| Sep. 27, 2004 | (JP) | ............................. 2004-279155 |

(51) Int. Cl.
*F16C 32/00* (2006.01)
(52) U.S. Cl. .................. 384/448; 324/207.25
(58) Field of Classification Search ............... 384/448, 384/544, 589; 324/173, 174, 207.25; 73/514.39
See application file for complete search history.

(56) References Cited

U.S. PATENT DOCUMENTS

| 5,596,189 A | 1/1997 | Orton |
| 5,967,669 A * | 10/1999 | Ouchi ........................ 384/448 |
| 6,619,849 B2 * | 9/2003 | Katano ........................ 384/448 |

(Continued)

FOREIGN PATENT DOCUMENTS

DE    28 10 787 A1    9/1978

(Continued)

OTHER PUBLICATIONS

Patent Abstracts of Japan, 2003, No. 12, Dec. 5, 2003 & JP 2004 077159 A (Koyo Seiko Co., Ltd.), Mar. 11, 2004.

*Primary Examiner*—Thomas R Hannon
(74) *Attorney, Agent, or Firm*—Sughrue Mion, PLLC

(57) ABSTRACT

An encoder 12 a characteristic of which is changed alternately at an equal interval in a circumferential direction is supported/fixed onto a hub 4 concentrically with the hub 4. A sensing portion of a sensor 13 supported on the outer ring 3 is positioned in close vicinity to a sensed surface of the encoder 12 to face thereto. Width dimensions of first and second sensed portions provided onto the sensed surface are changed continuously in a direction along which a to-be-sensed load is applied. Since a pattern according to which an output signal of the sensor 13 is changed is changed pursuant to a change of the load, the load is derived by observing this pattern. The output signal is also utilized to sense a rotation speed of the hub 4 in ABS or TCS control.

20 Claims, 30 Drawing Sheets

U.S. PATENT DOCUMENTS

| | | | |
|---|---|---|---|
| 6,956,367 B2 * | 10/2005 | Fujikawa et al. | 324/207.22 |
| 7,501,811 B2 * | 3/2009 | Ono | 324/207.25 |
| 2004/0056184 A1 | 3/2004 | Steinlechner et al. | |

FOREIGN PATENT DOCUMENTS

| | | |
|---|---|---|
| DE | 42 31 332 A1 | 4/1993 |
| JP | 62-3365 B2 | 1/1987 |
| JP | 3-209016 A | 9/1991 |
| JP | 2001-21577 A | 1/2001 |
| JP | 2004-3918 A | 1/2004 |

* cited by examiner

FIG. 12 (A)
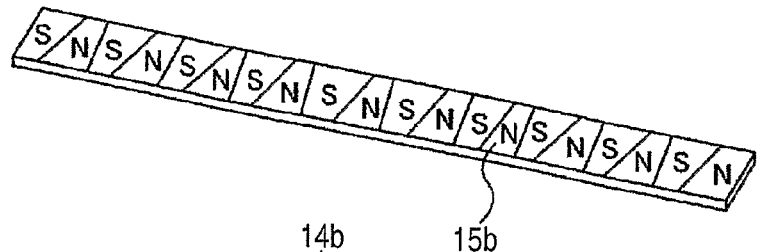
FIG. 12 (B)
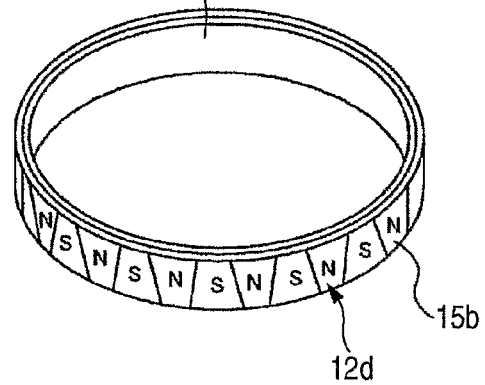
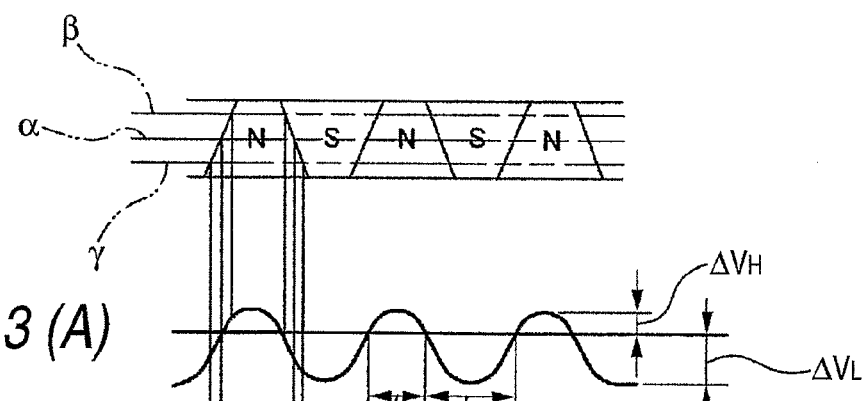
FIG. 13 (A)
FIG. 13 (B)
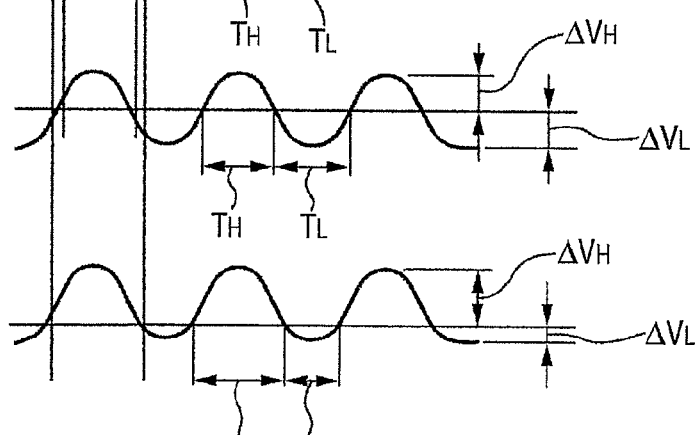
FIG. 13 (C)

NEUTRAL DISPLACEMENT

PULSE IN NEUTRAL

DUTY RATIO = 50%

PULSE IN DISPLACEMENT

DUTY RATIO = 45%

NEUTRAL DISPLACEMENT

PULSE IN NEUTRAL

DUTY RATIO = 50%

PULSE IN DISPLACEMENT

DUTY RATIO = 45%

⇒ : LOAD APPLIED FROM ROAD SURFACE TO INNER SIDE OF CAR BODY

⇐ : LOAD APPLIED FROM ROAD SURFACE TO OUTER SIDE OF CAR BODY

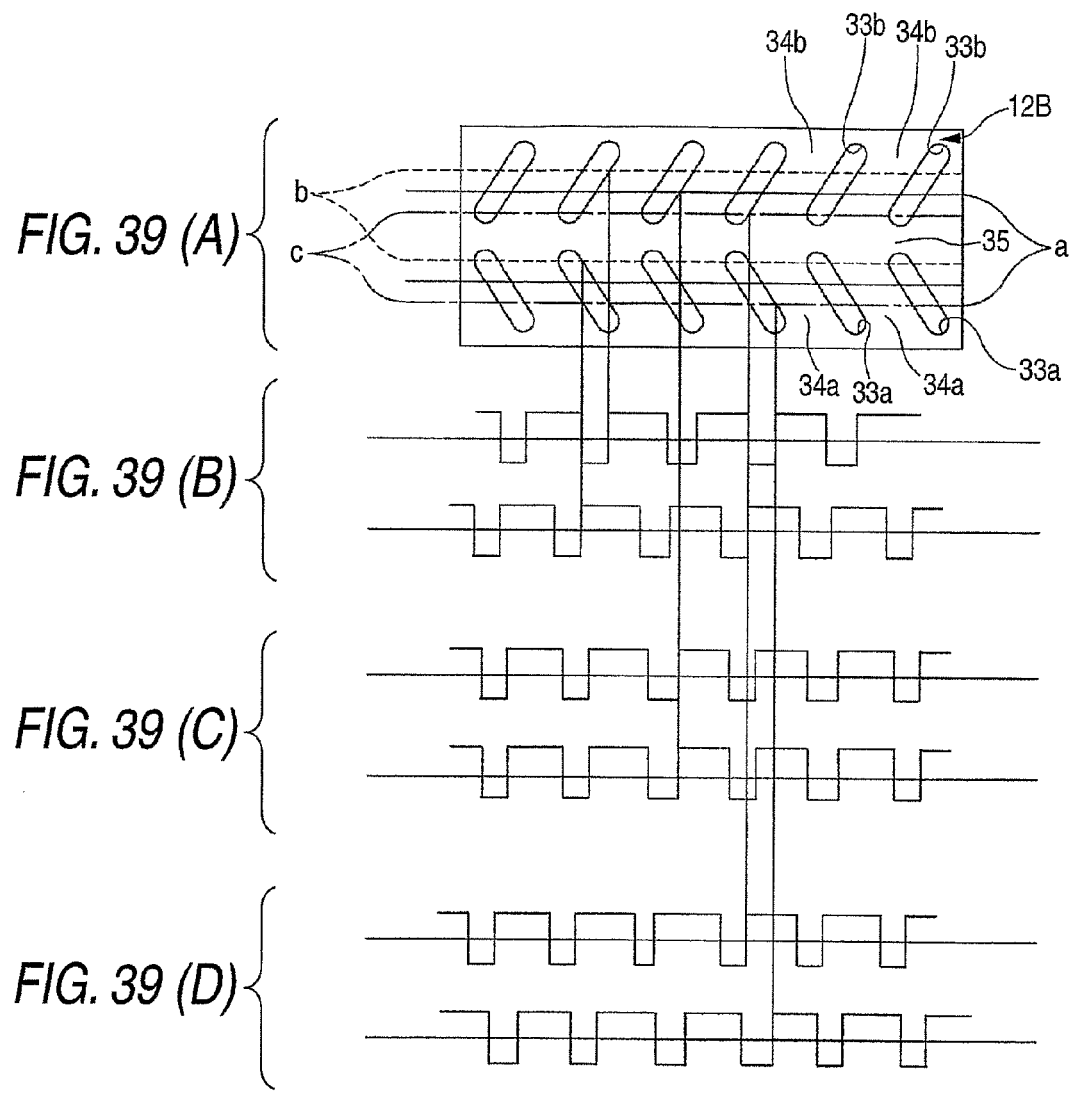

ROLLING BEARING UNIT WITH LOAD MEASURING UNIT

TECHNICAL FIELD

A rolling bearing unit with a load measuring unit according to the present invention is utilized to bear rotatably an axle of a vehicle (car) on a suspension system, and also secure the stable running of the vehicle by measuring a magnitude of a load, for example. Also, this rolling bearing unit with the load measuring unit according to the present invention is built in the rolling bearing unit that bears the spindle of various machine tools, and also is utilized to control appropriately a feed speed of a tool, or the like by measuring the load applied to this spindle.

BACKGROUND ART

For instance, the rolling bearing unit is used to bear rotatably the wheel of the vehicle on the suspension system. Also, the running condition stabilizing system of the vehicle such as the antilock brake system (ABS), the traction control system (TCS), or the like is widely used to secure the running stability of the vehicle. According to the running condition stabilizing system such as ABS, TCS, or the like, the running condition of the vehicle can be stabilized in the braking or accelerating operation. However, in order to secure the stability under more severe conditions, the brake and the engine must be controlled by adopting a greater amount of information that have an influence on the running stability of the vehicle.

In other words, in the case of the running condition stabilizing system such as ABS, TCS, or the like in the related art, because the brake or the engine is controlled by sensing the slip between the tire and the road surface, i.e., the so-called feedback control is employed, control of the brake or the engine is delayed even for a minute. In other words, the so-called feedforward control can prevent neither the generation of the slip between the tire and the road surface nor the so-called one-sided activation of the brake, i.e., the braking force is extremely different between the right and left wheels, to attain improvement of the performance under the severe conditions. In addition, such control cannot prevent the situation that the running stability of the truck, or the like is degraded owing to on the bad loading condition.

In order to handle such problems, it may be considered that the load measuring unit, which measures one or both of the radial load and the axial load applied to the wheel, should be built in the rolling bearing unit, which bears the wheel on the suspension system, to execute the above feedforward control, or the like. As the wheel supporting rolling bearing unit with the load measuring unit that is available in such case, the units set forth in JP-A-2001-21577 (hereinafter referred as Patent Literature 1, JP-A-3-209016 (hereinafter referred as Patent Literature 2, JP-A-2004-3918 (hereinafter referred as Patent Literature 3, JP-B-62-3365 (hereinafter referred as Patent Literature 4 are known in the related art.

In Patent Literature 1 out of them, the rolling bearing unit with the load measuring unit that can measure the radial load is set forth. In the case of this first example of the related-art units, radial displacements of the stationary outer ring and the hub both being rotated on the inner diameter side of the outer ring are measured by the non-contact type displacement sensor, and thus the radial load applied between the outer ring and the hub is sensed. The sensed radial load is utilized to inform the driver of the bad loading condition as well as to control appropriately the ABS.

Also, in Patent Literature 2, the structure for measuring the axial load applied to the rolling bearing unit is set forth. In the case of the second example of the related-art units set forth in Patent Literature 2, the load sensor is attached to a plurality of locations of the inner surface of the stationary-side flange provided onto the outer peripheral surface of the outer ring, which surround the threaded holes into the bolts are screwed to couple the stationary-side flange to the knuckle, respectively. These load sensors are put between the outer side surface of the knuckle and the inner side surface of the stationary-side flange in a state that the outer ring is supported/fixed onto the knuckle. In the case of the load measuring unit built in the rolling bearing unit in the second example of the related-art units, the axial load applied between the wheel and the knuckle is measured by the load sensors.

Also, in Patent Literature 3, such a structure is set forth that the displacement sensors affixed to four locations of the outer ring in the circumferential direction and the sensed ring having the L-shaped cross section and fitted/fixed onto the hub are provided, and then the displacement of the hub with respect to the outer ring is sensed in the radial direction and the thrust direction at four locations to sense the direction of the load applied to the hub and its magnitude based on the sensed values at respective portions.

In addition, in Patent Literature 4, such a method is set forth that the strain gauge for sensing a dynamic distortion is provided to the outer ring equivalent member a part of rigidity of which is lowered, then the revolution speed of the rolling elements is calculated from the passing frequency of the rolling elements sensed by the strain gauge, and then the axial load applied to the rolling bearing is measured based on the revolution speed.

In the case of the first example of the related-art structure set forth in above Patent Literature 1, the load applied to the rolling bearing unit is measured by measuring the radial displacement of the outer ring and the hub by using the displacement sensor. In this event, because an amount of radial displacement is minute, the high-precision sensor must be employed as the displacement sensor to measure the load with good precision. Since the high-precision non-contact type sensor is expensive, an increase in cost as the overall rolling bearing unit with the load measuring unit is inevitable.

Also, in the case of the second example of the related-art structures set forth in Patent Literature 2, the load sensors must be provided as many as the bolts that support/fix the outer ring onto the knuckle. For this reason, not only the load sensor itself is expensive but also a considerable increase in cost as the overall rolling bearing unit with the load measuring unit is inevitable. Also, in the structure set forth in Patent Literature 3, a cost is further increased rather than the structure set forth in Patent Literature 1 since the sensor is provided to four locations of the outer ring in the circumferential direction. In addition, in the method set forth in Patent Literature 4, it is possible that it becomes difficult to ensure the durability of the outer ring equivalent member since a part of rigidity of the outer ring equivalent member must be lowered.

Also, in the structure or the method set forth in any of Patent Literatures 1 to 4, the dedicated mechanism is provided to measure the load applied to the rolling bearing unit. Therefore, increases in cost and weight are inevitable.

Further, in JP-A-2004-77159 (hereinafter referred as Patent Literature 5), as the technology in connection with the present invention, the structure for sensing the run-out of the inner ring that supports the encoder by using the encoder, on the sensed surface of which the N pole and the S pole are aligned alternately, is set forth. In this event, in above Patent Literature 5, the technology to measure the load applied to the rolling bearing unit by utilizing the encoder is not described even though the description of the suggestion regarding to such technology is considered together.

DISCLOSURE OF THE INVENTION

An object of the present invention is to provide a rolling bearing unit with a load measuring unit, which can be constructed in small size and light weight and can measure a load applied to the rolling bearing unit.

A rolling bearing unit with a load measuring unit according to a first aspect of the present invention, comprises a rolling bearing unit, and a load measuring unit.

The rolling bearing unit includes a stationary side raceway ring not rotated in a state of use, a rotary side raceway ring rotated in a state of use, and a plurality of rolling elements provided between a stationary side raceway and a rotary side raceway, which exist on mutually opposing peripheral surfaces of the stationary side raceway ring and the rotary side raceway ring.

Also, the load measuring unit includes an encoder which is supported on a part of the rotary side raceway ring concentrically with the rotary side raceway ring and a characteristic of a sensed surface of which is changed alternately along a circumferential direction, a sensor which is supported on a non-rotated portion (for example, the stationary side raceway ring or a part of a suspension system or a housing onto which the stationary side raceway ring is supported/fixed) in a state that a sensing portion is opposed to the sensed surface and an output signal of which is changed in response to a change in characteristic of the sensed surface, and an arithmetic unit for calculating a load applied between the stationary side raceway ring and the rotary side raceway ring based on the output signal.

Also, a pitch or phase through which the characteristic of the sensed surface is changed along the circumferential direction is changed continuously in response to an acting direction of a to-be-sensed load.

Also, the arithmetic unit has a function of calculating the load based on a pattern according to which the output signal of the sensor is changed.

The rolling bearing unit with the load measuring unit of the present invention constructed as above operates as follows to measure the load acting between the stationary side raceway ring and the rotary side raceway ring. First, when the load is applied between both raceway rings, these raceway rings are relatively displaced by elastic deformations of the stationary side raceway ring and the rotary side raceway ring and respective rolling elements. As a result, the positional relationship between the sensed surface of the encoder supported on the rotary side raceway ring and the sensing portion of the sensor supported on a part of the stationary side raceway ring or the suspension system is changed.

The pitch or the phase through which the characteristic of the sensed surface of the encoder is changed in the circumferential direction is changed continuously along the acting direction of the sensed load. Therefore, when both raceway rings are relatively displaced based on this load, the pattern (the period or magnitude or phase of change) according to which the output signal of the sensor is changed pursuant to the rotation of the rotary side raceway ring is changed. Since there is a correlation between an extent of this change in this pattern and the magnitude of the load, the magnitude of the load can be derived based on this pattern.

The combination of the encoder and the sensor is needed to execute the ABS or TCS control or to sense the rotation speed of the rotary side raceway ring (when such combination is applied to the wheel supporting rolling bearing unit). Also, such combination is needed to sense the rotation speed of the spindle when such combination is applied to the machine tool. The rolling bearing unit with the load measuring unit of the present invention can be constructed to sense the above load by devising the structure required to sense such rotation speed, and thus the necessity of building the new parts in the rolling bearing unit portion can be eliminated. For this reason, the structure used to measure the load applied to this rolling bearing unit can be constructed in small size and light weight.

According a second aspect of the present invention, in the rolling bearing unit with a load measuring unit of first aspect, the to-be-sensed load is a radial load that acts between the stationary side raceway ring and the rotary side raceway ring in a radial direction, the sensed surface includes a side surface of the encoder in an axial direction, a first sensed portion and a second sensed portion having different characteristics mutually are aligned alternately on the sensed surface at an equal interval in the circumferential direction, and a width of the first sensed portion out of widths of both sensed portions in the circumferential direction is widened toward an outer side in the radial direction and a width of the second sensed portion is widened toward an inner side in the radial direction.

According a third aspect of the present invention, in the rolling bearing unit with a load measuring unit of first aspect, the to-be-sensed load is a radial load that acts between the stationary side raceway ring and the rotary side raceway ring in a radial direction, the sensed surface includes a side surface of the encoder in an axial direction, a first sensed portion and a second sensed portion having a different characteristic mutually are aligned alternately on the sensed surface at an equal interval in the circumferential direction, a boundary between the first sensed portion and the second sensed portion is inclined to a diameter direction of the encoder and also an inclined direction of the boundary to the diameter direction is set in an opposite direction with respect to a middle portion of the encoder in the diameter direction mutually, and sensing portions of a pair of sensors provided to positions separated in the diameter direction of the encoder to put the middle portion in the diameter direction therebetween are opposed to the sensed surface of the encoder.

According a fourth aspect of the present invention, in the rolling bearing unit with a load measuring unit of second or third aspect, the encoder is made of a permanent magnet, and one sensed portion out of the first sensed portion and the second sensed portion is an N pole and other sensed portion is an S pole.

According a fifth aspect of the present invention, in the rolling bearing unit with a load measuring unit of second or third aspect, one sensed portion out of the first sensed portion and the second sensed portion is a through hole or a concave hole, and other sensed portion is an interim portion located between neighboring through holes or concave holes in the circumferential direction.

According a sixth aspect of the present invention, in the rolling bearing unit with a load measuring unit of second or third aspect, one sensed portion out of the first sensed portion and the second sensed portion is a convex portion, and other sensed portion is a concave portion located between neighboring convex portions in the circumferential direction.

According a seventh aspect of the present invention, in the rolling bearing unit with a load measuring unit of fifth or sixth aspect, the encoder is made of magnetic material, the sensor changes an output signal in response to a change in magnetic characteristic of the sensed surface of the encoder, and an unchanged portion in which a pitch of the first sensed portion or the second sensed portion in a rotating direction is not changed in the radial direction is provided on both end portions of the encoder in the radial direction.

According an eighth aspect of the present invention, in the rolling bearing unit with a load measuring unit of first aspect, the to-be-sensed load is a radial load that acts between the stationary side raceway ring and the rotary side raceway ring in a radial direction, the sensed surface includes a side surface of the encoder in an axial direction, a plurality of sensed combination portions each including a pair of individualized portions having a characteristic different from other portions are aligned on the sensed surface at an equal interval in the circumferential direction, and an interval between the pair of individualized portions constituting the sensed combination portions in the circumferential direction is changed continuously over all sensed combination portions in a same direction of the radial direction.

According a ninth aspect of the present invention, in the rolling bearing unit with a load measuring unit of first aspect, the to-be-sensed load is an axial load that acts between the stationary side raceway ring and the rotary side raceway ring in an axial direction, the sensed surface includes a peripheral surface of the encoder, a first sensed portion and a second sensed portion having different characteristics mutually are aligned alternately on the sensed surface at an equal interval in the circumferential direction, and a width of the first sensed portion out of widths of both sensed portions in the circumferential direction is widened toward one end side in the axial direction and a width of the second sensed portion is widened toward other end side in the axial direction.

According a tenth aspect of the present invention, in the rolling bearing unit with a load measuring unit of first aspect, the to-be-sensed load is an axial load that acts between the stationary side raceway ring and the rotary side raceway ring in an axial direction, the sensed surface includes a peripheral surface of the encoder, a first sensed portion and a second sensed portion having different characteristics mutually are aligned alternately on the sensed surface at an equal interval in the circumferential direction, a boundary between the first sensed portion and the second sensed portion is inclined to an axial direction of the encoder and also an inclined direction of the boundary to the axial direction is set in an opposite direction with respect to a middle portion of the encoder in the axial direction mutually, and sensing portions of a pair of sensors provided to positions separated in the diameter direction of the encoder to put the middle portion in the axial direction therebetween are opposed to the sensed surface of the encoder.

According an eleventh aspect of the present invention, in the rolling bearing unit with a load measuring unit of ninth or tenth aspect, the encoder is made of a permanent magnet, and the first sensed portion is an N pole and the second sensed portion is an S pole.

According a twelfth aspect of the present invention, in the rolling bearing unit with a load measuring unit of ninth or tenth aspect, the first sensed portion is a through hole or a concave hole, and the second sensed portion is an interim portion located between neighboring through holes or concave holes in the circumferential direction.

According a thirteenth aspect of the present invention, in the rolling bearing unit with a load measuring unit of ninth or tenth aspect, the first sensed portion is a convex portion, and the second sensed portion is a concave portion located between neighboring convex portions in the circumferential direction.

According a fourteen aspect of the present invention, in the rolling bearing unit with a load measuring unit of twelfth or thirteenth aspect, the encoder is made of magnetic material, the sensor changes an output signal in response to a change in magnetic characteristic of the sensed surface of the encoder, and an unchanged portion in which a pitch of the first sensed portion or the second sensed portion in a rotating direction is not changed in the axial direction is provided on both end portions of the encoder in the axial direction.

According a fifteenth aspect of the present invention, in the rolling bearing unit with a load measuring unit of first aspect, the to-be-sensed load is an axial load that acts between the stationary side raceway ring and the rotary side raceway ring in an axial direction, the sensed surface includes a peripheral surface of the encoder, a plurality of sensed combination portions each including a pair of individualized portions having a characteristic different from other portions are aligned on the sensed surface at an equal interval in the circumferential direction, and an interval between the pair of individualized portions constituting the sensed combination portions in the circumferential direction is changed continuously over all sensed combination portions in a same direction of the axial direction.

According a sixteenth aspect of the present invention, in the rolling bearing unit with a load measuring unit of any one of first to fifteenth aspects, the sensing portions of the sensors oppose to three different positions or more of the sensed surface of the encoder in the circumferential direction respectively, and the arithmetic unit has a function of calculating a momental load applied between the stationary side raceway ring and the rotary side raceway ring by comparing output signals of the sensors mutually.

According a seventeenth aspect of the present invention, in the rolling bearing unit with a load measuring unit of sixteenth aspect, the sensed surface of the encoder includes the peripheral surface of the encoder, and the sensing portions of respective sensors oppose to equally-spaced positions of the peripheral surface of the encoder along the circumferential direction.

According an eighteenth aspect of the present invention, in the rolling bearing unit with a load measuring unit of sixteenth aspect, the sensed surface of the encoder includes the side surface of the encoder in the axial direction, and the sensing portions of respective sensors oppose to equally-spaced positions of the side surface of the encoder in the axial direction along the circumferential direction.

According a nineteenth aspect of the present invention, in the rolling bearing unit with a load measuring unit of any one of first to eighteenth aspects, the rolling bearing unit is a wheel supporting rolling bearing unit, the stationary side raceway ring is supported/fixed onto a suspension system in a state of use, and the rotary side raceway ring supports/fixes a wheel and rotates together with the wheel.

According a twentieth aspect of the present invention, in the rolling bearing unit with a load measuring unit of any one of first to eighteenth aspects, the rolling bearing unit supports rotatably a spindle of a machine tool onto a housing, an outer ring as the stationary side raceway ring is fitted/fixed into the housing or a portion fixed to the housing in a state of use, and an inner ring as the rotary side raceway ring is fitted/fixed onto the spindle or a portion that rotates together with the spindle.

According a twenty-first aspect of the present invention, in the rolling bearing unit with a load measuring unit of first aspect, the rolling bearing unit is a wheel supporting rolling bearing unit, an outer ring as the stationary side raceway ring is supported/fixed onto a suspension system in a state of use, and a hub as the rotary side raceway ring supports/fixes a wheel and rotates together with the wheel, rolling elements are provided between double row outer ring raceways, which are located on an inner peripheral surface of the outer ring and serve as the stationary side raceway respectively, and double row inner ring raceways, which are located on an outer peripheral surface of the hub and serve as the rotary side raceway respectively, in plural every row, a flange for supporting/fixing the wheel is provided to an outer end portion of the hub in the axial direction, an encoder on the outer peripheral surface as the sensed surface of which concave portions and convex portions are aligned alternately is fixed onto an inner end portion of the hub in the axial direction or a portion located between the double row inner ring raceways, the to-be-sensed load is an axial load that acts between the outer ring and the hub in an axial direction, the sensing portion of the sensor is opposed to an upper portion of the sensed surface that exists on an outer peripheral surface of the encoder in a radial direction, and a width of the concave portions out of the concave portions and the convex portions formed on the sensed surface of the encoder in the circumferential direction is widened on an inner end side in the axial direction and narrowed on an outer end side in the axial direction.

According a twenty-second aspect of the present invention, in the rolling bearing unit with a load measuring unit of first aspect, the rolling bearing unit is a wheel supporting rolling bearing unit, an outer ring as the stationary side raceway ring is supported/fixed onto a suspension system in a state of use, and a hub as the rotary side raceway ring supports/fixes a wheel and rotates together with the wheel, rolling elements are provided between double row outer ring raceways, which are located on an inner peripheral surface of the outer ring and serve as the stationary side raceway respectively, and double row inner ring raceways, which are located on an outer peripheral surface of the hub and serve as the rotary side raceway respectively, in plural every row, a flange for supporting/fixing the wheel is provided to an outer end portion of the hub in the axial direction, an encoder on the outer peripheral surface as the sensed surface of which concave portions and convex portions are aligned alternately is fixed onto an inner end portion of the hub in the axial direction or a portion located between the double row inner ring raceways, the to-be-sensed load is an axial load that acts between the outer ring and the hub in an axial direction, the sensing portion of the sensor is opposed to a lower portion of the sensed surface that exists on an outer peripheral surface of the encoder in a radial direction, and a width of the concave portions out of the concave portions and the convex portions formed on the sensed surface of the encoder in the circumferential direction is widened on an outer end side in the axial direction and narrowed on an inner end side in the axial direction.

According a twenty-third aspect of the present invention, in the rolling bearing unit with a load measuring unit of first aspect, the rolling bearing unit is a wheel supporting rolling bearing unit, an outer ring as the stationary side raceway ring is supported/fixed onto a suspension system in a state of use, and a hub as the rotary side raceway ring supports/fixes a wheel and rotates together with the wheel, rolling elements are provided between double row outer ring raceways, which are located on an inner peripheral surface of the outer ring and serve as the stationary side raceway respectively, and double row inner ring raceways, which are located on an outer peripheral surface of the hub and serve as the rotary side raceway respectively, in plural every row, a flange for supporting/fixing the wheel is provided to an outer end portion of the hub in the axial direction, an encoder on the inner side surface in the axial direction as the sensed surface of which concave portions and convex portions are aligned alternately is fixed onto an inner end portion of the hub in the axial direction, the to-be-sensed load is an axial load that acts between the outer ring and the hub in an axial direction, the sensing portion of the sensor is opposed to an upper portion of the sensed surface that exists on an inner side surface of the encoder in an axial direction, and a width of the concave portions out of the concave portions and the convex portions formed on the sensed surface of the encoder in the circumferential direction is widened on an outer end side in the radial direction and narrowed on an inner end side in the radial direction.

According a twenty-fourth aspect of the present invention, in the rolling bearing unit with a load measuring unit of first aspect, wherein the rolling bearing unit is a wheel supporting rolling bearing unit, an outer ring as the stationary side raceway ring is supported/fixed onto a suspension system in a state of use, and a hub as the rotary side raceway ring supports/fixes a wheel and rotates together with the wheel, rolling elements are provided between double row outer ring raceways, which are located on an inner peripheral surface of the outer ring and serve as the stationary side raceway respectively, and double row inner ring raceways, which are located on an outer peripheral surface of the hub and serve as the rotary side raceway respectively, in plural every row, a flange for supporting/fixing the wheel is provided to an outer end portion of the hub in the axial direction, an encoder on the inner side surface in the axial direction as the sensed surface of which concave portions and convex portions are aligned alternately is fixed onto an inner end portion of the hub in the axial direction, the to-be-sensed load is an axial load that acts between the outer ring and the hub in an axial direction, the sensing portion of the sensor is opposed to a lower portion of the sensed surface that exists on an inner side surface of the encoder in an axial direction, and a width of the concave portions out of the concave portions and the convex portions formed on the sensed surface of the encoder in the circumferential direction is widened on an inner end side in the radial direction and narrowed on an outer end side in the radial direction.

Upon embodying the present invention, for example, as set forth in the second or third aspect, the to-be-sensed load is a radial load that acts between the stationary side raceway ring and the rotary side raceway ring in a radial direction.

In this case, the sensed surface is composed of a side surface of the encoder in an axial direction, and a first sensed portion and a second sensed portion having different characteristics mutually are aligned alternately on the sensed surface at an equal interval in the circumferential direction, Then, in the case of the invention set forth in the second aspect, a width of the first sensed portion out of widths of both sensed portions in the circumferential direction is widened toward an outer side in the radial direction and a width of the second sensed portion is widened toward an inner side in the radial direction.

In case such structure is employed, when the central axis of the rotary side raceway ring is deviated from the central axis of the stationary side raceway ring pursuant to a variation of the radial load, a radial position of the portion, to which the sensing portion of the sensor is opposed, of the sensed surface is changed. Then, when the radial position of the portion, to which the sensing portion of the sensor is opposed, of the sensed surface is changed pursuant to the variation of the radial load, a circumferential length of one sensed portion out of the first and second sensed portions, to which the sensing portion is opposed, is lengthened and also a circumferential length of the other sensed portion is shortened. Also, a period according to which the output signal of the sensor is changed or a changing magnitude is changed in response to the circumferential length of the first and second sensed portions to which the sensing portion is opposed. Therefore, if a ratio of a change in period or magnitude of the output signal of the sensor, which corresponds to the first sensed portion, and a change in period or magnitude, which corresponds to the second sensed portion is detected, an extent of the deviation of the central axes of both raceway rings in the radial direction and in turn the magnitude of the radial load acting between both raceway rings can be derived.

Also, in the case of the invention set forth in the third aspect, a boundary between the first sensed portion and the second sensed portion is inclined to a diameter direction of the encoder and also an inclined direction of the boundary to the diameter direction is set in an opposite direction with respect to a middle portion of the encoder in the diameter direction mutually. Also, sensing portions of a pair of sensors provided to positions separated in the diameter direction of the encoder to put the middle portion in the diameter direction therebetween are opposed to the sensed surface of the encoder.

In case such structure is employed, when the central axis of the rotary side raceway ring is deviated from the central axis of the stationary side raceway ring pursuant to a variation of the radial load, radial positions of the portions, to which the sensing portions of a pair of sensors are opposed, of the sensed surface are changed. Then, when the radial positions of the portions, to which the sensing portions of the sensors are opposed, of the sensed surface are changed pursuant to the variation of the radial load, the output signal of one sensor leads in phase and at the same time the output signal of the other sensor lags in phase. Therefore, if a discrepancy of phase between the output signals of both sensors is detected, an extent of the deviation of the central axes of both raceway rings in the radial direction and in turn the magnitude of the radial load acting between both raceway rings can be derived.

Upon embodying the invention set forth in the second or third aspect, for example, as set forth in the fourth aspect, the encoder is made of a permanent magnet. Also, one sensed portion out of the first sensed portion and the second sensed portion is an N pole and other sensed portion is an S pole. Therefore, the permanent magnet is magnetized in the axial direction and also the magnetizing direction is changed alternately in the circumferential direction. In this case, one pole of the N pole and the S pole is shaped into a sector (or a trapezoid) whose circumferential width is widened toward the outer side of the encoder in the radial direction, and the other pole is shaped into an inversed sector (or an inversed trapezoid) whose circumferential width is widened toward the inner side of the encoder in the radial direction.

Also, the sensor used in combination with the encoder made of such permanent magnet is formed of the active magnetic sensor having the magnetic sensing element such as the Hall element, the magnetoresistive element, or the like.

When the encoder made of the permanent magnet and the active sensor are used in combination, a period of the output signal of the sensor at a reference voltage (e.g. 0 V) (time during when the output signal is deviated in a predetermined direction at a reference voltage) becomes longer as the width of the sector or the inversed sector is widened, and also a variation of the output signal (magnitude of change) at a reference voltage is increased as the width of the sector is widened.

Also, upon embodying the invention set forth in the second or third aspect, for example, as set forth in the fifth or sixth aspect, it is preferable that one sensed portion out of the first sensed portion and the second sensed portion is a through hole or a concave hole or a convex portion, and other sensed portion is an interim portion or a concave portion located between neighboring through holes or concave holes in the circumferential direction. As set forth in the fourth aspect, it is effective to make the encoder by the permanent magnet. In case the load should be sensed with high precision, it is preferable to use the encoder having the structure set forth in the fifth or sixth aspect.

The reason for this will be given as follows. First, particular areas of the sensed surface of the encoder are magnetized to get the encoder made of the permanent magnet set forth in the fourth aspect. In this case, in order to shape the N pole and the S pole, which exist on the sensed surface, into the sector or the inversed sector and also to restrict the magnetized areas strictly, the high-level magnetizing technique is required. Therefore, it is considered that a production cost of the encoder made of the permanent magnet is increased. In contrast, the structure set forth in the fifth or sixth aspect can be manufactured merely by forming the encoder by virtue of the machining, the press working, or the injection molding (containing the die casting), and a shape precision and a dimensional accuracy can be easily ensured. Thus, a production cost of the encoder can be suppressed relatively low. Therefore, if a lower cost is considered, the structure set forth in the fifth or sixth aspect is excellent in contrast to the structure set forth in the fourth aspect.

In this case, the material constituting the encoder is chosen according to the type of the sensor. For example, if this sensor is composed of the active magnetic sensor having the permanent magnet and the magnetic sensing element such as the Hall element, the magnetoresistive element, or the like, the encoder is made of the magnetic metal such as the steel plate, or the like. According to such structure, like the case where the encoder made of the permanent magnet is employed, the output signal of the sensor is changed following upon the change in radial position of the portion of the sensed surface of the encoder, to which the sensing portion of the sensor faces.

In contrast, if the optical sensor is employed and also one sensed portion is formed as the through hole, the encoder may be formed of the light shielding material. In this case, the period according to which the output signal of the sensor is changed is changed pursuant to the change in radial position of the portion of the sensed surface of the encoder, to which the sensing portion of the sensor is opposed (the magnitude of the change is not changed).

Upon embodying the invention set forth in the fifth or sixth aspect, as set forth in the seventh aspect, preferably the encoder is made of magnetic material, and the sensor changes an output signal in response to a change in magnetic characteristic of the sensed surface of the encoder. Also, an unchanged portion in which a pitch of the first sensed portion or the second sensed portion in a rotating direction is not changed in the radial direction is provided on both end portions of the encoder in the radial direction.

When constructed in such manner, under a condition that the sensing portion of the sensor is opposed to the end portion of the sensed surface of the encoder in the width direction (the end portion on the outer diameter side or the end portion on the inner diameter side), a flow of the magnetic flux between the sensing portion and the sensed surface can be stabilized and also the output signal of the sensor can be stabilized.

Also, upon embodying the present invention, for example, as set forth in the eighth aspect, the to-be-sensed load is a radial load that acts between the stationary side raceway ring and the rotary side raceway ring in a radial direction.

In this case, the sensed surface is composed of a side surface of the encoder in an axial direction, a plurality of sensed combination portions each consisting of a pair of individualized portions having a characteristic different from other portions are aligned on the sensed surface at an equal interval in the circumferential direction.

An interval between the pair of individualized portions constituting the sensed combination portions in the circumferential direction is changed continuously over all sensed combination portions in a same direction of the radial direction.

When constructed in this manner, the output signal of the sensor whose sensing portion is opposed to the sensed surface of the encoder is changed in a moment the sensor faces to the individualized portions, but the changing interval (period) is changed along with the change in radial position of the portion to which the sensing portion of the sensor faces.

Also, upon embodying the present invention, for example, as set forth in the ninth or tenth aspect, the to-be-sensed load is an axial load that acts between the stationary side raceway ring and the rotary side raceway ring in an axial direction.

In this case, the sensed surface is composed of a peripheral surface of the encoder, and a first sensed portion and a second sensed portion having different characteristics mutually are aligned alternately on the sensed surface at an equal interval in the circumferential direction.

Also, in the case of the invention set forth in the ninth aspect, a width of the first sensed portion out of widths of both sensed portions in the circumferential direction is widened toward one end side in the axial direction and a width of the second sensed portion is widened toward other end side in the axial direction.

When such structure is employed, if the relative positions of the stationary side raceway ring and the rotary side raceway ring are deviated in the axial direction pursuant to the variation of the axial load, the axial position of the portion of the sensed surface to which the sensing portion of the sensor is opposed is changed.

Therefore, like the case where the radial load is sensed as set forth in the second aspect, the magnitude of the axial load acting between both raceway rings can be derived.

Also, in the case of the invention set forth in the tenth aspect, a boundary between the first sensed portion and the second sensed portion is inclined to an axial direction of the encoder and also an inclined direction of the boundary to the axial direction is set in an opposite direction with respect to a middle portion of the encoder in the axial direction mutually. Also, sensing portions of a pair of sensors provided to positions separated in the diameter direction of the encoder to put the middle portion in the axial direction therebetween are opposed to the sensed surface of the encoder.

In case such structure is employed, when the rotary side raceway ring is deviated from the stationary side raceway ring in the axial direction pursuant to a variation of the axial load, axial positions of the portions, to which the sensing portions of a pair of sensors are opposed, of the sensed surface are changed. Then, when the axial positions of the portions, to which the sensing portions of the sensors are opposed, of the sensed surface are changed pursuant to the variation of the axial load, the output signal of one sensor leads in phase and at the same time the output signal of the other sensor lags in phase. Therefore, if a discrepancy of phase between the output signals of both sensors is detected, an extent of the deviation of the central axes of both raceway rings in the axial direction and in turn the magnitude of the axial load acting between both raceway rings can be derived.

Upon embodying the invention set forth in the ninth or tenth aspect, for example, as set forth in the eleventh aspect, the encoder is made of a permanent magnet, and the first sensed portion is an N pole and the second sensed portion is an S pole.

Otherwise, as set forth in the twelfth or thirteenth aspect, preferably the first sensed portion is a through hole or a concave hole or a convex portion, and the second sensed portion is an interim portion or a concave portion located between neighboring through holes or concave holes in the circumferential direction. This is because the high-precision encoder can be produced inexpensively in comparison with the encoder made of the permanent magnet, as set forth in the eleventh aspect, based on the reason described in the structure set forth in the fifth or sixth aspect, and thus the structure capable of sensing the load with good precision can be constructed at a low cost.

Upon embodying the invention set forth in twelfth or thirteenth aspect, as set forth in the fourteenth aspect, preferably the encoder is made of magnetic material, and the sensor changes an output signal in response to a change in magnetic characteristic of the sensed surface of the encoder. Also, an unchanged portion in which a pitch of the first sensed portion or the second sensed portion in a rotating direction is not changed in the axial direction is provided on both end portions of the encoder in the axial direction.

When constructed in such manner, under a condition that the sensing portion of the sensor is opposed to the end portion of the sensed surface of the encoder in the width direction (both end portions in the axial direction), a flow of the magnetic flux between the sensing portion and the sensed surface can be stabilized and also the output signal of the sensor can be stabilized.

Upon embodying the present invention, for example, as set forth in the fifteenth aspect, the to-be-sensed load is an axial load that acts between the stationary side raceway ring and the rotary side raceway ring in an axial direction.

In this case, the sensed surface is composed of a peripheral surface of the encoder, and a plurality of sensed combination portions each consisting of a pair of individualized portions having a characteristic different from other portions are aligned on the sensed surface at an equal interval in the circumferential direction.

An interval between the pair of individualized portions constituting the sensed combination portions in the circumferential direction is changed continuously over all sensed combination portions in a same direction of the axial direction.

When constructed in this manner, the output signal of the sensor whose sensing portion is opposed to the sensed surface of the encoder is changed in a moment the sensor faces to the individualized portions, but the changing interval (period) is changed along with the change in axial position of the portion to which the sensing portion of the sensor faces.

Also, upon embodying the present invention, for example, as set forth in the sixteenth aspect, preferably the sensing portion of the sensor opposes to three different positions or more of the sensed surface of the encoder in the circumferential direction respectively. Also, the arithmetic unit has a function of calculating a momental load applied between the stationary side raceway ring and the rotary side raceway ring by comparing output signals of the sensors mutually.

In this case, as set forth in the seventeenth aspect, the sensed surface of the encoder is composed of the peripheral surface of the encoder, and the sensing portions of respective sensors oppose to equally-spaced positions of the side surface of the encoder in the axial direction along the circumferential direction.

Otherwise, as set forth in the eighteenth aspect, the sensed surface of the encoder is composed of the side surface of the encoder in the axial direction, and the sensing portions of respective sensors oppose to equally-spaced positions of the side surface of the encoder in the axial direction along the circumferential direction.

In case such structure is employed, out of the loads applied between the stationary side raceway ring and the rotary side raceway ring, the momental load applied between both raceway rings can be derived in addition to the radial load component and the axial load component.

Also, upon embodying the present invention, for example, as set forth in the nineteenth aspect, the rolling bearing unit is a wheel supporting rolling bearing unit, the stationary side raceway ring is supported/fixed onto a suspension system in a state of use, and the rotary side raceway ring supports/fixes a wheel and rotates together with the wheel.

When embodying in such mode, the control applied to ensure the stable running of the vehicle can be improved by measuring the magnitude of the load applied to the wheel.

Alternately, as set forth in the twentieth aspect, the rolling bearing unit is used to support rotatably a spindle of a machine tool onto a housing. In this case, an outer ring as the stationary side raceway ring is fitted/fixed into the housing or a portion fixed to the housing in a state of use, and an inner ring as the rotary side raceway ring is fitted/fixed onto the spindle or a portion that rotates together with the spindle.

When embodying in such mode, the load applied to the spindle is measured by building the load measuring unit in the rolling bearing unit that supports the spindle of the machine tool, and then a compatibility of quality improvement and assurance of a machining efficiency can be attained by adjusting appropriately a feed speed of the tool, or the like.

Also, upon embodying the present invention, for example, as set forth in any one of the twenty-first to twenty-fourth aspects, the rolling bearing unit is a wheel supporting rolling bearing unit, an outer ring as the stationary side raceway ring is supported/fixed onto a suspension system in a state of use, and a hub as the rotary side raceway ring supports/fixes a wheel and rotates together with the wheel. Also, rolling elements are provided between double row outer ring raceways, which are located on an inner peripheral surface of the outer ring and serve as the stationary side raceway respectively, and double row inner ring raceways, which are located on an outer peripheral surface of the hub and serve as the rotary side raceway respectively, in plural every row, and a flange for supporting/fixing the wheel is provided to an outer end portion of the hub in the axial direction.

Also, in the case of the invention set forth in the twenty-first or twenty-second aspect, an encoder on the outer peripheral surface as the sensed surface of which concave portions and convex portions are aligned alternately is fixed onto an inner end portion of the hub in the axial direction or a portion located between the double row inner ring raceways, and the to-be-sensed load is an axial load that acts between the outer ring and the hub in an axial direction.

Also, in the case of the invention set forth in the twenty-first aspect, the sensing portion of the sensor is opposed to an upper portion of the sensed surface that exists on an outer peripheral surface of the encoder in a radial direction. Also, a width of the concave portions out of the concave portions and the convex portions formed on the sensed surface of the encoder in the circumferential direction is widened on an inner end side in the axial direction and narrowed on an outer end side in the axial direction.

Also, in the case of the invention set forth in the twenty-second aspect, the sensing portion of the sensor is opposed to a lower portion of the sensed surface that exists on an outer peripheral surface of the encoder in a radial direction, and a width of the concave portions out of the concave portions and the convex portions formed on the sensed surface of the encoder in the circumferential direction is widened on an outer end side in the axial direction and narrowed on an inner end side in the axial direction.

Meanwhile, in the case of the invention set forth in twenty-third or twenty-fourth aspect, an encoder on the inner side surface in the axial direction as the sensed surface of which concave portions and convex portions are aligned alternately is fixed onto an inner end portion of the hub in the axial direction, and the to-be-sensed load is an axial load that acts between the outer ring and the hub in an axial direction.

Also, in the case of the invention set forth in the twenty-third aspect, the sensing portion of the sensor is opposed to an upper portion of the sensed surface that exists on an inner side surface of the encoder in an axial direction. Also, a width of the concave portions out of the concave portions and the convex portions formed on the sensed surface of the encoder in the circumferential direction is widened on an outer end side in the radial direction and narrowed on an inner end side in the radial direction.

Also, in the case of the invention set forth in the twenty-fourth aspect, the sensing portion of the sensor is opposed to a lower portion of the sensed surface that exists on an inner side surface of the encoder in an axial direction. Also, a width of the concave portions out of the concave portions and the convex portions formed on the sensed surface of the encoder in the circumferential direction is widened on an inner end side in the radial direction and narrowed on an outer end side in the radial direction.

When constructed in this manner, because the variation of the output signal of the sensor caused due to the variation of the load acting between the stationary side raceway ring and the rotary side raceway ring can be enhanced, improvement of a measuring precision of this load can be achieved.

In this event, the concave portion mentioned in the above invention according to any one of twenty-first to twenty-fourth aspects contains the through hole that is formed by punching out the hole from the metal plate. In this case, the convex portion means the interim portion between the neighboring through holes in the circumferential direction.

BRIEF DESCRIPTION OF THE DRAWINGS

FIG. 12 are perspective views showing a material of an encoder that is built in the embodiment 5 and its assembled state respectively.

FIG. 13 are views showing a sensor output signal, which is changed together with a variation of an axial load, respectively.

FIG. 39 are views showing a sensor output signal, which is changed together with a variation of an axial load, respectively.

Figure 1:
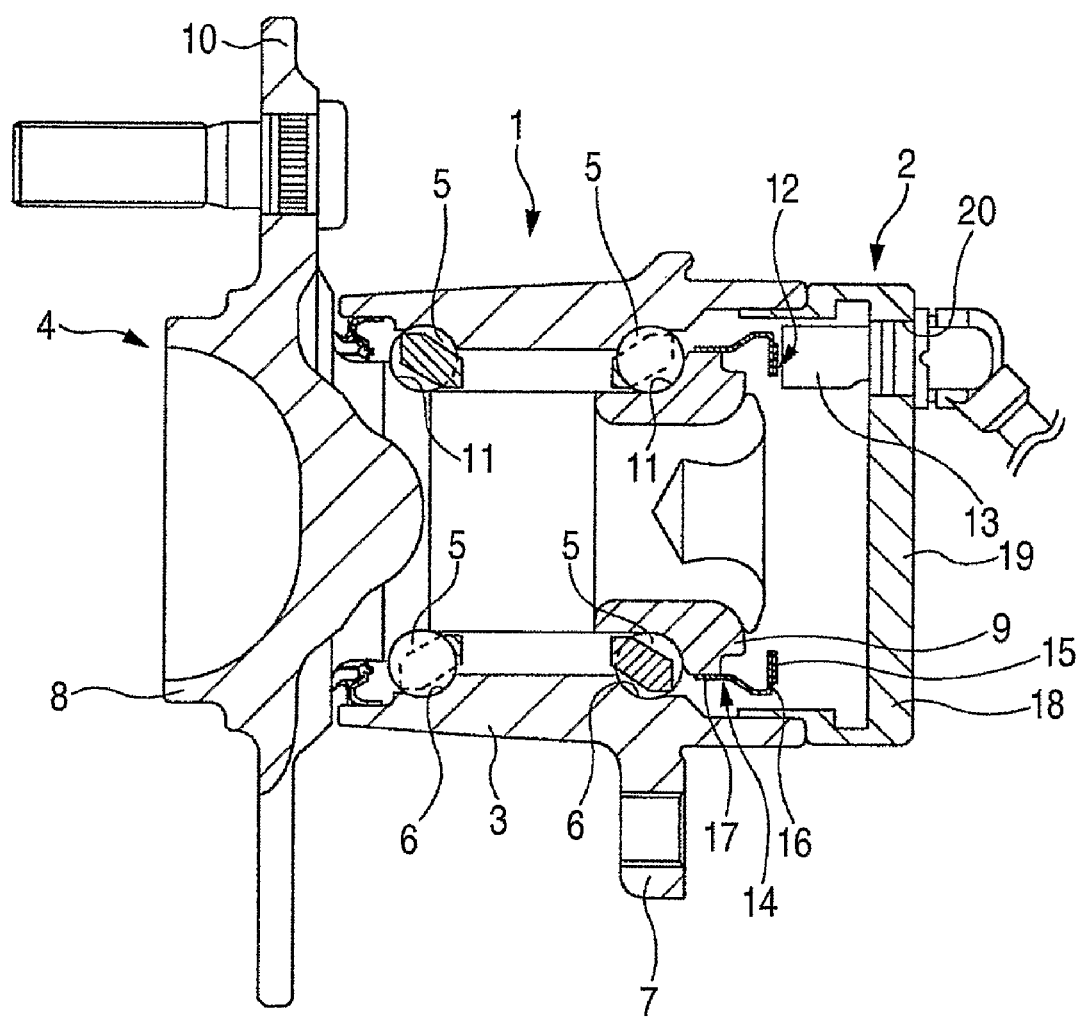
FIG. 1 is a sectional view showing an embodiment 1 of the present invention.

In the drawings, 1, 1a denote wheel supporting rolling bearing unit, 2 denotes load measuring unit, 3, 3a denote outer ring, 4, 4a, 4b denote hub, 5, 5a denote rolling element, 6, 6a denote outer ring raceway, 7 denotes fitting portion, 8 denotes hub main body, 9 denotes inner ring, 10 denotes flange, 11, 11a denote inner ring raceway, 12, 12a, 12b, 12c, 12d, 12e, 12f, 12g, 12h, 12i, 12j, 12k, 12A, 12B denote encoder, 13, 13a, 13b, 13c, 13d, 13e, 13f, 13g, 13h, 13i, 13A, 13B, 13C denote sensor, 14, 14a, 14b, 14c denote supporting plate, 15, 15a denote encoder main body, 16 denotes circular ring portion, 17 denotes circular cylinder portion, 18, 18a denote cover, 19 denotes bottom plate portion, 20, 20a denote fitting hole, 21, 21a, 21b denote through hole, 22, 22a, 22b denote interim portion, 23 denotes circular ring portion, 24 denotes sensed combination portion, 25 denotes individualized portion, 26 denotes circular cylinder portion, 27, 27a denote convex portion, 28, 28a denote concave portion, 29a, 29b denote parallel portion, 30a, 30b denote parallel portion, 31a, 31b denote unchanged portion, 32a, 32b denote unchanged portion, 33a, 33b denote through hole, 34a, 34b denote column portion, and 25 denotes rim portion.

BEST MODE FOR CARRYING OUT THE INVENTION

Embodiment 1

FIGS. 1 to 5 show an embodiment 1 of the present invention. A rolling bearing unit with a load measuring unit of the present embodiment comprises a wheel supporting rolling bearing unit 1, and a load measuring unit 2 that has also a function as a revolution speed sensing unit.

As shown in FIG. 1, the wheel supporting rolling bearing unit 1 includes an outer ring 3, a hub 4, and a plurality of rolling elements 5, 5. The outer ring 3 is the stationary side raceway ring that is supported/fixed onto the suspension system in actual use, and has double row outer ring raceways 6, 6 on an inner peripheral surface and a fitting portion 7, which is shaped like a outward-extended flange and is coupled to the suspension system, on an outer peripheral surface respectively. Also, the hub 4 is the rotary side raceway ring that supports/fix the wheel in actual use to rotate together with the wheel, and is constructed by coupling a hub main body 8 and an inner ring 9 in combination. In such hub 4, a flange 10 used to support/fix the wheel is provided to an outer end portion of an outer peripheral surface in the axial direction (an end portion located on the outer side in the width direction of the vehicle body when fitted to the suspension system), and double row inner ring raceways 11, 11 are provided to a middle portion of the hub in the axial direction and an outer peripheral surface of the inner ring 9 respectively. The rolling elements 5, 5 are provided rollably in plural between the inner ring raceways 11, 11 and the outer ring raceways 6, 6 respectively, and support rollably the hub 4 on the inner diameter side of the outer ring 3 concentrically with the outer ring 3. In the illustrative example, the ball is used as the rolling element. In the case of the rolling bearing unit for supporting the wheel of the vehicle that is heavy in weight, in some cases the tapered roller is used as the rolling element. An amount of displacement of the outer ring and the hub can be made large in the unit using the ball as the rolling element in contrast to the unit using the tapered roller as the rolling element. However, though an amount of displacement is small, the outer ring and the hub are also displaced in the unit using the tapered roller as the rolling element. Therefore, such unit using the tapered roller can also be handled as the subject of the present invention.

Meanwhile, as shown in FIG. 1, the load measuring unit 2 includes an encoder 12, a sensor 13, and an arithmetic unit (not shown).

The encoder 12 consists of a supporting plate 14 and an encoder main body 15. The supporting plate 14 is formed by bending a magnetic metal plate such as a mild steel plate, or the like to connect continuously a circular ring portion 16 and a circular cylinder portion 17 via an inclined portion. The supporting plate 14 has a sectional shape like the almost J-shape and is formed like a circular ring as a whole. Also, the encoder main body 15 is made of a permanent magnet such as a rubber magnet, a plastic magnet, or the like, and is formed like a circular ring as a whole. The encoder main body 15 is affixed/fixed concentrically with the circular cylinder portion 17 onto the inner surface of the circular ring portion 16 in the axial direction.

The permanent magnet constituting the encoder main body 15 is magnetized in the axial direction, and the magnetized direction is extended in the circumferential direction and is changed alternately at an equal interval. As a result, the N pole and the S pole are aligned alternately at an equal interval on the inner surface of the encoder main body 15 in the axial direction. In the case of the present embodiment, a portion magnetized as the N pole and a portion magnetized as the S pole correspond to a first sensed portion and a second sensed portion that are present on the sensed surface of the encoder 12 to have the different characteristic mutually. Then, out of widths of the portion magnetized as the N pole and the portion magnetized as the S pole in the circumferential direction, the width of the portion magnetized as the N pole is widened outward in the radial direction and also the width of the portion magnetized as the S pole is widened inward in the radial direction.

The circular cylinder portion 17 of the supporting plate 14 is fitted onto the inner end portion of the inner ring 9 in the axial direction by means of the shrink fit. Thus, the encoder 12 constructed in this manner is coupled/fixed concentrically with the hub 4 to the inner ring portion of the hub 4 in the axial direction. In this condition, the inner surface of the encoder main body 15 in the axial direction is positioned on a virtual plane that intersect orthogonally with the central axis of the hub 4.

Meanwhile, the sensor 13 is supported/fixed onto the inner end portion of the outer ring 3 in the axial direction via a cover 18. This cover 18 is formed like a circular cylinder with a bottom by either executing the injection molding of the synthetic resin or applying the draw working to the metal plate. The cover 18 is fitted/fixed to the inner end portion of the outer ring 3 to cover the inner-end opening portion of the outer ring 3. A fitting hole 20 is formed in a portion, which is located near the outer diameter side and faces to the sensed surface of the encoder 12, of a bottom plate portion 19 constituting such cover 18 in a state that such hole passes through the bottom plate portion 19 in the axial direction.

The sensor 13 is supported/fixed onto the bottom plate portion 19 in a state that such sensor passes through the fitting hole 20 from the inside to the outside in the axial direction. Then, the sensing portion provided to the top end surface (left end surface in FIG. 1) of the sensor 13 is positioned in close vicinity to the sensed portion of the encoder 12 to oppose thereto via a measuring clearance of about 0.5 to 2 mm. Also, a magnetic sensing element such as a Hall element, a magnetoresistive element, or the like is provided to the sensing portion of the sensor 13 as the active magnetic sensor. The characteristic of such magnetic sensing element is changed in respective states that such element opposes to the N pole and the S pole. As a result, the characteristic of the magnetic sensing element is changed when the encoder 12 is rotated together with the hub 4, and thus an output signal of the sensor 13 is changed.

In this fashion, a period (frequency) at which the output signal of the sensor 13 is changed is changed in response to the rotation speed of the hub 4. More particularly, the period at which the output signal is changed becomes shorter as the rotation speed is increased higher, and thus a changing frequency is increased. For this reason, if this output signal is fed to a controller (not shown) provided to the car body side, or the like, the rotation speed of the wheel that is rotated together with the encoder 12 can be sensed and then the ABS or TCS control can be applied. This respect is similar to the technology known in the related art.

In particular, in the case of the present embodiment, the pattern according to which the output signal is changed is changed based on the magnitude of the radial load that acts between the hub 4 and the outer ring 3. Therefore, the radial load can be measured by monitoring this pattern. Explanation will be made of this respect with reference to FIGS. 3 to 5.

First, the premise made to measure the radial load will be explained hereunder. As set forth in above Patent Literature 1, the relative positions of the outer ring 3 and the hub 4 in the radial direction are changed in response to the magnitude of the radial load applied between the outer ring 3 and the hub 4. The reason for this is that respective amounts of elastic deformation of the rolling elements 5, 5 and the outer ring raceways 6, 6 and the inner ring raceways 11, 11, with which the rolling surfaces of these rolling elements 5, 5 make contact as the rolling contact, are changed based on the radial load. In the case of the related art set forth in above Patent Literature 1, the radial load applied between the outer ring and the hub is measured by measuring directly the displacement of the outer ring and the hub in the radial direction by means of the displacement sensor. In contrast, in the case of the present embodiment, the magnitude of the radial load applied between the outer ring 3 and the hub 4 is measured based on the relative displacements of the encoder 12 and the sensor 13. Explanation will be made of this respect hereunder.

Assume that, when the standard radial load (standard value) is applied between the outer ring 3 and the hub 4, the sensing portion of the sensor 13 faces to the center portion of the sensed surface of the encoder 12 in the radial direction. In this event, the sensing portion of the sensor 13 scans the center portion of the sensed surface, which is indicated by a chain line α in FIG. 3. Since the width of the portion magnetized to have the N polarity in the circumferential direction and the width of the portion magnetized to have the S polarity in the circumferential direction are equal to each other in the center portion in the radial direction, the output signal of the sensor 13 is swung on a reference voltage (e.g., 0 V) on both sides by the same amplitude, as shown in FIG. 4(A). That is, a period $T_H$ in which a voltage of the output signal is higher than the reference voltage and a period $T_L$ in which such voltage is lower than the reference voltage become equal mutually ($T_H = T_L$). Also, both a difference $\Delta V_H$ between a maximum value of the voltage of the output signal and the reference voltage and a difference $\Delta V_L$ between a minimum value of the voltage of the output signal and the reference voltage become equal mutually ($\Delta V_H = \Delta V_L$).

In contrast, when the radial load applied between the outer ring 3 and the hub 4 is increased larger than the standard value, the position of the outer ring 3 with respect to the hub 4 is deviated downward. Thus, the sensing portion of the sensor 13 opposes to the portion of the sensed surface of the encoder 12 located near the inner side in the radial direction. In this event, the sensing portion of the sensor 13 scans the portion of the sensed surface located near the inner side in the radial direction, which is indicated by a chain line β in FIG. 3. Since the width of the portion magnetized as the N pole in the circumferential direction becomes narrower than the width of the portion magnetized as the S pole in the circumferential direction in the portion located near the inner side in the radial direction, the output signal of the sensor 13 is swung largely toward the lower side on the reference voltage (e.g., 0 V), as shown in FIG. 4(B). That is, the period $T_L$ in which the voltage of the output signal is lower than the reference voltage becomes larger than the period $T_H$ in which such voltage is higher than the reference voltage ($T_H < T_L$). Also, the difference $\Delta V_L$ between the minimum value of the voltage of the output signal and the reference voltage becomes larger than the difference $\Delta V_H$ between the maximum value of the voltage of the output signal and the reference voltage ($\Delta V_L > V_H$).

In addition, conversely to the above case, when the radial load applied between the outer ring 3 and the hub 4 is decreased smaller than the standard value, the position of the outer ring 3 with respect to the hub 4 is deviated upward. Thus, the sensing portion of the sensor 13 opposes to the portion of the sensed surface of the encoder 12 located near the outer side in the radial direction. In this event, the sensing portion of the sensor 13 scans the portion of the sensed surface located near the outer side in the radial direction, which is indicated by a chain line γ in FIG. 3. Since the width of the portion magnetized to have the N polarity in the circumferential direction becomes wider than the width of the portion magnetized to have the S polarity in the circumferential direction in the portion located near the outer side in the radial direction, the output signal of the sensor 13 is swung largely toward the upper side on the reference voltage (e.g., 0 V), as shown in FIG. 4(B). That is, the period $T_H$ in which the voltage of the output signal is higher than the reference voltage becomes larger than the period $T_L$ in which such voltage is lower than the reference voltage ($T_H > T_L$). Also, the difference $\Delta V_H$ between the maximum value of the voltage of the output signal and the reference voltage becomes larger than the difference $\Delta V_L$ between the minimum value of the voltage of the output signal and the reference voltage ($\Delta V_H > \Delta V_L$).

As a consequence, an extent of deviation between the central axis of the outer ring 3 and the central axis of the hub 4 (amount of radial displacement) can be sensed if the pattern of the output signal of the sensor 13 is monitored. More particularly, if a ratio "$T_H/T_L$" of the period $T_H$ in which the voltage of the output signal is higher than the reference voltage and the period $T_L$ in which such voltage is lower than the reference voltage is observed, a degree of the deviation between the central axis of the outer ring 3 and the central axis of the hub 4 (amount of radial displacement) can be sensed. Alternately, if a ratio "$\Delta V_H/\Delta V_L$" of the difference $\Delta V_H$ between the maximum value of the voltage of the output signal and the reference voltage and the difference $\Delta V_L$ between the minimum value of the voltage of the output signal and the reference voltage is observed, an amount of radial displacement can also be sensed. Since a relationship between the ratio "$T_H/T_L$" or "$\Delta V_H/\Delta V_L$" and an amount of radial displacement is changed substantially linearly at any ratio, such relationship can be easily derived. Then, the derived relationship is loaded in the software that is installed into the arithmetic unit (microcomputer) (not shown), which is used to calculate the radial load, respectively.

Figure 5:
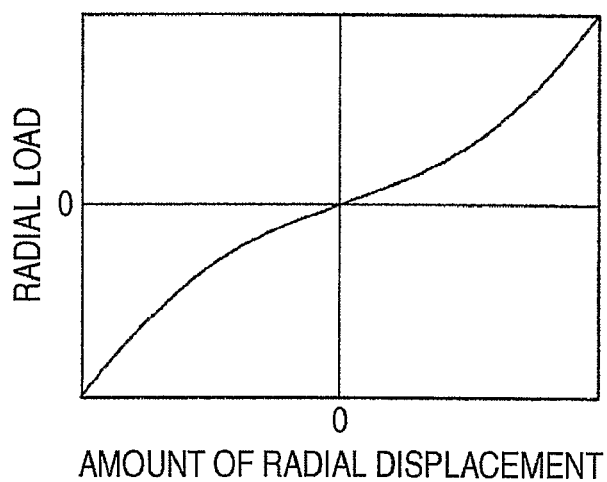
FIG. 5 is a graph showing a first example of a relationship between an amount of radial displacement of an outer ring and a hub and a radial load.

In addition, the relationship between an amount of radial displacement and the radial load can be derived by the calculation or based on the experiment. When the relationship is derived by the calculation, such relationship is calculated on the basis of the theory that is widely known in the technical filed of the rolling bearing unit, while using specifications of the rolling bearing unit 1, i.e., materials of the outer ring 3 and the hub 4 as well as radii of curvature of the cross sections of the outer ring raceways 6, 6 and the inner ring raceways 11, 11, the number and the diameter of the rolling elements 5, 5. Also, when the relationship is derived based on the experiment, the amount of radial displacement of the outer ring 3 and the hub 4 is measured, while applying the already-known radial loads, which have a different magnitude respectively, between the outer ring 3 and the hub 4. In any event, the relationship between the amount of radial displacement and the magnitude of the radial load, as shown in FIG. 5, is derived and then incorporated into the software.

Since the present embodiment is constructed as above, the radial load can be measured, though a new parts such as a displacement sensor, or the like is not built in the rolling bearing unit 1. In other words, in order to execute the ABS or TCS control, a combination of the encoder 12 and the sensor 13 is also needed to sense the rotation speed of the hub 4. In the rolling bearing unit with the load measuring unit in the present embodiment, the radial load can also be measured by devising the structure required to sense such rotation speed. Therefore, the structure used to measure the radial load applied to the rolling bearing unit can be constructed in small size and light weight.

Figure 2:
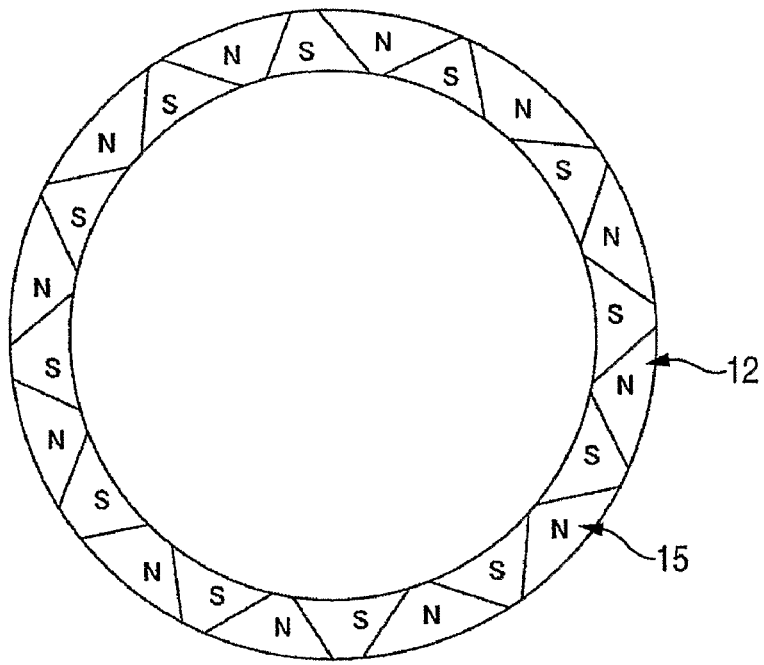
FIG. 2 is a view showing an encoder main body when viewed from the right side in FIG. 1.
Figure 3:
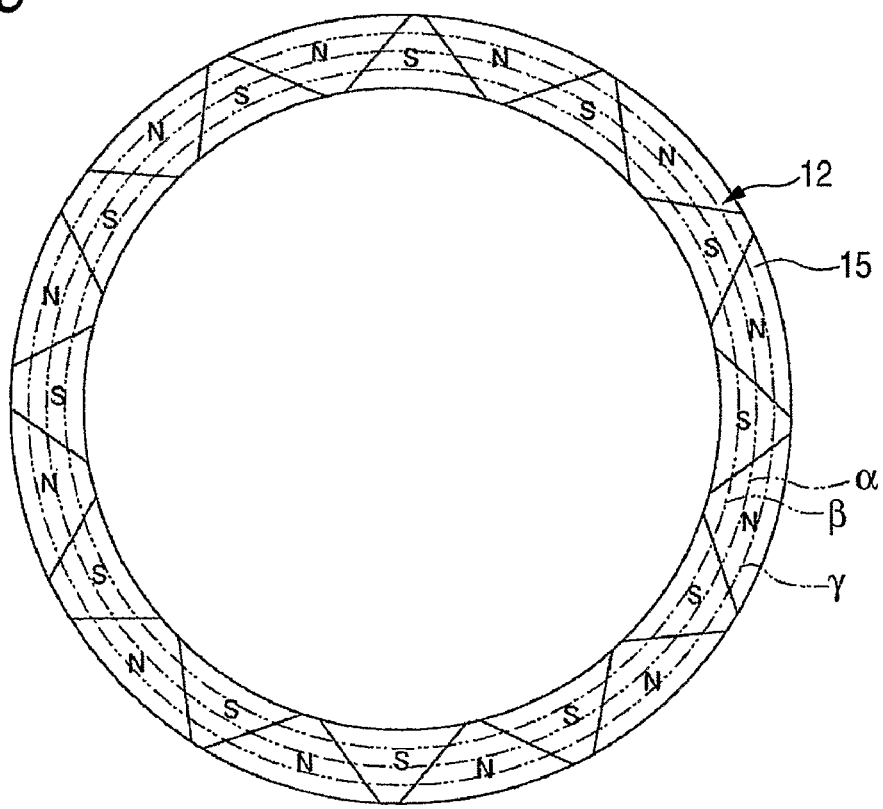
FIG. 3 is a view showing a scanned portion of a sensed surface of an encoder scanned by a sensing portion of a sensor when viewed similarly to FIG. 2.
Figure 4:
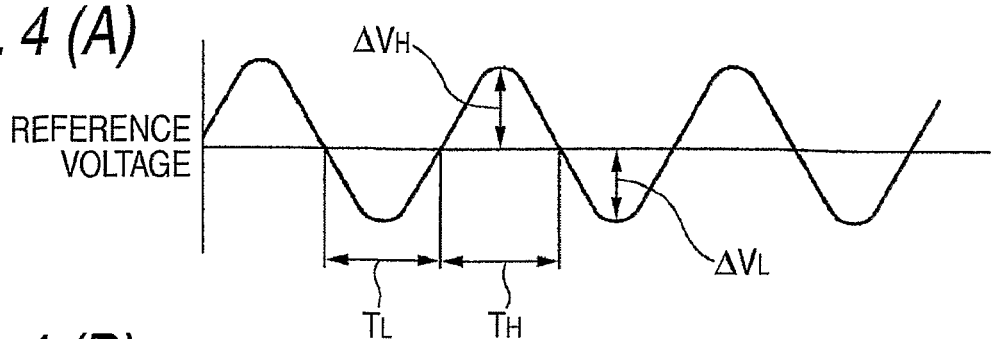
FIG. 4 are views showing a sensor output signal, which is changed together with a variation of a radial load, respectively.
Figure 4:
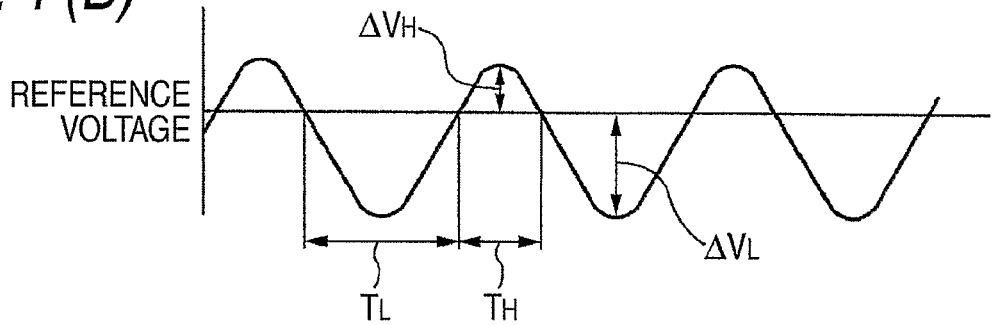
Figure 4:
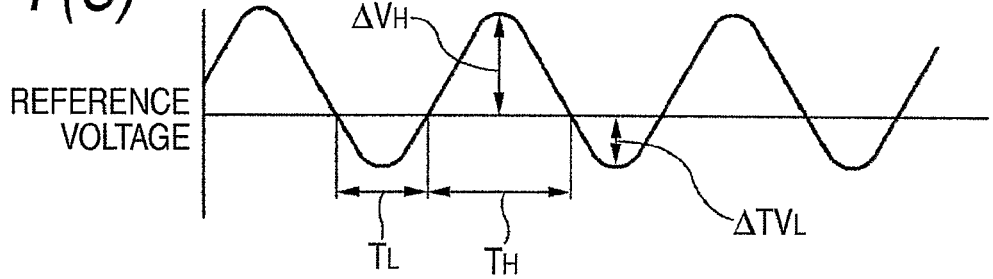

As apparent from FIG. 4, in the case of the present embodiment, the period $T_H$ in which the voltage of the output signal of the sensor 13 is higher than the reference voltage and the period $T_L$ in which such voltage is lower than the reference voltage are changed according to the magnitude of the radial load. Therefore, in order to sense precisely the rotation speed of the hub 4 irrespective of the variation of the radial load, the rotation speed is calculated based on a sum "$T_H+T_L$" of both periods. Even if the portion magnetized as the N pole and the portion magnetized as the S pole are shaped into a sector or an inversed sector as shown in FIGS. 2 and 3, this sum "$T_H+T_L$" is kept almost constant regardless of the radial displacement. As a result, the rotation speed can be precisely derived in the present embodiment.

Embodiment 2

Figure 6A:
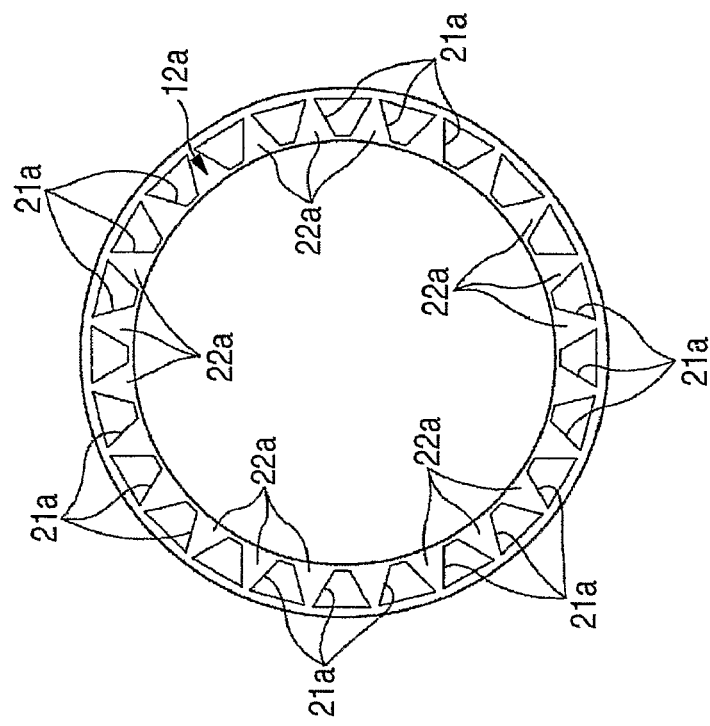
FIG. 6 is a perspective view and a front view showing a second example of an encoder that is built in an embodiment 2 of the present invention.
Figure 6B:
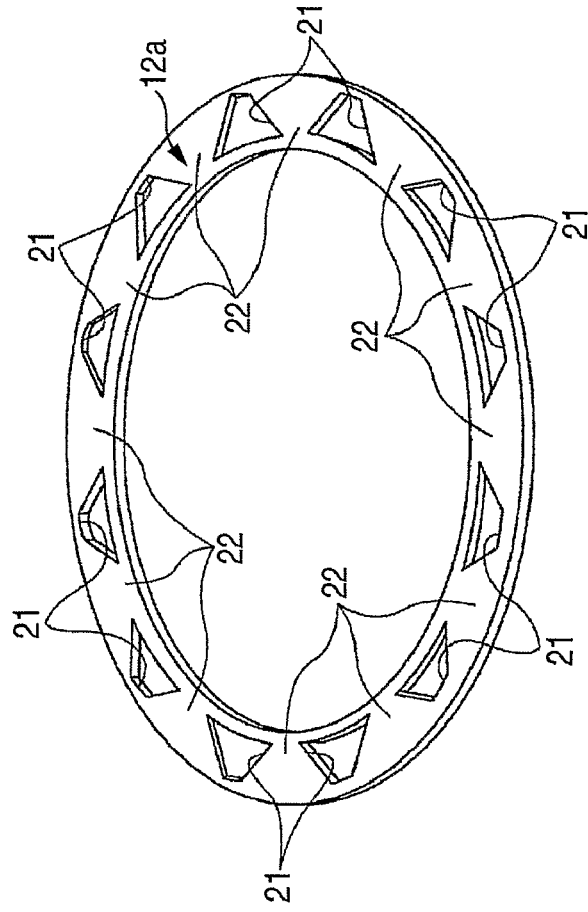

FIG. 6(A) shows an embodiment 2 of the present invention. In the case of the present embodiment, through holes 21, 21 are formed in the intermediate portion of a circular-ring like encoder 12a in the radial direction at an equal space along the circumferential direction. In the case of the present embodiment, these through holes 21, 21 are shaped into the inversed sector (or the inversed trapezoid) whose width in the circumferential direction is narrowed gradually toward the outside of the encoder 12a in the radial direction. Also, interim portions 22, 22 between the neighboring through holes 21, 21 in the circumferential direction are shaped into the sector (or the trapezoid) whose width in the circumferential direction is widened gradually toward the outside in the radial direction. Therefore, in the case of the present embodiment, the interim portions 22, 22 correspond to a first sensed portion, and the through holes 21, 21 correspond to a second sensed portion. Conversely to the above case, as shown in FIG. 6(B), a width of through holes 21a, 21a can be increased gradually toward the outside in the radial direction, and a width of interim portions 22a, 22a can be decreased gradually toward the outside in the radial direction.

In any case, like the case in the above embodiment 1, an amount of displacement of the central axis of the stationary side raceway ring such as the outer ring, or the like, which supports the sensor, and the central axis of the rotary side raceway ring such as the hub, or the like, which supports/fixes the encoder 12a, in the radial direction can be sensed by combining the encoder with the appropriate sensor. Then, the radial load acting between the stationary side raceway ring and the rotary side raceway ring can be derived. Here, the material constituting the encoder 12a is chosen according to the type of the sensor.

For example, in case this sensor is constructed as the active magnetic sensor that includes the permanent magnet and the magnetic sensing element such as the Hall element, the magnetoresistive element, or the like, the encoder 12a is made of the magnetic metal such as the steel plate, or the like. In case this sensor is constructed as the passive magnetic sensor that includes the permanent magnet, the pole piece, and the coil, the encoder 12a is made similarly. In such structure, like the case in the above embodiment 1, the output signal of the sensor is changed following upon the positional change of the portion of the sensed surface, to which the sensing portion of the sensor opposes, of the encoder 12a in the radial direction. In case the magnetic sensor is employed, concave portions or convex portions like the sector or the inversed sector may be formed on the sensed surface of the encoder, in place of the through holes. In the case of the encoder made of the permanent magnet on the sensed surface of which the N pole and the S pole are aligned alternately, it is possible that a sensing precision of the load is worsened because the magnetic flux density becomes unequal. In this event, if the encoder in which the through holes or the concave portions and the convex portions are formed in the magnetic metal is employed, such problem does not arise and thus a sensing precision of the load is ready to assure.

In contrast, in case the sensor is formed of the optical sensor, one of the first sensed portion and the second sensed portion, which is formed on the sensed surface of the encoder 12a, is limited to the through hole. In this case, any material may be employed as the material constituting the encoder 12a if such material is able to shield a light. When the optical sensor is employed, the period in which the output signal of the sensor is changed is changed (the magnitude of the change is not changed) according to the positional change of the portion of the sensed surface, to which the sensing portion of the sensor opposes, of the encoder 12a in the radial direction.

Since structures and operations of respective portions except the encoder 12a are similar to those in the above embodiment 1, illustration and explanation of the equivalent portions will be omitted herein.

Embodiment 3

Figure 7:
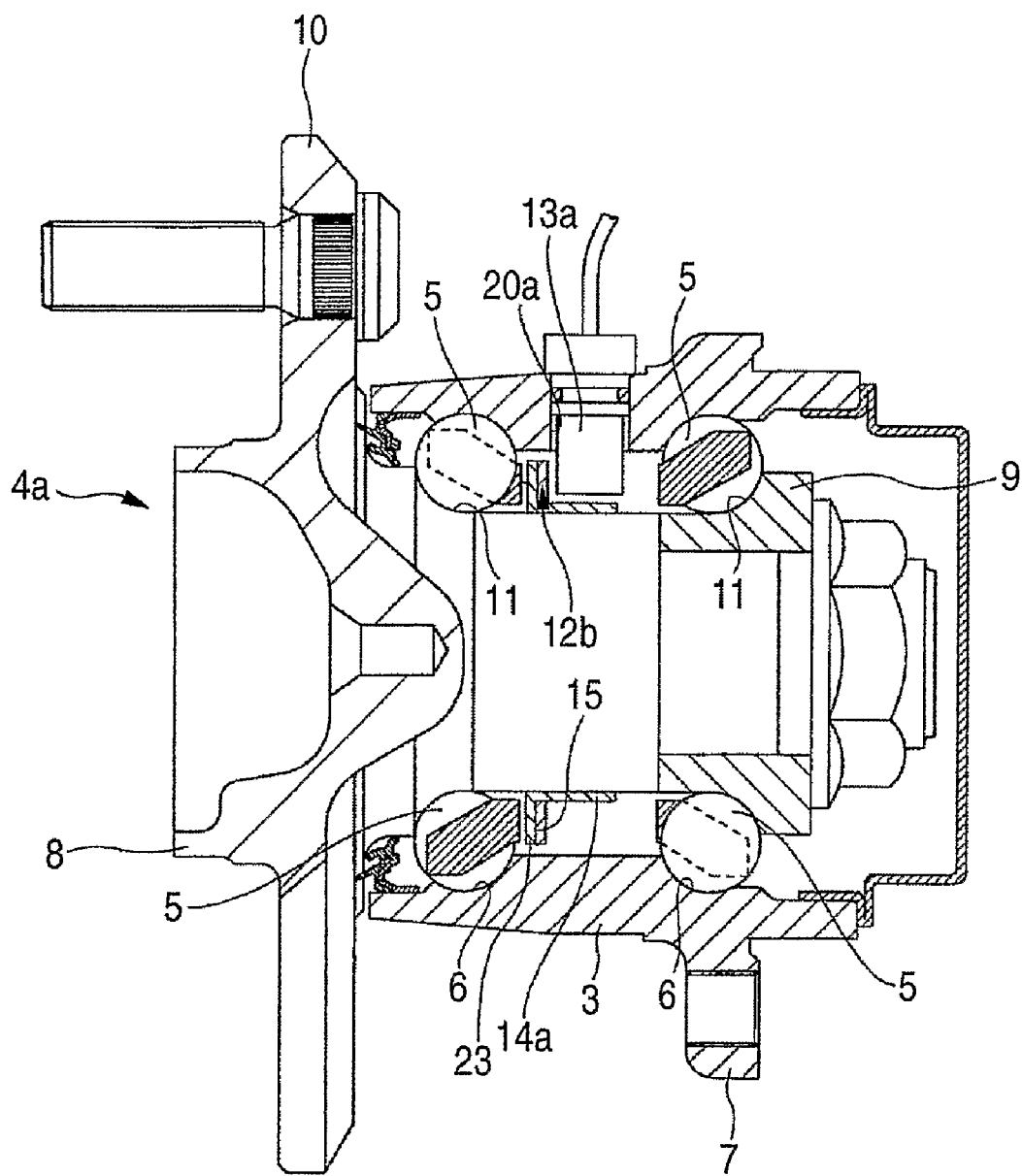
FIG. 7 is a sectional view showing an embodiment 3 of the present invention.

FIG. 7 shows an embodiment 3 of the present invention. In the case of the present embodiment, an encoder 12b is fitted/fixed onto a middle portion of a hub 4a in the axial direction between the rolling elements 5, 5 arranged in double rows. The encoder 12b has a supporting plate 14a having an L-shaped cross section and is formed like a circular ring as a whole. Then, either the made of the permanent magnet, as shown above FIGS. 2 and 3, is affixed onto one side surface of a circular ring portion 23 of the supporting plate 14a or the through holes 21, 21a as shown above FIG. 6 or the concave portions are formed in or on the circular ring portion 23. As a result, a function of the encoder can be provided to the circular ring portion 23 itself.

A sensor 13a used in combination with such encoder 12b is inserted into a fitting hole 20a, which is formed in the middle portion of the outer ring 3 in the axial direction between double row outer ring raceways 6, 6, from the outside to the inside in the radial direction of the outer ring 3. Then, the sensing portion provided to a side surface of the top end portion of the sensor 13a is positioned in close vicinity to the sensed surface of the encoder main body 15, which is affixed to the side surface of the circular ring portion 23 in the axial direction, or the side surface of the circular ring portion 23 itself to face thereto.

The present embodiment is similar to the above embodiment 1 or the embodiment 2 in that a displacement between the central axis of the hub 4a and the central axis of the outer ring 3 is sensed based on the pattern of the output signal of the sensor 13a and then the radial load acting between the hub 4a and the outer ring 3 is derived based on this displacement. Therefore, their redundant explanation will be omitted herein.

Embodiment 4

Figure 8:
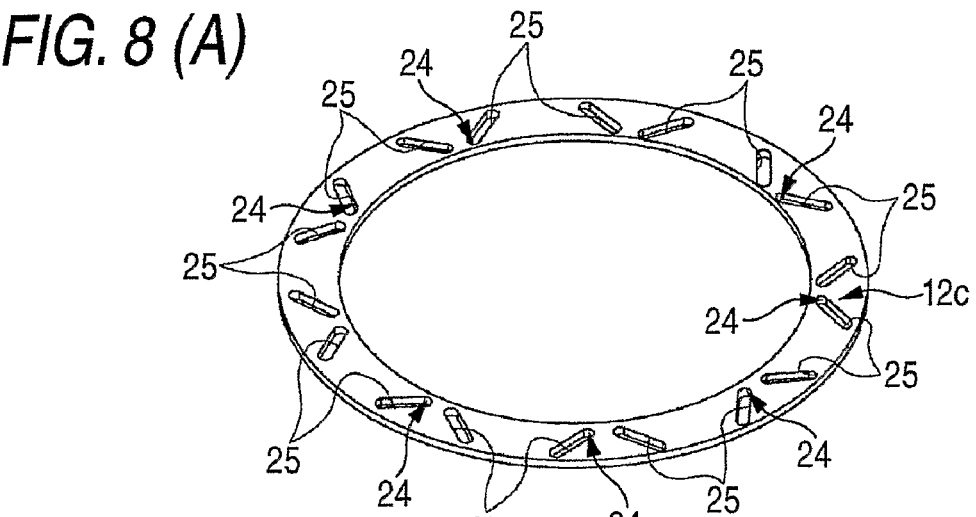
FIG. 8 are pertinent perspective views showing a third example of an encoder that is built in an embodiment 4 of the present invention respectively.
Figure 8:
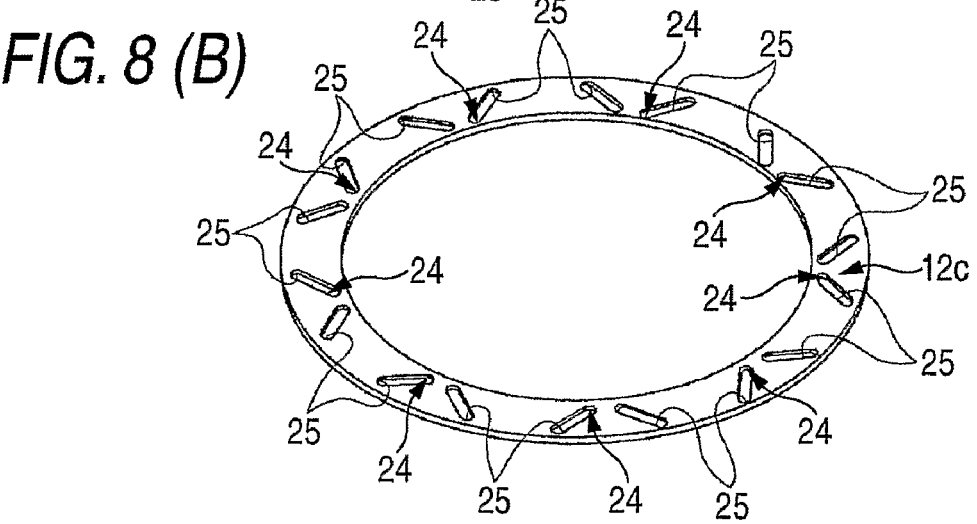
Figure 8:
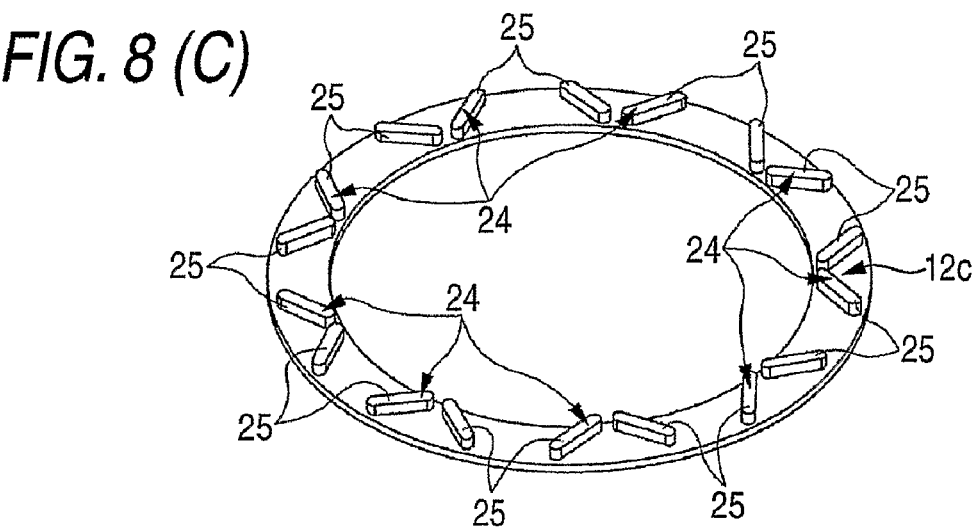
Figure 9:
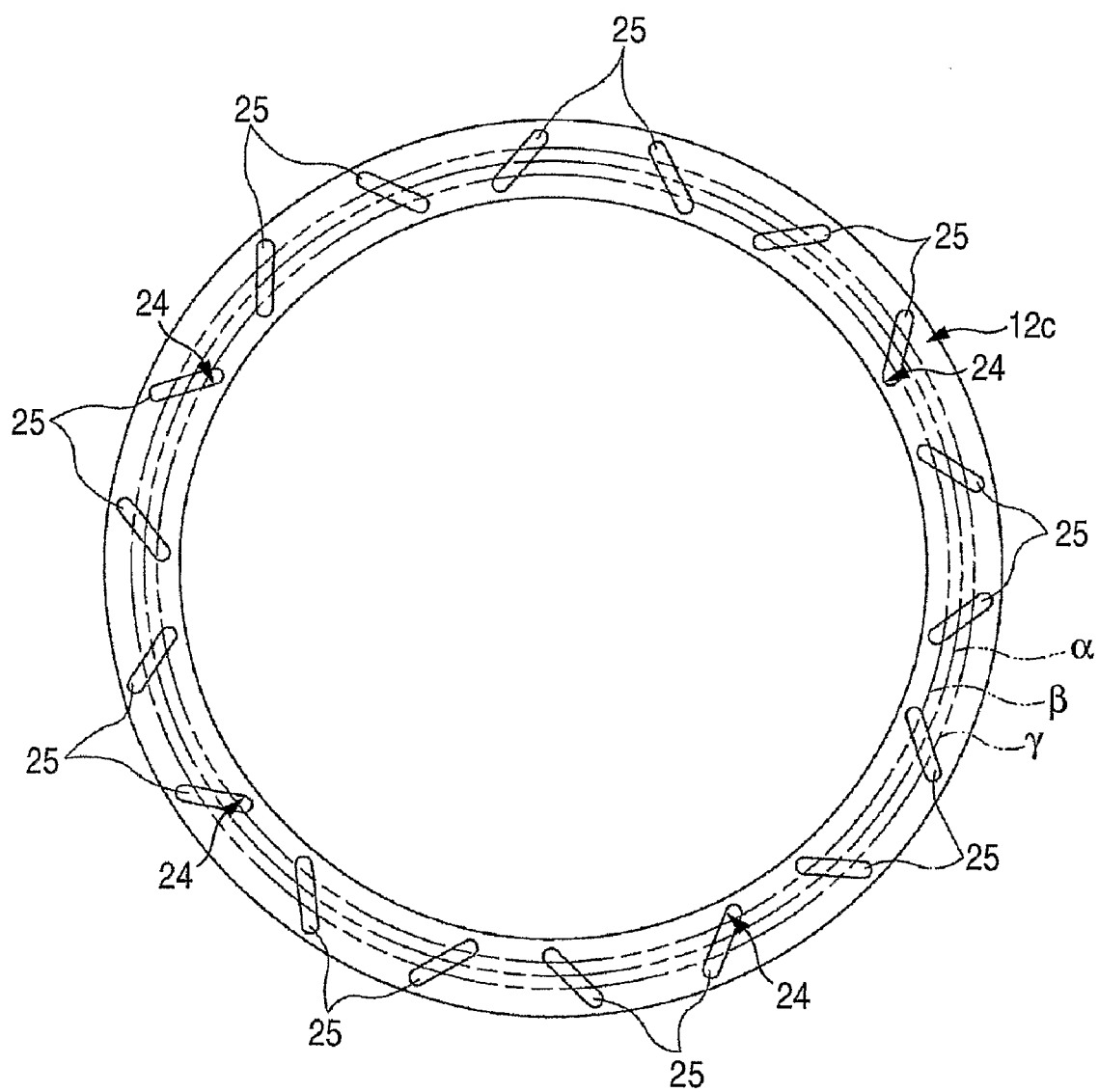
FIG. 9 is a view showing a scanned portion of a sensed surface of an encoder scanned by a sensing portion of a sensor when the sensed surface of the encoder is viewed along the axial direction.
Figure 10:
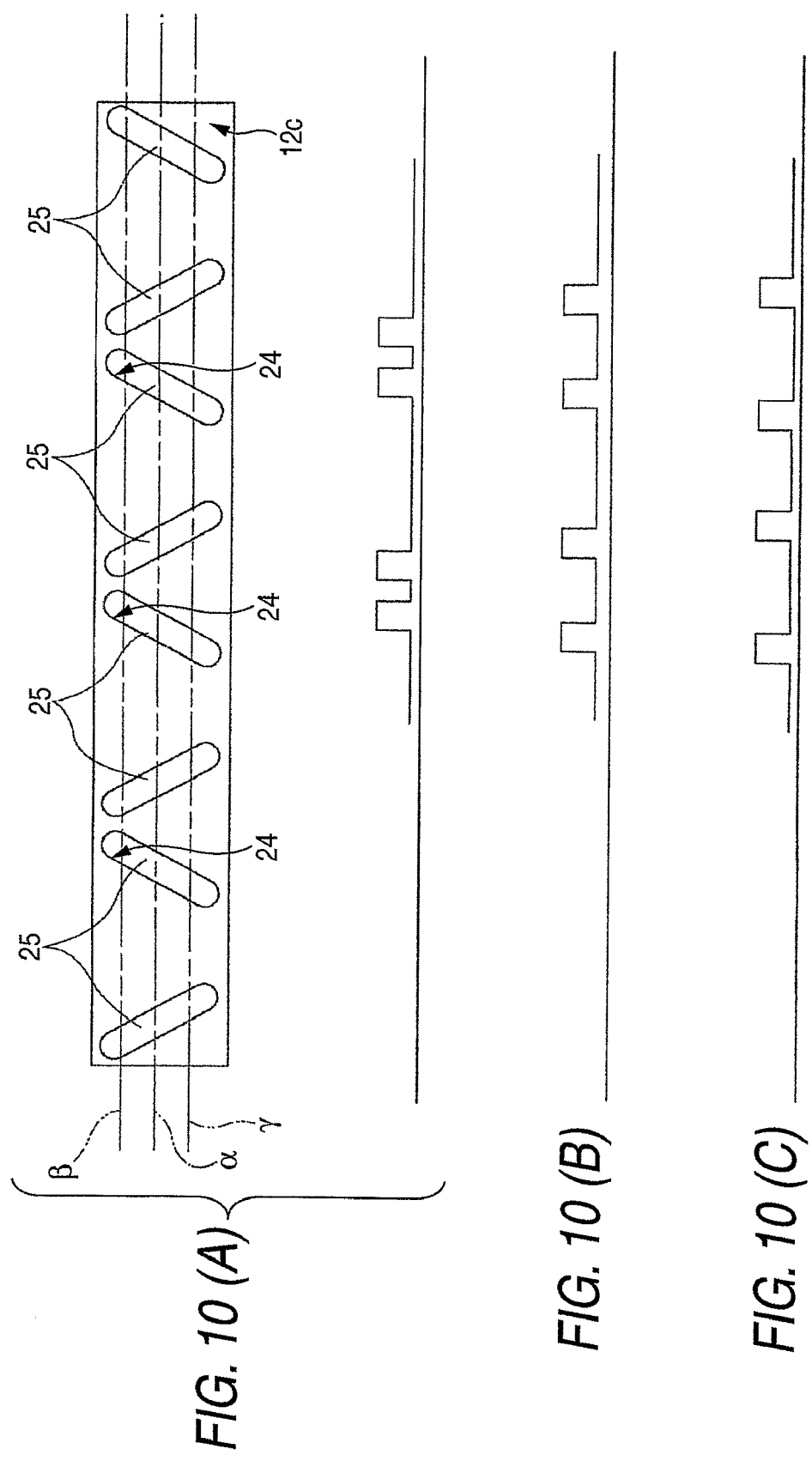
FIG. 10 are timing charts showing a sensor output signal, which is changed together with a variation of a radial load, respectively.

FIGS. 8 to 10 show an embodiment 4 of the present invention. In the case of the present embodiment, a plurality of sensed combination portions 24, 24 are arranged in a side surface of an encoder 12c as the sensed surface in the axial direction at an equal interval along the circumferential direction. Each of the sensed combination portions 24, 24 consists of a pair of individualized portions 25, 25 that has the characteristic different from other portions respectively. As such individualized portions 25, 25, slit-like longitudinal holes as shown in FIG. 8(A), concave holes as shown in FIG. 8(B), or bank-like convex portions as shown in FIG. 8(C) may be employed. If any holes are employed as the individualized portions 25, 25, an interval between a pair of the individualized portions 25, 25 constituting the sensed combination portions 24, 24 in the circumferential direction is changed continuously in all sensed combination portions 24, 24 in the same direction along the radial direction. In the illustrative example, the individualized portions 25, 25 are inclined such that the interval between a pair of individualized portions 25, 25 constituting the sensed combination portions 24, 24 in the circumferential direction is increased outward of the encoder 12c in the radial direction and also the interval between the individualized portions 25, 25 constituting the neighboring sensed combination portions 24, 24 in the circumferential direction is decreased outward of the encoder 12c in the radial direction.

As shown in FIG. 10, the output signal of the sensor whose sensing portion is opposed to the sensed surface of the above encoder 12c is changed in a moment the sensor faces to the individualized portions 25, 25. Then, the changing interval (period) is changed along with the positional change of the portion, to which the sensing portion of the sensor faces, in the radial direction.

For example, when the standard radial load (standard value) is applied between the stationary side raceway ring such as the outer ring, or the like and the rotary side raceway ring such as the hub, or the like, the sensing portion of the sensor scans the center portion of the sensed surface, as indicated by a chain line a in FIGS. 9 and 10. In this case, the output signal of the sensor is changed, as shown in FIG. 10(B).

In contrast, when the radial load applied between the stationary side raceway ring and the rotary side raceway ring is increased larger than the standard value, the sensing portion of the sensor scans the portion of the sensed surface located near the inner side in the radial direction, as indicated by a chain line β in FIGS. 9 and 10, for example. In this case, the output signal of the sensor is changed, as shown in FIG. 10(A).

In addition, when the radial load applied between the stationary side raceway ring and the rotary side raceway ring is decreased smaller than the standard value, the sensing portion of the sensor scans the portion of the sensed surface located near the outer side in the radial direction, as indicated by a chain line γ in FIGS. 9 and 10, for example. In this case, the output signal of the sensor is changed, as shown in FIG. 10(C).

As a result, in the case of the present embodiment, if the pattern (changing interval) of the output signal of the sensor is observed, an extent of displacement (amount of radial displacement) between the central axis of the stationary side raceway ring and the central axis of the rotary side raceway ring can be detected, and then the radial load applied between both raceway rings can be measured based on this extent of displacement.

Embodiment 5

Figure 11:
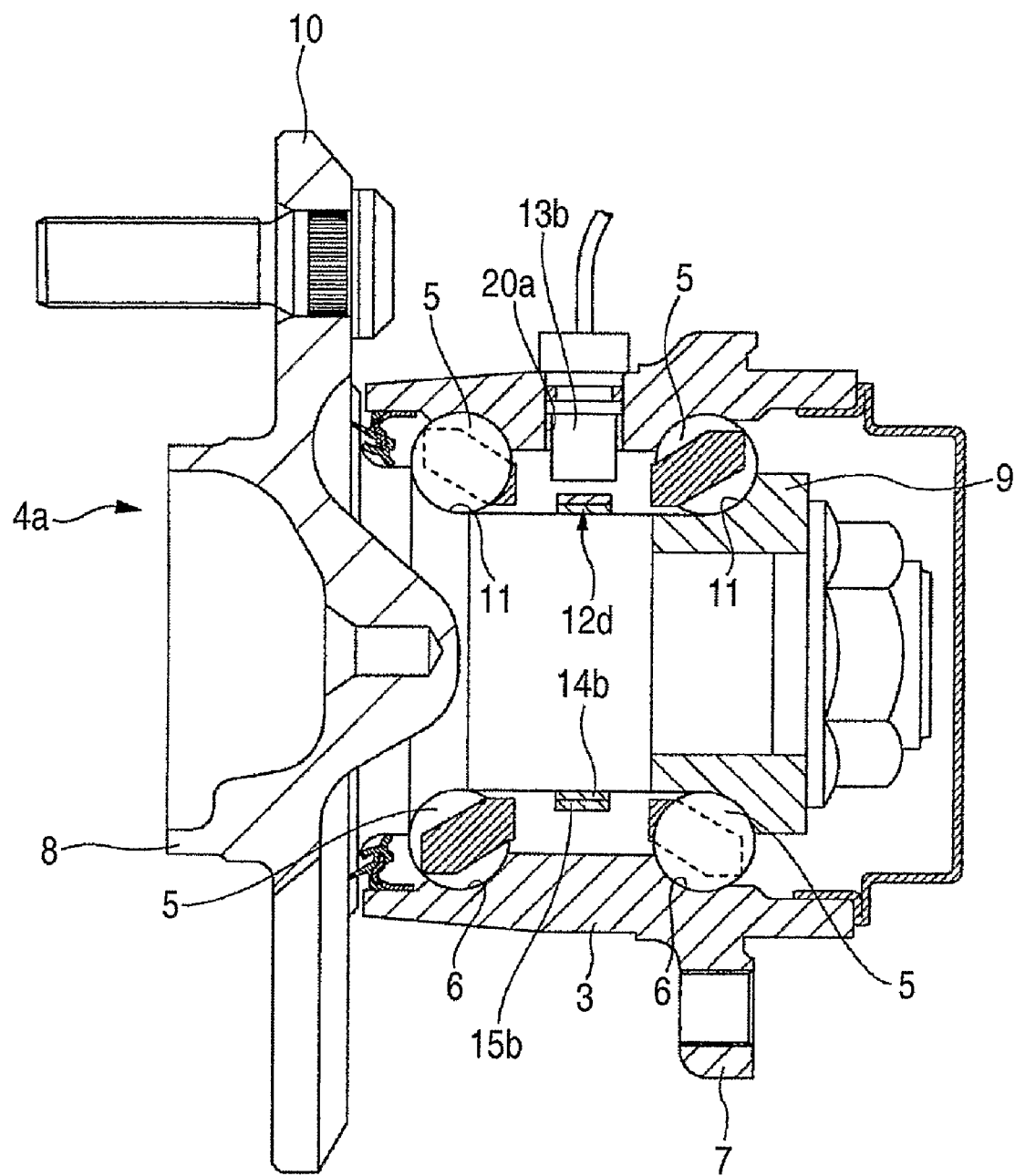
FIG. 11 is a sectional view showing an embodiment 5 of the present invention.

FIGS. 11 to 13 show an embodiment 5 of the present invention. In the case of the present embodiment, an encoder 12d is fitted/fixed onto a middle portion of the hub 4a in the axial direction between the rolling elements 5, 5 arranged in double rows. This encoder 12d is constructed as shown in FIG. 12(B) by rounding a stripe material shown in FIG. 12(A). A cylindrical encoder main body 15b is affixed/fitted onto an outer peripheral surface of a cylindrical supporting plate 14b over the full circumference.

The encoder main body 15b is made of the permanent magnet such as the rubber magnet, the plastic magnet, or the like, and is magnetized in the radial direction. The magnetized direction is changed alternately at an equal interval over the full circumference. Therefore, the N pole and the S pole are aligned alternately on the outer peripheral surface of the encoder main body 15b as the sensed surface at an equal interval. Out of them, the width of the portion magnetized as the N pole serving as the first sensed portion in the circumferential direction is widened in one end portion of the encoder main body 15b in the axial direction and is narrowed in the other end portion. In contrast, the width of the portion magnetized as the S pole serving as the second sensed portion in the circumferential direction is narrowed in one end portion of the encoder main body 15b in the axial direction and is widened in the other end portion.

A sensor 13b used together with such encoder 12d is inserted into the fitting hole 20a, which is formed in the middle portion out the outer ring 3 in the axial direction between double row outer ring raceways 6, 6, from the outside to the inside of the outer ring 3 in the radial direction. Then, the sensing portion provided to the top end surface of the sensor 13b is positioned in close vicinity to the outer peripheral surface of the encoder main body 15 to face thereto.

In the case of the present embodiment having such a structure, when the relative positions of the outer ring 3 and the hub 4a are displaced in the axial direction depending upon the variation of the axial load applied between the outer ring 3 and the hub 4a, the axial position of the portion of the outer peripheral surface, to which the sensing portion of the sensor 13b faces, of the encoder main body 15b is also changed. As a result, like the case of the above embodiment 1, the pattern according to which the output signal of the sensor 13b is changed is changed, as shown in FIG. 13. The relationship between the pattern, according to which the output signal of the sensor 13b is changed as shown in FIG. 13, and the magnitude of the axial load applied between the outer ring 3 and the hub 4a can be derived by the calculation or the experiment in the same way as the relationship between the radial load and the change in pattern of the output signal in the above embodiment 1. As a result, the magnitude of the axial load can be derived by observing the change in pattern of the output signal.

Embodiment 6

Figure 14:
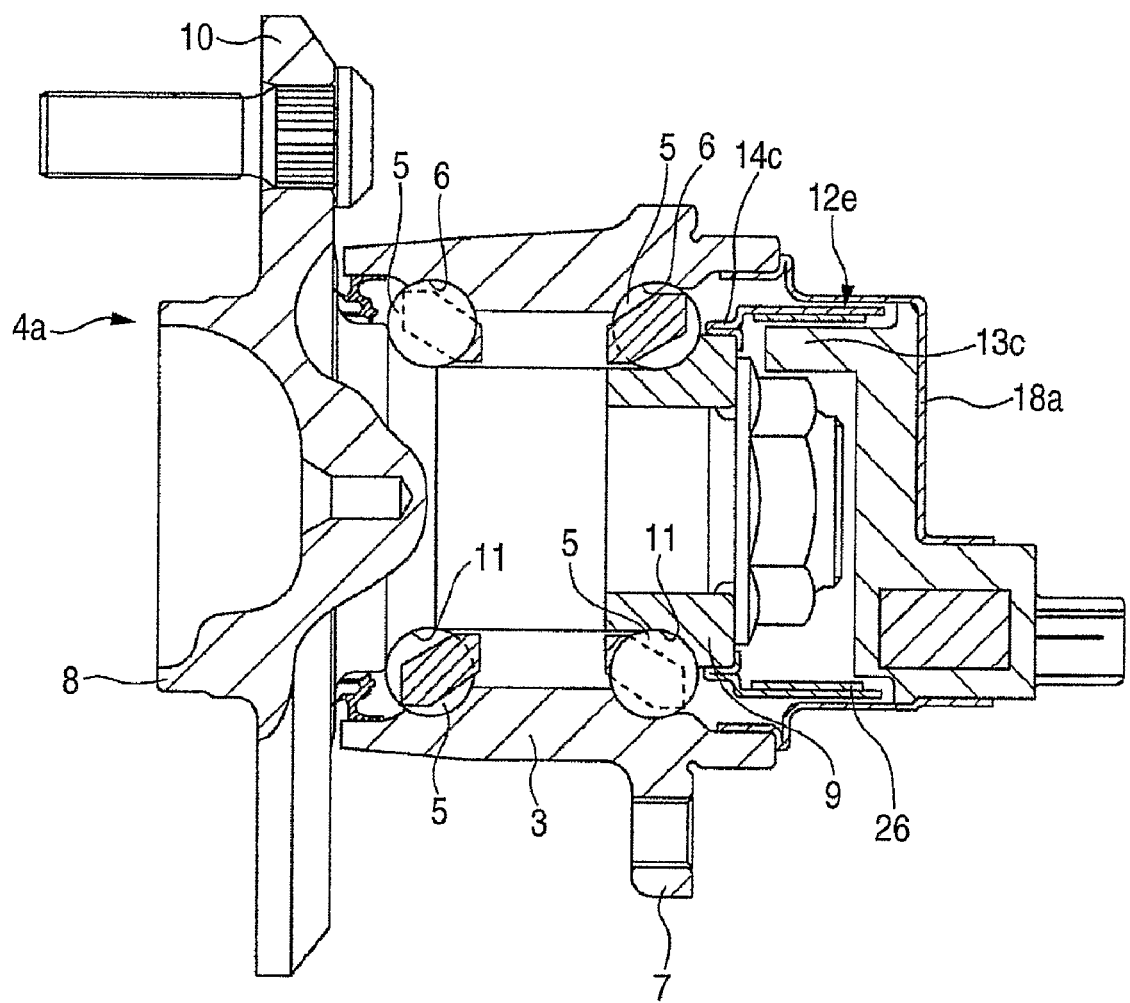
FIG. 14 is a sectional view showing an embodiment 6 of the present invention.

FIG. 14 shows an embodiment 6 of the present invention. In the case of the present embodiment, an encoder 12e is fitted/fixed onto the inner end portion of the hub 4a in the axial direction. This encoder 12e has a supporting plate 14c. Then, if either the encoder main body made of the permanent magnet, on an inner peripheral surface of which the N pole and the S pole are aligned alternately in a state that they are magnetized in the range of the sector or the trapezoid respectively, is affixed onto an inner peripheral surface of a circular cylinder portion 26 of the supporting plate 14c or the sectoral or trapezoidal through holes are formed in the circular cylinder portion 26, the function of the encoder can be provided to the circular cylinder portion 26 itself. Then, a sensing portion of a sensor 13c supported/fixed onto a cover 18a, which is secured to the inner opening portion of the outer ring 3, is positioned in close vicinity to the inner peripheral surface of the encoder 12e as the sensed surface to face thereto.

In the case of such embodiment, the magnitude of the axial load acting between the outer ring 3 and the hub 4a can also be measured by observing the change in pattern of the output signal of the sensor 13c.

Embodiment 7

Figure 15:
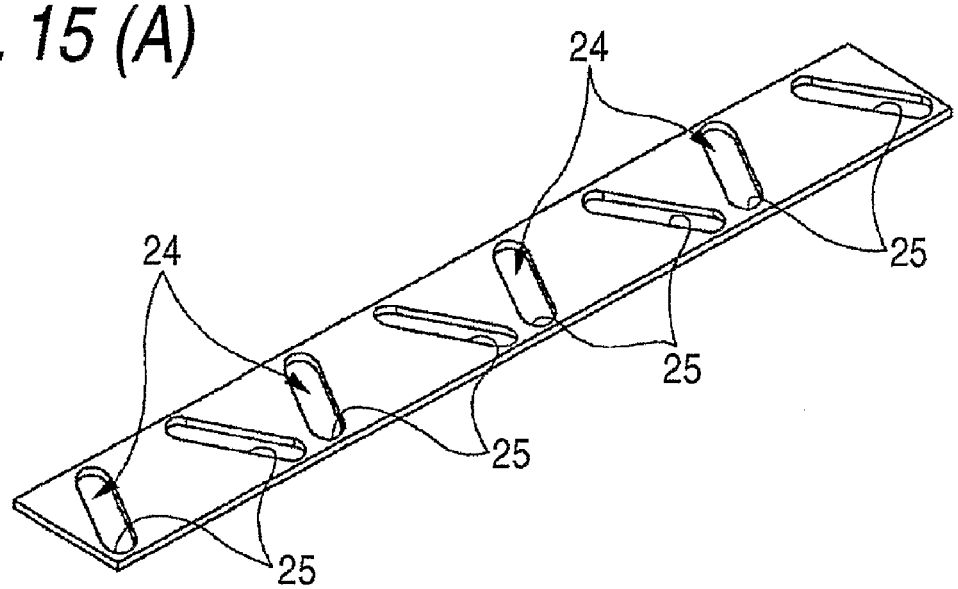
FIG. 15 are perspective views showing a material of an encoder that is built in an embodiment 7 of the present invention and its assembled state respectively.
Figure 15:
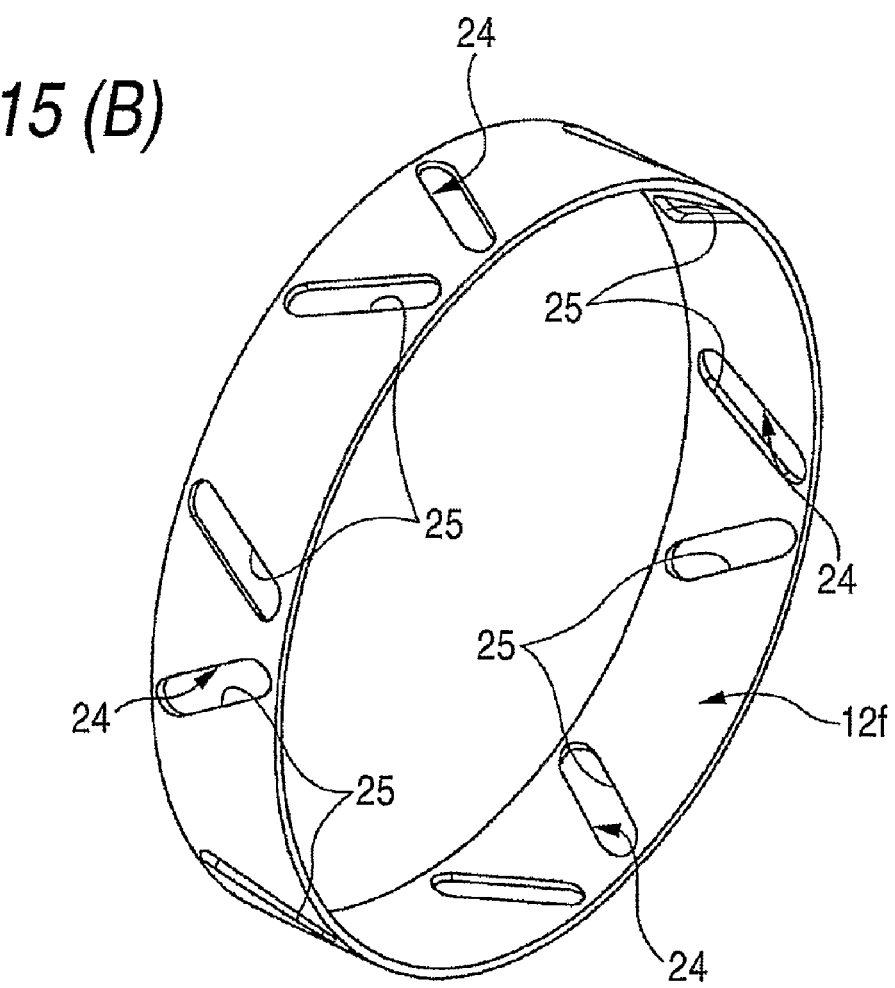

FIG. 15 shows an embodiment 7 of the present invention. In the present embodiment, the structure of the embodiment 4 shown in above FIGS. 8 to 10 is applied to detect the magnitude of the axial load. More particularly, in the case of the present embodiment, a plurality of sensed combination portions 24, 24 are arranged on an outer peripheral surface (or an inner peripheral surface) of a cylindrical encoder 12f as the sensed surface at an equal interval along the circumferential direction. These sensed combination portions 24, 24 are composed of a pair of individualized portions 25, 25 that has the characteristic different from other portions respectively. In the case of the present embodiment, the slit-like longitudinal holes are employed as such individualized portions 25, 25.

The encoder 12f having such individualized portions 25, 25 are constructed by rounding a stripe-like magnetic metal plate in which the longitudinal holes are formed previously by the punch working, as shown in FIG. 15(A), and then welding both end portions of the plate in the circumferential direction by means of the butt welding. Here, the concave holes as shown in above FIG. 8(B) or the bank-like convex portions as shown in FIG. 8(C) may also be employed as the individualized portions 25, 25. In the case of the present embodiment, like the case of the embodiment 4, the interval between a pair of the individualized portions 25, 25 constituting the sensed combination portions 24, 24 in the circumferential direction is changed continuously in all sensed combination portions 24, 24 in the same direction along the axial direction. In other words, the individualized portions 25, 25 are inclined in such a fashion that the interval between a pair of individualized portions 25, 25 constituting the sensed combination portions 24, 24 in the circumferential direction is decreased toward one end of the encoder 12f (right lower end in FIG. 15) in the axial direction and also the interval between the individualized portions 25, 25 constituting the neighboring sensed combination portions 24, 24 in the circumferential direction is increased toward the other end of the encoder 12f (left upper end in FIG. 15) in the axial direction.

Like the case of the above embodiment 4, as shown in FIG. 10, the output signal of the sensor, the sensing portion of which is opposed to the outer peripheral surface (or the inner peripheral surface) as the sensed surface of the above encoder 12f, is changed in a moment the sensor faces to the individualized portions 25, 25. Then, the changing interval (period) is changed along with the positional change of the portion, to which the sensing portion of the sensor faces, in the axial direction. As a result, in the case of the present embodiment, if the pattern of the output signal of the sensor is observed, an extent of displacement (amount of axial displacement) of the stationary side raceway ring and the rotary side raceway ring in the axial direction can be detected, and then the axial load applied between both raceway rings can be measured based on this extent of displacement. The approach of deriving the load based on the pattern of the output signal of the sensor is similar to the case in the embodiment 4 except that the to-be-detected load is exchanged from the radial load to the axial load.

In this case, the structure wherein the first sensed portion is a through hole or a concave hole, and the second sensed portion is in an interim position located between neighboring through holes or concave holes in the circumferential direction is not illustrated. However, if the structure of the circular ring encoder 12a shown in FIG. 6 is applied to the cylindrical encoder, the structure wherein the first sensed portion is a through hole or a concave hole, and the second sensed portion is in an interim position located between neighboring through holes or concave holes in the circumferential direction can be constructed in the same way as the case where the structure of the circular ring encoder 12c shown in FIG. 8(A) is applied to the cylindrical encoder 12f shown in FIG. 15(B).

Figure 16:
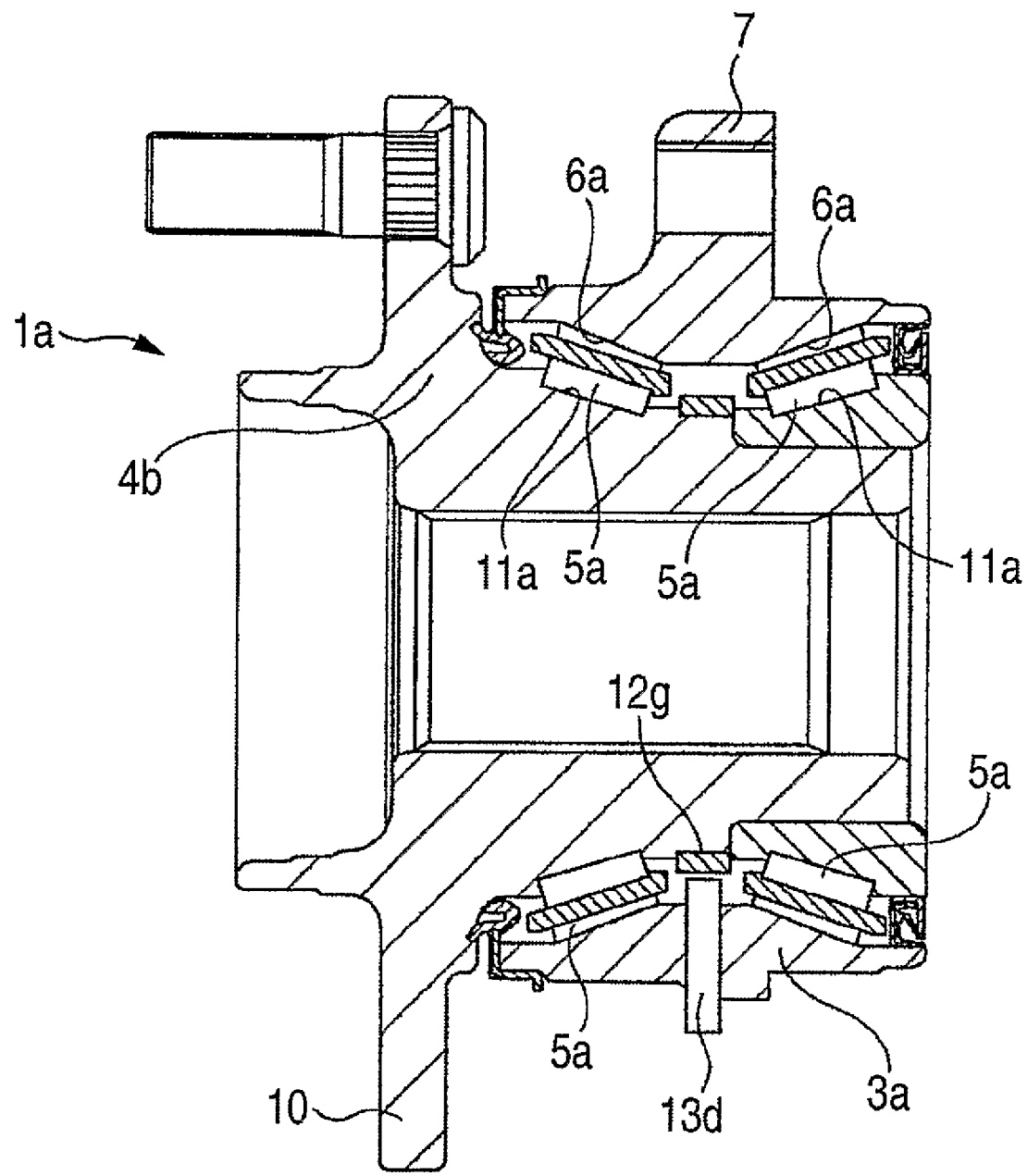
FIG. 16 is a sectional view showing an embodiment 8 of the present invention.
Figure 17:
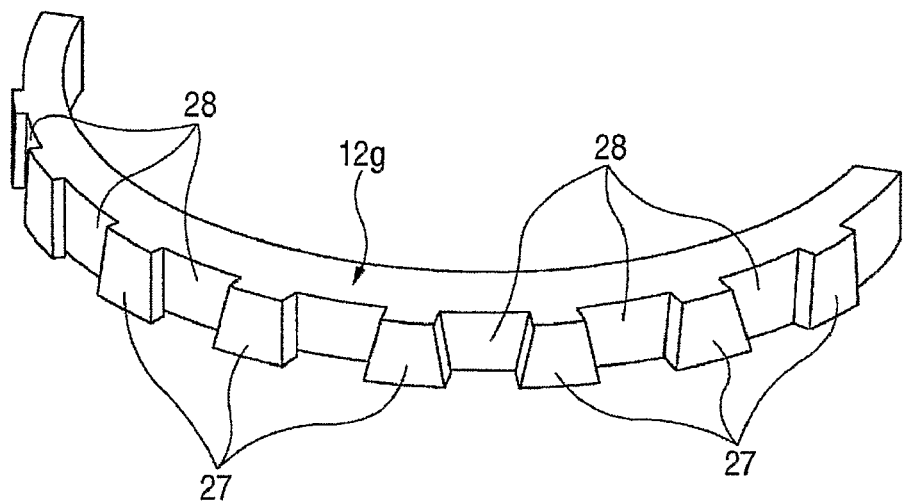
FIG. 17 is a fragmental perspective view of an encoder that is built in the embodiment 8.
Figure 18:
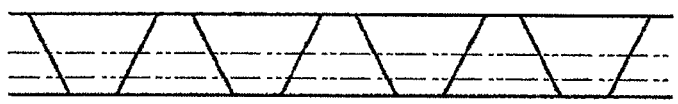
FIG. 18 are views showing a sensor output signal, which is changed together with a variation of an axial load, respectively.
Figure 18:
Figure 18:

FIGS. 16 to 18 show an embodiment 8 of the present invention. The present embodiment shows the case where the present invention is embodied in a driving wheel supporting rolling bearing unit 1a. Also, the tapered rollers are employed as rolling elements 5a, 5a in view of the case that this rolling bearing unit is incorporated into the vehicle whose weight is heavy. In the case of the present embodiment, an encoder 12g as shown in FIG. 17 is fitted/fixed onto the middle portion of the hub 4b between double row inner ring raceways 11a, 11a in the axial direction. This encoder 12g is made of the magnetic metal material formed like the circular ring as a whole, and also convex portions 27, 27 serving as the first sensed portion and concave portions 28, 28 serving as the second sensed portion are formed alternately at an equal interval on its outer peripheral surface in the circumferential direction.

In the case of the present embodiment having such structure, when relative positions of an outer ring 3a and a hub 4b are displaced in the axial direction following upon a variation of the axial load applied between the outer ring 3a, on the inner peripheral surface of which double row outer ring raceways 6a, 6a are formed, and the hub 4b, the axial position of the portion of the outer peripheral surface, to which the sensing portion of the sensor 13d supported onto the middle portion of the outer ring 3a in the axial direction faces, of the encoder 12g is changed. As a result, like the case of the above embodiment 5, a pattern according to which the output signal of the sensor 13d is changed (duty ratio) is changed as shown in FIG. 18. The relationship between the pattern according to which the output signal of the sensor is changed, as shown in FIG. 18, and the magnitude of the axial load applied between the outer ring 3a and the hub 4b can be derived by the calculation or based on the experiment, like the above embodiment 5. As a result, the magnitude of the axial load can be detected by observing the change in pattern of the output signal.

Now, if the structure in which the concave portion and the convex portion such as the frustum or the inverted frustum are aligned alternately in the circumferential direction, as in the present embodiment, is applied to the encoder on the side surface of which the sensed surface is formed in the axial direction, the present embodiment can be used to measure the radial load applied to the rolling bearing unit.

Embodiment 9

Figure 19:
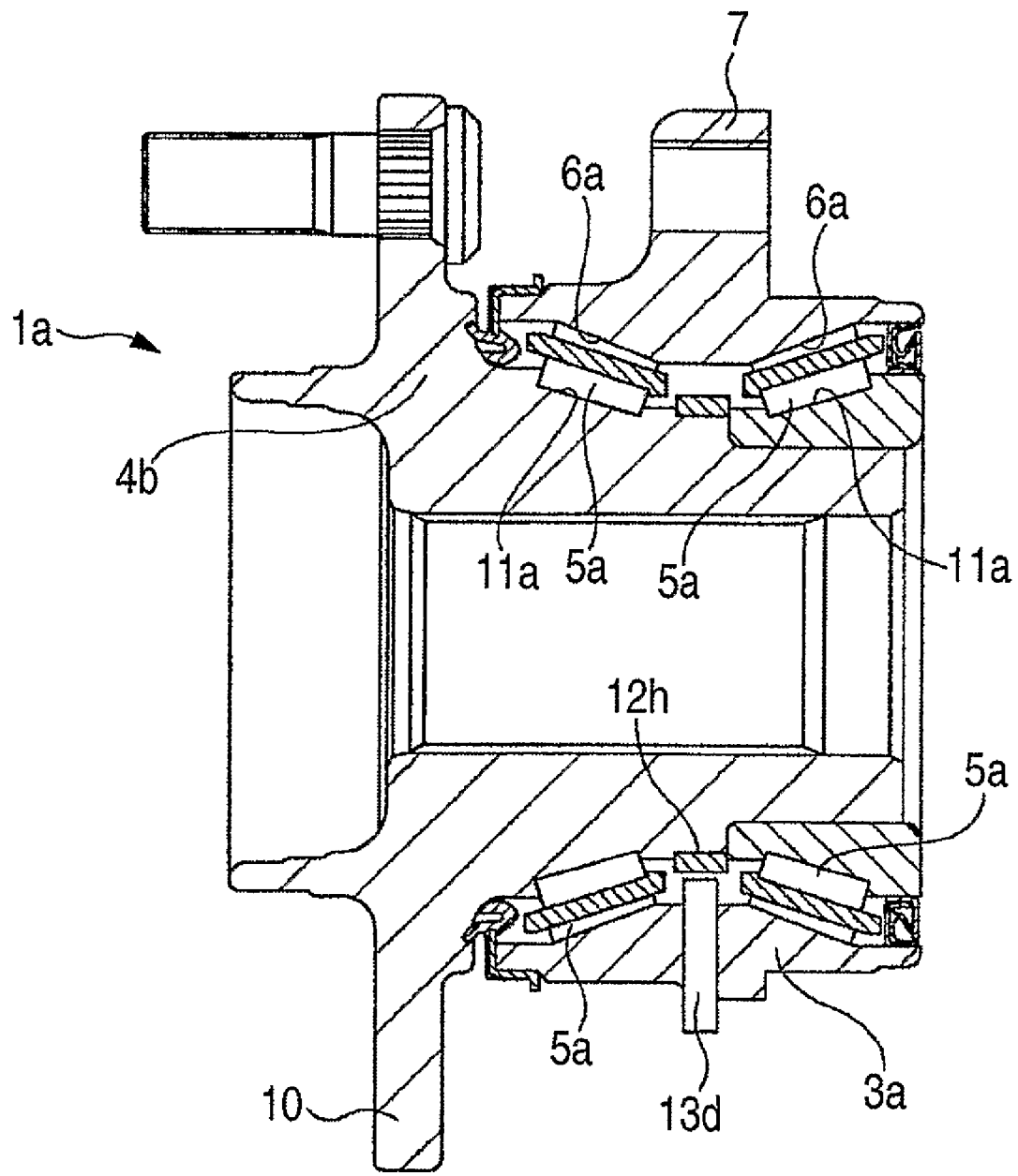
FIG. 19 is a sectional view showing an embodiment 9 of the present invention.
Figure 20:
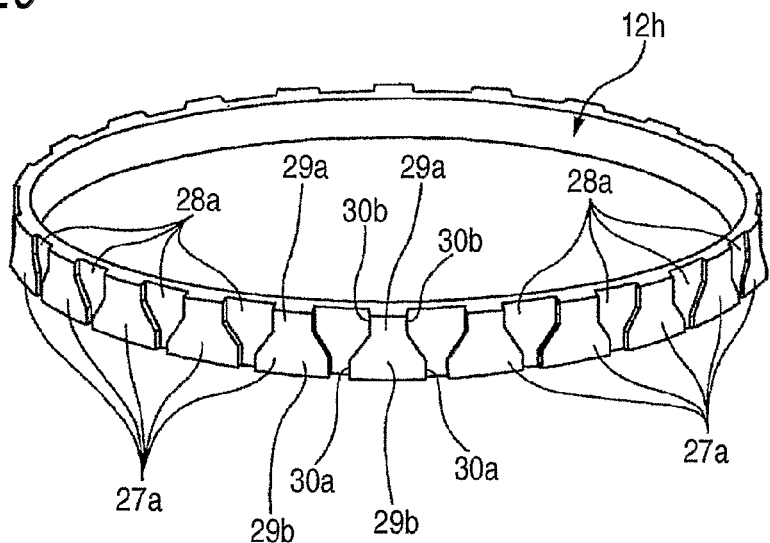
FIG. 20 is a perspective view of an encoder that is built in the embodiment 9.
Figure 21:
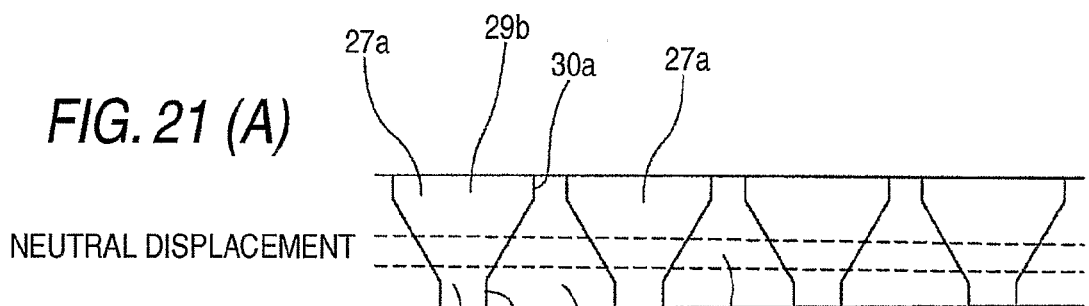
FIG. 21 are views showing a sensor output signal, which is changed together with a variation of an axial load, respectively.
Figure 21:
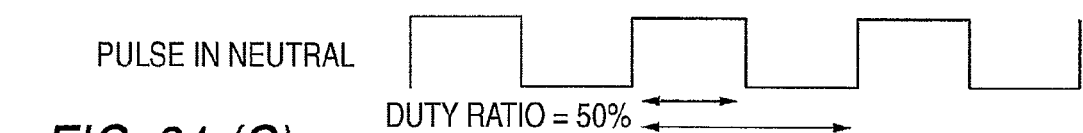
Figure 21:
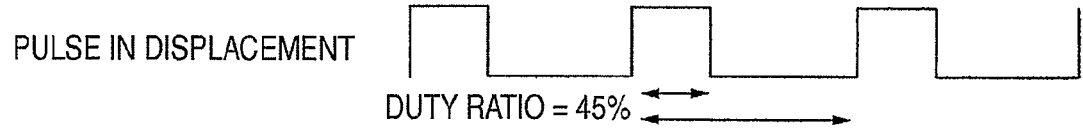

FIGS. 19 to 21 show an embodiment 9 of the present invention. The present embodiment intends to stabilize an output signal of a sensor 13d by devising respective shapes of convex portions 27a, 27a and concave portions 28a, 28a formed on an outer peripheral surface of an encoder 12h, which is fitted/fixed onto the middle portion of the hub 4b, on the basis of the structure in the above embodiment 8. In other words, in the case of the present embodiment, both end portions of the convex portions 27a, 27a and the concave portions 28a, 28a in the axial direction are formed as parallel portions 29a, 29b, 30a, 30b, a width direction of which in the circumferential direction is not changed along the axial direction of the encoder 12h respectively. Therefore, a pitch according to which the characteristic of the outer peripheral surface as the sensed surface of the encoder 12h is changed in the circumferential direction is varied depending on an axial position within a middle area of the outer peripheral surface in the axial direction, but such pitch is not varied in both end areas in the axial direction irrespective of the axial position.

In the case of the present embodiment, the reason why the output signal of the sensor 13d can be stabilized by providing the parallel portions 29a, 29b, 30a, 30b is given as follows. As described above, if the encoder which is made of the magnetic material and on the sensed surface of which the concave portion and the convex portion are formed is used as the encoder, the pitch of the characteristic change of the sensed surface can be set with high precision in contrast to the encoder made of the permanent magnet. However, in the case of the structure in the above embodiment 8, if the interval between the concave portion and the convex portion is reduced to shorten the pitch of the characteristic change, a flow of the magnetic flux flowing between the sensing portion and the sensed portion becomes unstable in a condition that the sensing portion of the sensor is positioned in vicinity of both end portions of the sensed portion of the encoder in the width direction (both end portions in the axial direction) to face thereto, and thus the output of the sensor is liable to become unstable. For example, when the pitch between the convex portions 27, 27 and the concave portions 28, 28 is shortened in the encoder 12g shown in FIG. 17, bases of the neighboring frustum convex portions 27, 27 in the circumferential direction come close to each other. In particular, in order to make the sensing of the rotation speed of the hub 4b possible even when the encoder 12g and the sensor 13d are displaced largely in the axial direction, if a height dimension of the frustum shape is increased to keep an allowable amount of relative displacement between the encoder 12g and the sensor 13d in the axial direction, such a tendency becomes remarkable that the bases of the neighboring frustum convex portions 27, 27 in the circumferential direction come close mutually, as described above.

In contrast, in the case of the present embodiment, it can be prevented by providing the parallel portions 29a, 29b, 30a, 30b that the bases of the neighboring frustum convex portions 27a, 27a in the circumferential direction come excessively close to each other. Also, even though the sensing portion of the sensor 13d opposes to the end portion, which corresponds to the bases of the convex portions 27a, 27a, of the outer peripheral surface of the encoder 12h in the axial direction, the output of the sensor 13d can be stabilized by stabilizing a flow of the magnetic flux that flows between the sensing portion of the sensor 13d and the sensed surface of the encoder 12h. Also, even though an amount of axial displacement of the hub 4b and the outer ring 3a is increased slightly largely, the rotation speed of the hub 4b can be sensed by the sensor 13d.

Both side edges of the parallel portions 29a, 29b, 30a, 30b in the circumferential direction are shaped linearly, but the shape of this portion is not always formed as the straight line. For example, according to a sensitivity or a sensing range (spot diameter) of the sensor 13d, the shape of this portion may be slightly inclined to the axial direction or may be formed like a circular arc with a large radius of curvature.

Also, the type of the structure of the sensor 13d, which is used in combination with the encoder 12h, is not particularly limited if the permanent magnet is built in the structure. In other words, the so-called passive type sensor constructed by winding a coil around the pole piece that guides the flow of the magnetic flux emitted from the permanent magnet, or the so-called active type sensor into which the magnetic sensing element whose characteristic is changed in response to the magnetic flux density is built may be employed. In this event, since a ratio of length dimensions of the convex portions 27a, 27a and the concave portions 28a, 28a, which are present on the outer peripheral surface of the encoder 12h respectively, in the rotating direction must be sensed under the condition that the sensing portion of the sensor 13d faces to the middle portion of the encoder 12f in the axial direction, as shown in FIG. 21, it is preferable from an aspect of sensing this ratio with high precision that the spot diameter of the sensor 13d should be formed smaller.

Since the structures and the operations of other portions are similar to those in the above embodiment 8, their redundant explanation will be omitted herein.

Embodiment 10

Figure 22:
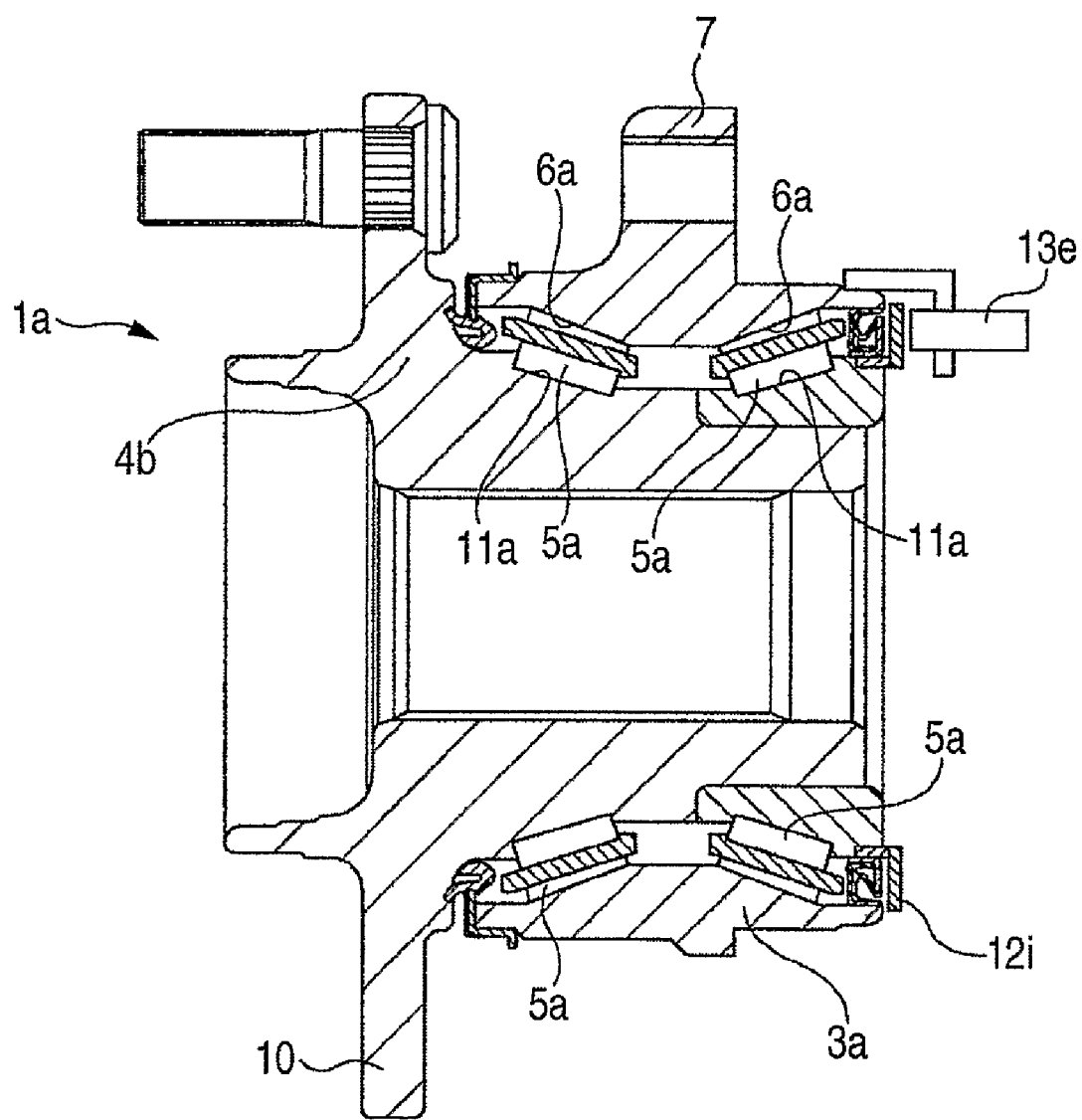
FIG. 22 is a sectional view showing an embodiment 10 of the present invention.
Figure 23:
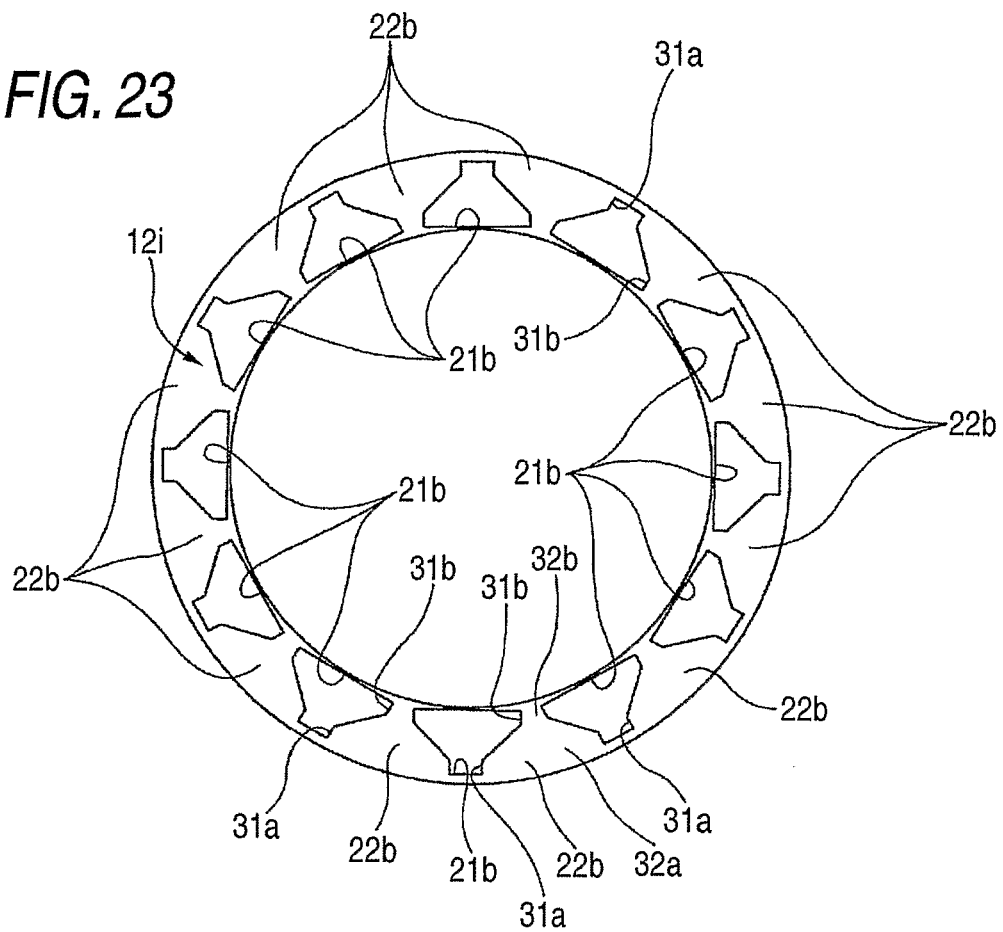
FIG. 23 is a front view of an encoder that is built in the embodiment 10.

FIGS. 22 and 23 show an embodiment 10 of the present invention. In the present embodiment, even when a sensing portion of a sensor 13e faces to the portion, which is located near the outer diameter side or the inner diameter side, of the sensed surface of the encoder, an output of the sensor 13e can be stabilized by devising the shape of the foregoing encoder shown in FIG. 6(A). In other words, in the case of the present embodiment, unchanged portions 31a, 31b, 32a, 32b are provided to both end portions on the inner diameter side and the outer diameter side of through holes 21b, 21b, which are formed in an encoder 12i made of the magnetic metal plate, and interim portions 22b, 22b respectively. Both edge portions of the unchanged portions 31a, 31b, 32a, 32b in the circumferential direction are present to direct in the diameter direction of the encoder 12i respectively. As a result, in the unchanged portions 31a, 31b, 32a, 32b, the pitch of the characteristic change in the rotating direction of the inner side surface of the encoder 12i serving as the sensed surface in the axial direction is not changed with respect to the radial direction.

In the case of the present embodiment, since the aspect of measuring the radial load is similar to the above embodiment 2 shown in FIG. 6 and also the aspect of stabilizing the output of the sensor 13e by stabilizing the flow of the magnetic flux is similar to the above embodiment 9, their redundant explanation will be omitted herein.

Embodiment 11

Figure 24:
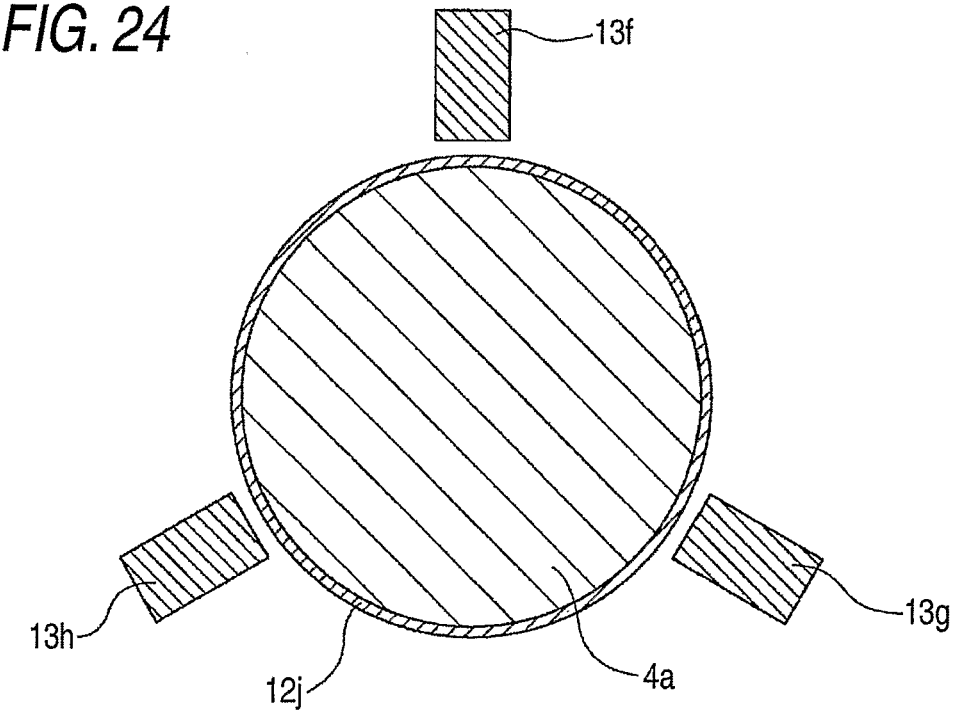
FIG. 24 is a fragmental sectional view showing an embodiment 11 of the present invention.

FIG. 24 shows an embodiment 11 of the present invention. In the case of the present embodiment, sensing portions of sensors 13f, 13g, 13h are caused to face to three positions on an outer peripheral surface of an encoder 12j, as the sensed surface, located at an equal space in the circumferential direction respectively. Then, the rotation speed of the hub 4a (see FIG. 11, for example), the axial load applied between the hub 4a and the outer ring 3 (see FIG. 11, for example), and a momental load applied between the hub 4a and the outer ring 3 can be measured by these sensors 13f, 13g, 13h. In this case, the momental load measured by the present embodiment is defined as a moment around a virtual axis that is perpendicular to the central axes of the hub 4a and the outer ring 3.

In the case of the present embodiment, not only the axial load applied between the hub 4a and the outer ring 3 but also the momental load applied between the hub 4a and the outer ring 3 can be measured. More specifically, as the result of application of the momental load between the hub 4a and the outer ring 3, the axial displacement caused between the hub 4a and the outer ring 3 appears differently in respective portions to which the sensing portions of the sensors 13f, 13g, 13h face when the central axis of the hub 4a and the central axis of the outer ring 3 are displaced. Then, the patterns according to which the output signals of the sensors 13f, 13g, 13h are changed (relationships among amplitudes of the output signals of these sensors 13f, 13g, 13h) become different in response to the direction of the momental load. Also, a difference between the output signals of the sensors 13f, 13g, 13h is increased as the momental load is increased. As a result, if the relationships among amplitudes of the output signals of these sensors 13f, 13g, 13h and relationships between the acting direction and the magnitude of the momental load are derived by the calculation or based on the experiment and then are input into the computational expressions of the software being installed into the arithmetic unit, not only the axial load applied between the hub 4a and the outer ring 3 but also the momental load applied between the hub 4a and the outer ring 3 can be measured.

For example, the axial loads applied to respective portions are measured based on the output signals of the sensors 13f, 13g, 13h, and then the momental load is calculated from the axial loads applied to respective portions and the diameter of the encoder 12j. Here, the axial load is calculated based on means values of the output signals of the sensors 13f, 13g, 13h, otherwise the axial load is calculated by averaging the axial loads that are calculated based on the output signals of the sensors 13f, 13g, 13h respectively. Then, like the case of other embodiments, signals representing the axial load and the momental load and the rotation speed of the hub 4a, as sensed in this manner, are fed to the controller of ABS or TCS, and are utilized to control the attitude stabilization of the vehicle.

Since the structures and the operations of other portions are similar to those in the above embodiment 5 shown in FIGS. 11 to 13 or the above embodiment 8 shown in FIGS. 16 to 18, for example, their redundant explanation will be omitted herein.

Embodiment 12

Figure 25:
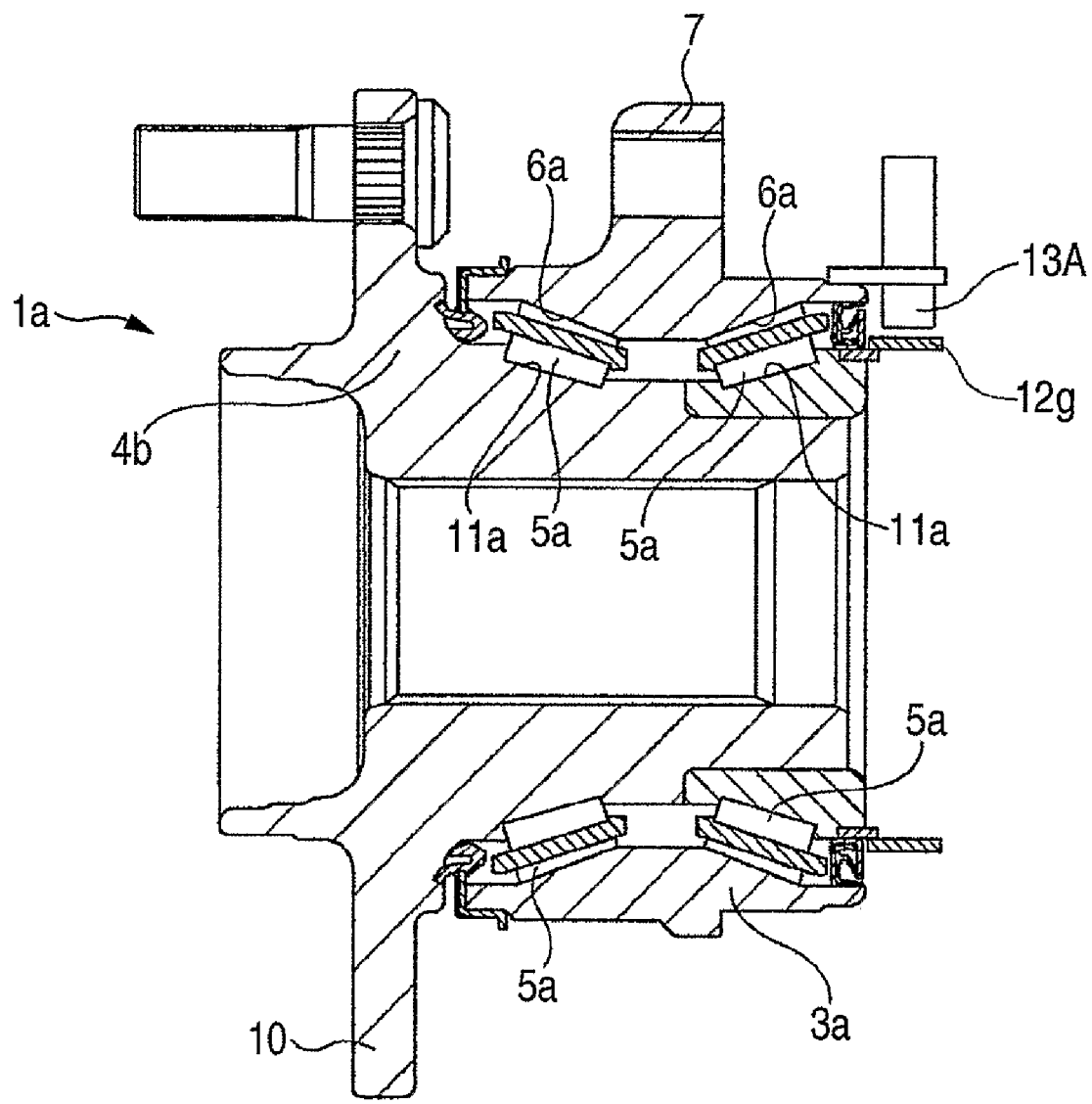
FIG. 25 is a sectional view showing an embodiment 12 of the present invention.
Figure 26:
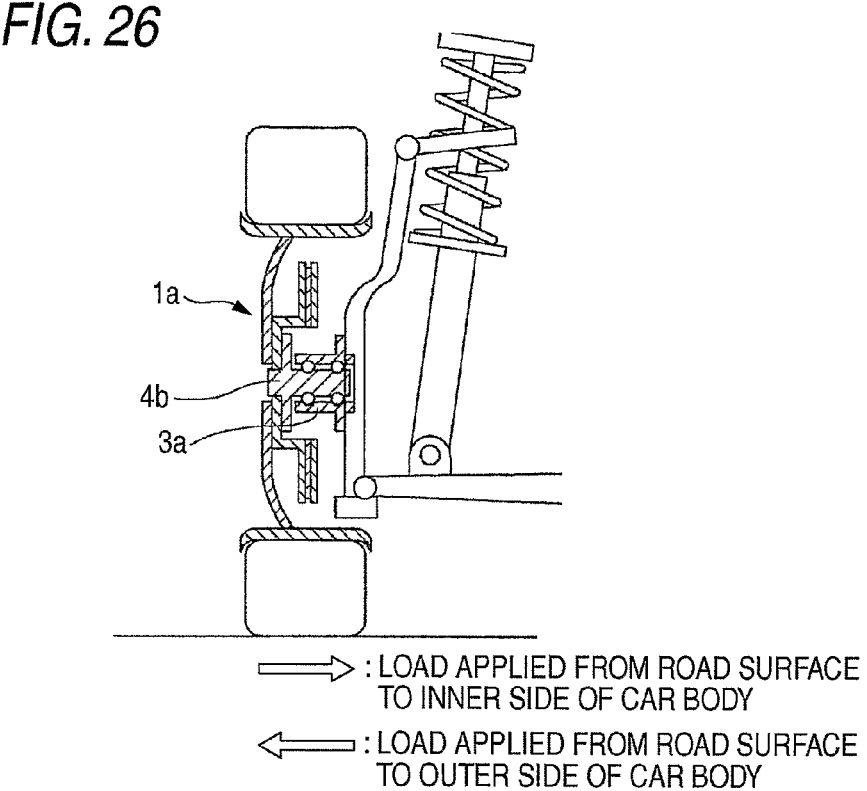
FIG. 26 is a schematic sectional view showing a fitting state of the embodiment 12 between a suspension system and a wheel.
Figure 27:
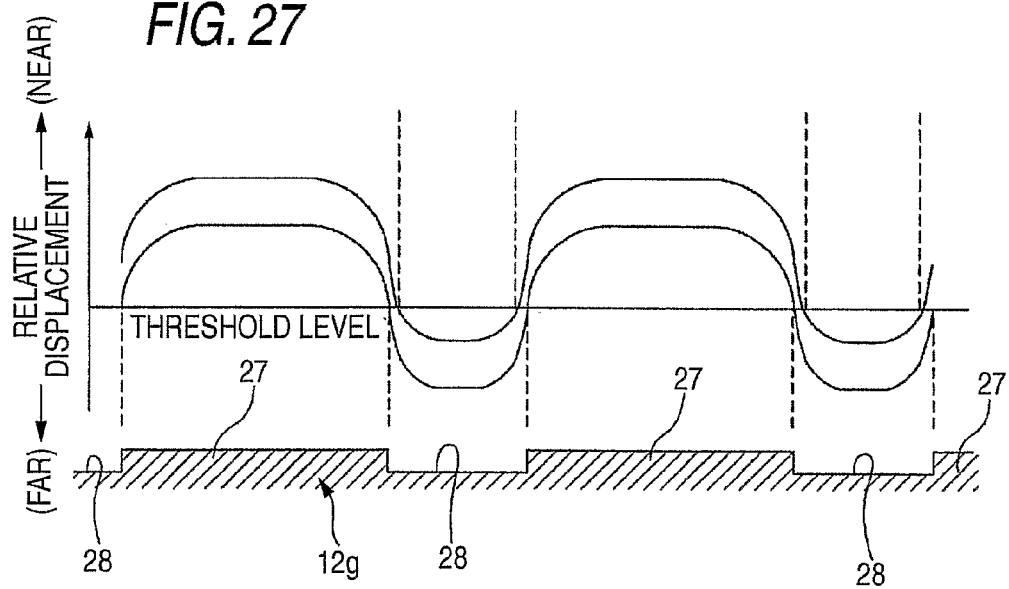
FIG. 27 is a chart explaining a variation of a sensor output signal in response to a displacement.

FIGS. 25 to 27 shows an embodiment 12 of the present invention. The present embodiment aims at improving a measuring precision of the axial load acting between the outer ring 3a and the hub 4b by devising the installing positions of the encoder 12g and a sensor 13A. First, the reason why the structure that takes such respects into account is required will be explained hereunder.

As described above, as shown in FIG. 17, if the encoder that is made of the magnetic material and on the sensed surface of which the concave portion and the convex portion are formed is used as the encoder, the pitch of the characteristic change of the sensed surface can be set with high precision rather than the encoder made of the permanent magnet. In this event, even when the encoder 12g, which is made of the magnetic material and on the sensed surface of which the convex portions 27, 27 and the concave portions 28, 28 both formed as the frustum respectively, are formed alternately, and the magnetic sensing type sensor are used in combination, an amount of change of a duty ratio of the output signal (ratio of a high level period and a low level period of the output signal voltage) of the sensor becomes minute. In order to measure precisely the above load based on the output signal of the sensor, the data processing using a filter such as a low-pass filter, a notch filter, an adaptive filter, or like is needed to correct (remove) the noise component contained in the output signal even though an amount of change of the duty ratio is minute in this manner. Since the data processing using the filter except the adaptive filter arises a response delay, such data processing is undesirable from an aspect of executing more precisely the running condition stabilizing control of the vehicle. Also, the adaptive filter does not occur a response delay but causes an increase in cost.

In light of these circumstances, it is preferable that the postprocessing executed by the filter that occurs a response delay and causes an increase in cost should be avoided to the utmost to reduce a level of the noise component contained in the output signal. In order to reduce the level of the noise component (to enhance an S/N ratio) relatively, a degree of change of the duty ratio of the output signal, which is changed based on the displacement caused by the sensed load, should be increased. For this purpose, it may be considered that an inclination angle of boundary portions (stepped portions) between the convex portions 27, 27 and the concave portions 28, 28 to the axial direction should be increased. If this inclination angle is increased, an amount of change of the duty ratio per unit displacement can be increased in answer to the displacement of the encoder 12g in the axial direction. However, if the inclination angle is increased, the number of the convex portions 27, 27 and the concave portions 28, 28 that can be formed on the overall circumference of the encoder 12g is reduced (a width of one pitch of the characteristic change is expanded), and thus the number of times at which the output signal of the sensor 13A is changed during one revolution of the encoder 12g (the number of pulses) is reduced. As a result, because such structure is disadvantageous from an aspect of real-time measurement of the load that acts between the outer ring 3a and the hub 4b, such structure cannot be employed according to the conditions.

The present embodiment is created in view of the above circumstances such that a change of the duty ratio of the output signal of the sensor 13A per unit displacement of the encoder 12g is increased not to increase particularly the inclination angle of the boundary portions to the axial direction, which can lead to the good-precision measurement of the displacement of the encoder 12g and in turn the axial load.

In the case of the present embodiment, in light of the above circumstances, the encoder 12g on the outer peripheral surface as the sensed surface of which the convex portions 27, 27 and the concave portions 28, 28 are arrange alternately is fitted/fixed onto the inner end portion of the hub 4b as the rotary side raceway ring in the axial direction. The sensor 13A supported onto the stationary portion such as the outer ring 3a, the knuckle constituting the suspension system, or the like is positioned over the encoder 12g such that the sensing portion of this sensor 13A opposes to the top end portion of the outer peripheral surface of the encoder 12g in the radial direction. Also, out of the convex portions 27, 27 and the concave portions 28, 28 formed on the outer peripheral surface of the encoder 12g, the width of the concave portions 28, 28 in the circumferential direction is widened on the inner end side (right side in FIG. 25) in the axial direction and is narrowed on the outer end side (left side in FIG. 25). In the case of the present embodiment, according to such structure, the change of the duty ratio of the output signal of the sensor 13A per unit displacement of the encoder 12g can be increased and thus the displacement of the encoder 12g and in turn the axial load can be measured with good precision.

More particularly, as shown in FIG. 26, since the wheel supporting rolling bearing unit 1a has a predetermined height (radius of the wheel) from the road surface, the axial load generated between the outer peripheral surface of the wheel (tire) of the car and the road surface acts on the wheel supporting rolling bearing unit 1a as the load containing the momental load. Then, the relative displacement is generated between the hub 4b and the outer ring 3a by the load containing the momental load. For example, in case the axial load acts to the inner side of the car body (the rightward direction in FIG. 25) from the road surface, there is such a tendency that the overall hub 4b is displaced to the inner side of the car body and at the same time this hub 4b is swung counterclockwise FIG. 25 in by the momental load. As a result, the encoder 12g is displaced rightward in FIG. 25 and also displaced upward. In this fashion, the axial load is applied between the hub 4b and the outer ring 3a as the load containing the momental load, and thus the hub 4b and the outer ring 3a are relatively displaced. In this case, it is effective in increasing the change of the duty ratio of the output signal that the direction of the relative displacement between the encoder 12g and the sensor 13A caused based on the momental load should be mated with the direction of the relative displacement between the encoder 12g and the sensor 13A caused based on the axial load. The present embodiment is invented from the above viewpoint.

As apparent from explanation of the embodiment 8 shown in above FIGS. 16 to 18, the duty ratio of the output signal of the sensor 13A is changed when the encoder 12g is displaced rightward. At the same time, this duty ratio is also changed when the encoder 12g is displaced upward. The situation that the duty ratio is changed when the encoder 12g is displaced upward in this manner is explained with reference to FIG. 27. An ordinate of FIG. 27 denotes the relative displacement between the sensing portion of the sensor 13A and the outer peripheral surface (sensed surface) of the encoder 12g. In this case, it may be considered similarly that this ordinate of FIG. 27 denotes the magnetic flux density. In any event, in case the shear drop or the chamfer is present on the boundary portions between the convex portions 27, 27 and the concave portions 28, 28 formed on the outer peripheral surface of the encoder 12g or in case the diameter (spot diameter) of the sensing portion of the sensor 13A is large, the waveform of the output signal of the sensor 13A does not appear as the perfect rectangular wave but the waveform comes close to the sinusoidal wave.

In case the waveform of the output signal takes such sinusoidal wave, the waveform shown in FIG. 27 is offset as a whole when the encoder 12g is displaced to the sensor 13A side under the condition a threshold level used to discriminate the leading edge and the trailing edge of the output signal has a constant value. In other words, since a distance between the sensed surface of the encoder 12g and the sensing portion of the sensor 13A is shortened, a voltage level of the output signal is raised as a whole. As can be seen apparently from intersection points between an upper curve in FIG. 27 and the threshold level, a rate of the portion that is identified as the convex portions 27, 27, which is occupied in one period of the output signal, is increased under this condition and then the duty ratio is changed. That is, unless the output signal is displaced in the axial direction (lateral direction), the duty ratio of the output signal of the sensor 13A is changed.

As apparent from the above explanation, as shown in FIG. 25, in the case where the sensor 13A is arranged over the encoder 12g, when the encoder 12g is displaced upward and thus the distance (gap) between the outer peripheral surface of the encoder 12g and the sensing portion of the sensor 13A is reduced, a rate of the portion that is identified as the convex portions 27, 27, which is occupied in one period of the output signal of the sensor 13A, is increased. Therefore, if the encoder 12g is built in the bearing unit such that the displacement of the encoder 12 generated based on the axial load, which acts as the load containing the momental load and is directed to the inner side (right side in FIG. 25) in the axial direction, causes the rate of the convex portions 27, 27 to increase, the change of the duty ratio of the output signal can be enhanced by mating the direction of the relative displacement between the encoder 12g and the sensor 13A based on the momental load with the direction of the relative displacement between the encoder 12g and the sensor 13A based on the axial load. Except that the direction is reversed in the above explanation, the same is true of the case where the axial load is applied from the road surface to the outside of the car body (left side in FIG. 25).

Embodiment 13

Figure 28:
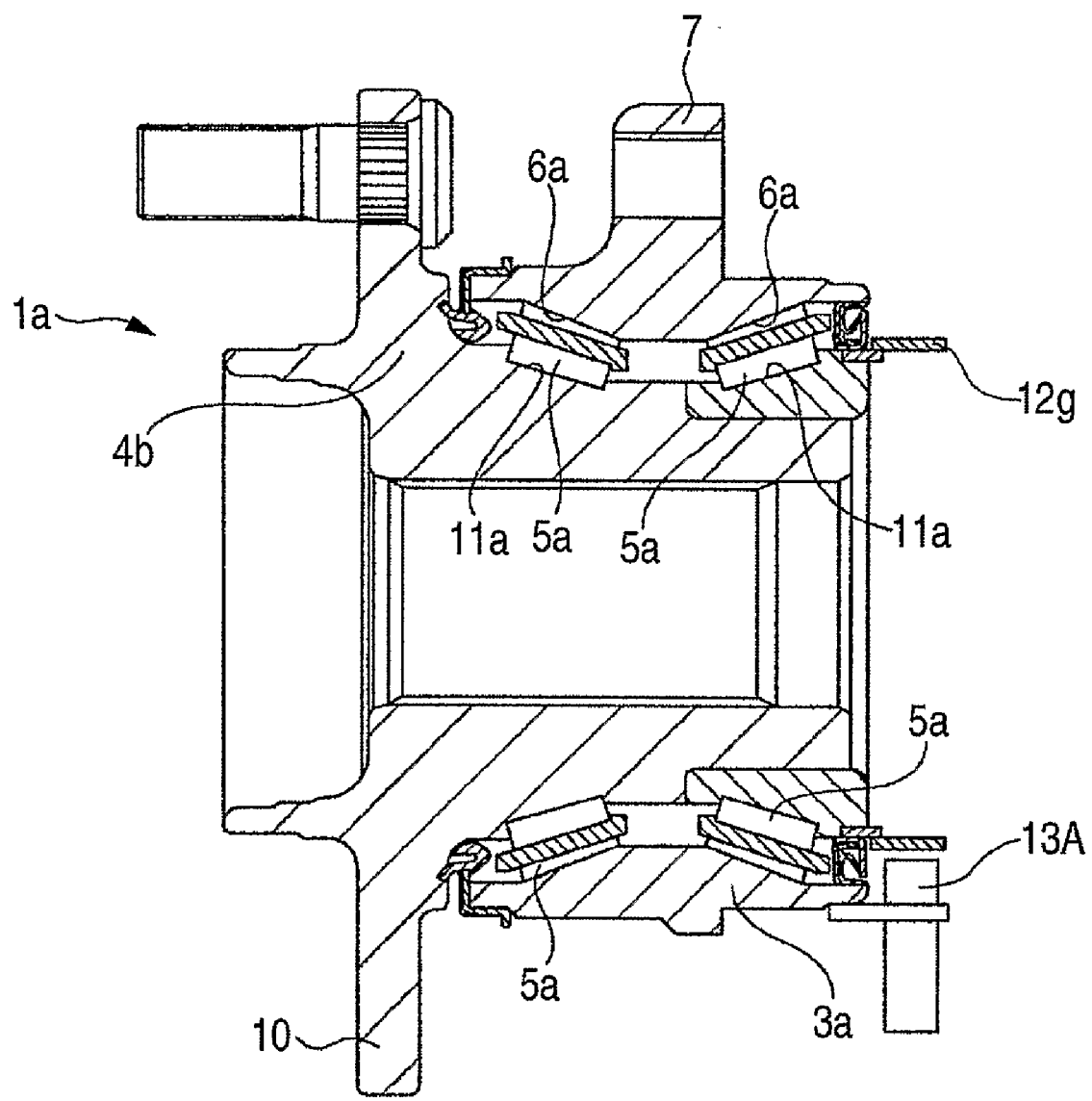
FIG. 28 is a sectional view showing an embodiment 13 of the present invention.

FIG. 28 shows an embodiment 13 of the present invention. In the case of the present embodiment, the sensor 13A is arranged below the encoder 12g such that the sensing portion of the sensor 13A is opposed to the lower end portion of the outer peripheral surface of the encoder 12g, which serves as the sensed surface. Also, out of the convex portions 27, 27 and the concave portions 28, 28 formed on the outer peripheral surface of the encoder 12g (see FIGS. 17, 27), the width of the concave portions 28, 28 in the circumferential direction is widened on the outer end side in the axial direction and is narrowed on the inner end side. In other words, in the case of the present embodiment, the installing position of the sensor 13A is turned upside down from the embodiment 12 and also the arrangement of the concave portions 28, 28 is turned inside out from the embodiment 12.

In the case of such embodiment, the change of the duty ratio of the output signal of the sensor 13A can be enhanced by mating the direction of the relative displacement between the encoder 12g and the sensor 13A based on the momental load with the direction of the relative displacement between the encoder 12g and the sensor 13A based on the axial load. If the sensor 13A is arranged below the encoder 12g like the present embodiment, the lateral displacement generated by the axial load coincides with the direction of the lateral displacement generated by the momental load, and thus such arrangement is desirable from an aspect of assuring a measuring precision of the load. In this case, if the sensor 13A is arranged below the encoder 12g, this sensor 13A is liable to be damaged by the foreign matter such as the pebble that the wheel splashes up, or the like. Therefore, the installing position and the installing direction of respective parts 13A, 12g are decided while taking the strength of the sensor 13A, or the like into account.

Embodiment 14

Figure 29:
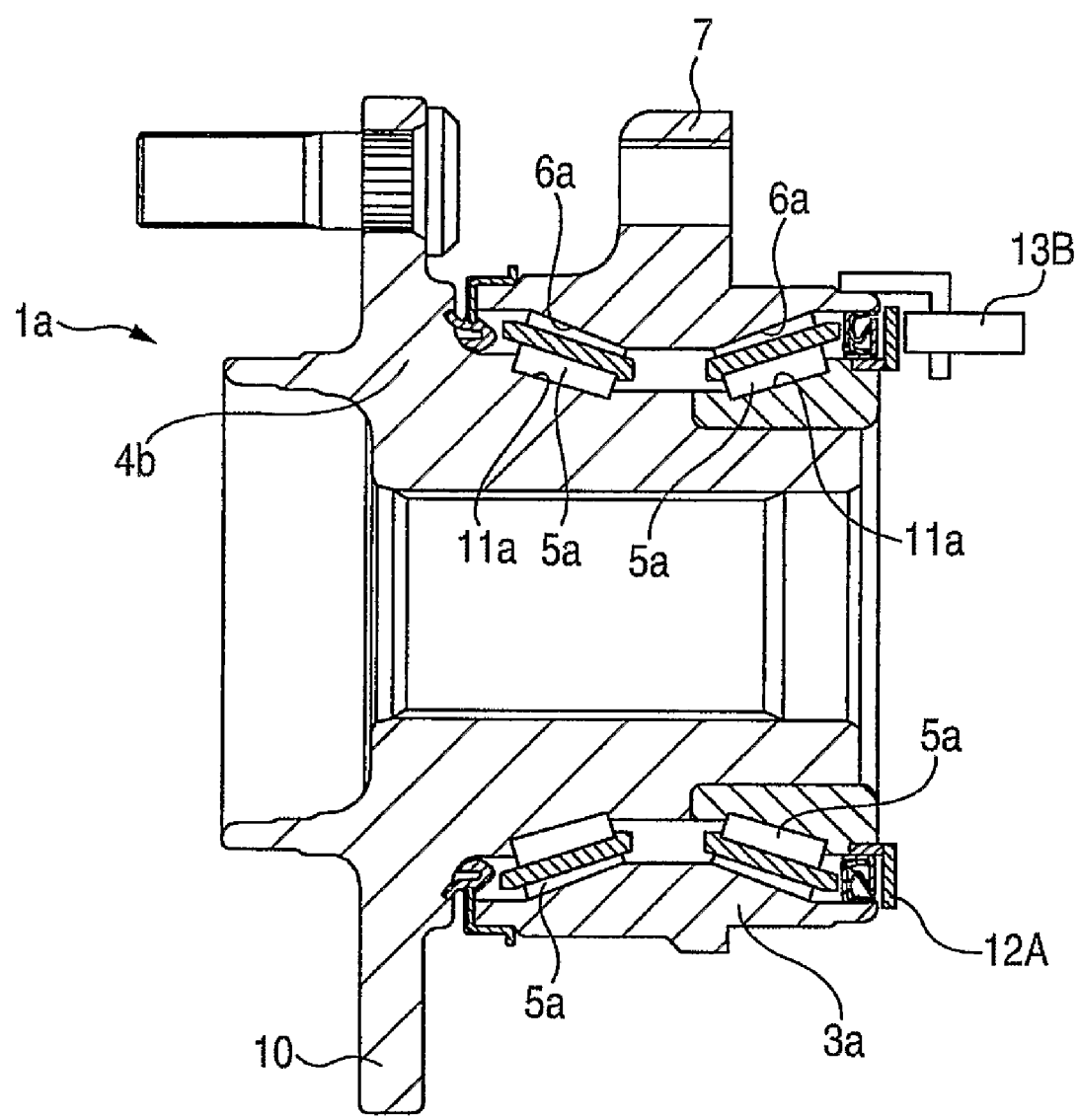
FIG. 29 is a sectional view showing an embodiment 14 of the present invention.

FIG. 29 shows an embodiment 14 of the present invention. In the case of the present embodiment, an encoder 12A having the inner side surface as the sensing surface, on which the convex portions and the concave portions are aligned alternately, is fixed to the inner end portion of the hub 4b as the rotary side raceway ring in the axial direction. A sensing portion of a sensor 13D is caused to face to an upper area of the sensed surface that is present on the inner side surface of the encoder 12A in the axial direction. Also, out of the convex portions and the concave portions formed on the sensed surface of the encoder 12A, the width of the concave portions in the circumferential direction is widened on the outer end side in the radial direction and also is narrowed on the inner end side.

In order to measure the axial load applied to the wheel supporting rolling bearing unit 1a from the wheel, it is preferable that, as shown in FIGS. 25 to 28, the sensor 13A is opposed to the sensed surface, which exists on the peripheral surface of the cylindrical encoder 12g, in the radial direction to sense the change of the duty ratio of the output signal of the sensor 13A caused based on the axial load. However, in some cases the sensor 13A is opposed to the encoder 12A in the axial direction, as shown in FIG. 29, because the encoder 12g and the sensor 13A are not built in owing to the restriction of the installing space, and the like. As described above, the axial load applied to the wheel supporting rolling bearing unit 1a from the contact portion between the outer peripheral surface of the wheel and the road surface acts to the wheel supporting rolling bearing unit 1a as the load containing the momental load. Therefore, like the above, the structure in which the sensor 13B is opposed to the encoder 12A in the axial direction can also measure the axial load.

In case the axial load being directed to the inner side (right side in FIG. 29) from the road surface in the axial direction, for example, is applied to the wheel supporting rolling bearing unit 1a by such structure, the encoder 12A is displaced rightward based on the axial load, and thus a distance (gap) between the sensed surface of the encoder 12A and the sensing portion of the sensor 13B is reduced. At the same time, the encoder 12A is also displaced upward by the momental load. Therefore, if the direction (tendency) along which the duty ratio of the output signal of the sensor 13B is changed by the upward displacement caused by the momental load and the direction the duty ratio is changed due to a reduction of the distance caused by the axial load are arranged in the same direction, the change of the duty ratio can be enhanced as a whole.

As described above, when the distance is reduced, a rate of the portion recognized as the convex portion, which is occupied in one period of the output signal, is increased. Therefore, if the concave and convex portions formed on the inner surface of the encoder 12A are set in such a manner that a rate of the portion recognized as the convex portion is increased in response to the upward displacement of the encoder 12A, the change of the duty ratio of the output signal of the sensor 13B following upon the change of the axial load (containing the momental load) can be increased. As a result, like the present embodiment, if the sensor 13B is installed over the encoder 12A and also the width of the concave portions out of the concave and convex portions formed on the sensed surface of the encoder 12A in the circumferential direction is set wide on the outer end side in the radial direction and is set narrow on the inner end side, the change of the duty ratio of the output signal can be enhanced by reconciling the direction of the relative displacement between the encoder 12A and the sensor 13B based on the momental load with the direction of the relative displacement between the encoder 12A and the sensor 13B based on the axial load.

Embodiment 15

Figure 30:
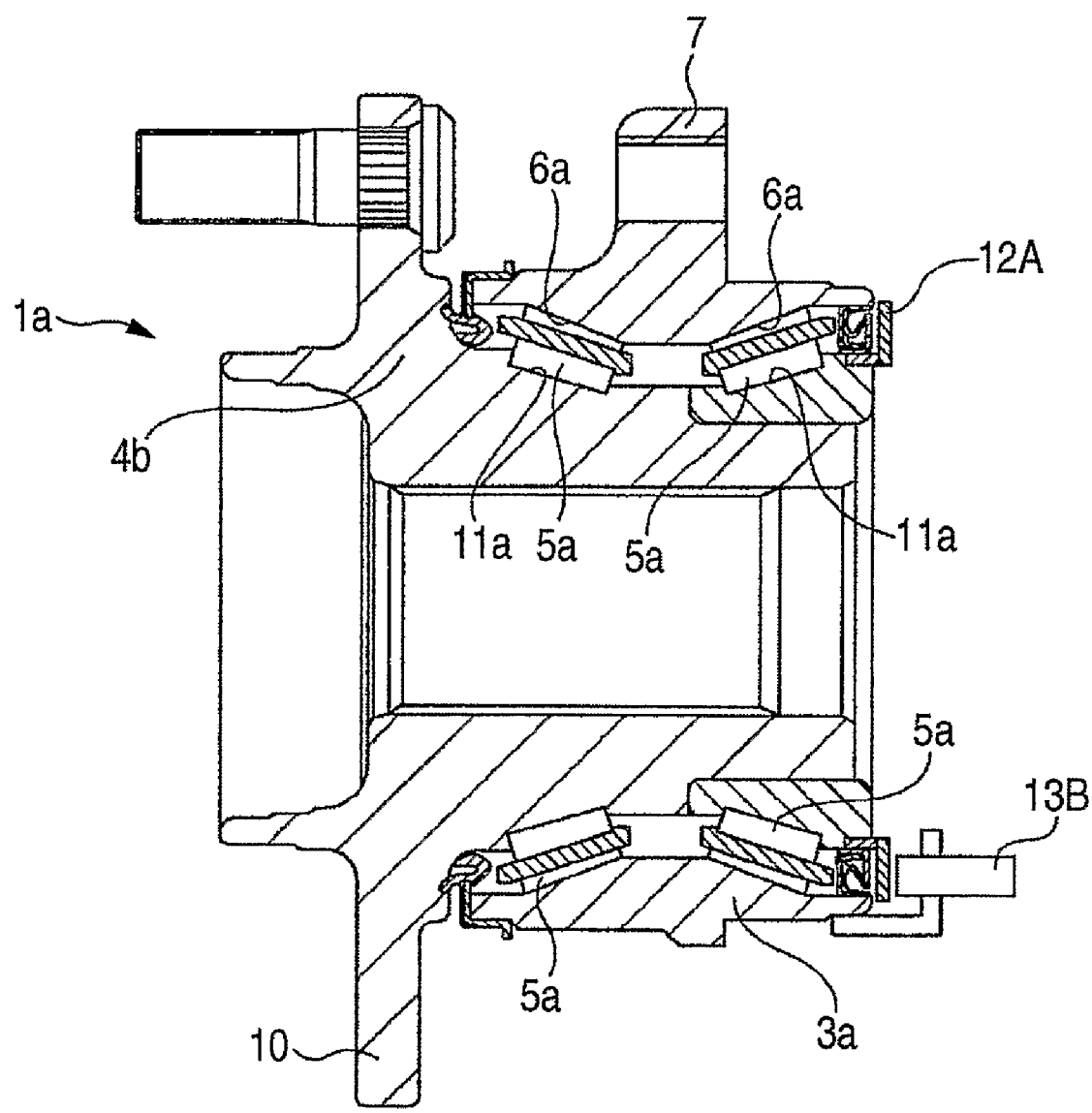
FIG. 30 is a sectional view showing an embodiment 15 of the present invention.

FIG. 30 shows an embodiment 15 of the present invention. In the case of the present embodiment, the sensing portion of the sensor 13D is opposed to a lower portion of the sensed surface, which is present on the inner surface in the axial direction, of the encoder 12A in the axial direction. Also, the width of the concave portions out of the concave and convex portions formed on the sensed surface of the encoder 12A in the circumferential direction is widened on the inner side in the radial direction and is narrowed on the outer side. In other words, in the case of the present embodiment, the installing position of the sensor 13B is turned upside down from the above embodiment 14 and also the arrangement of the concave portions is turned inside out with respect to the radial direction.

In the case of the present embodiment, the change of the duty ratio of the output signal of the sensor 13B can be enhanced by mating the direction of the relative displacement between the encoder 12A and the sensor 13B based on the momental load with the direction of the relative displacement between the encoder 12A and the sensor 13B based on the axial load.

Embodiment 16

Figure 31:
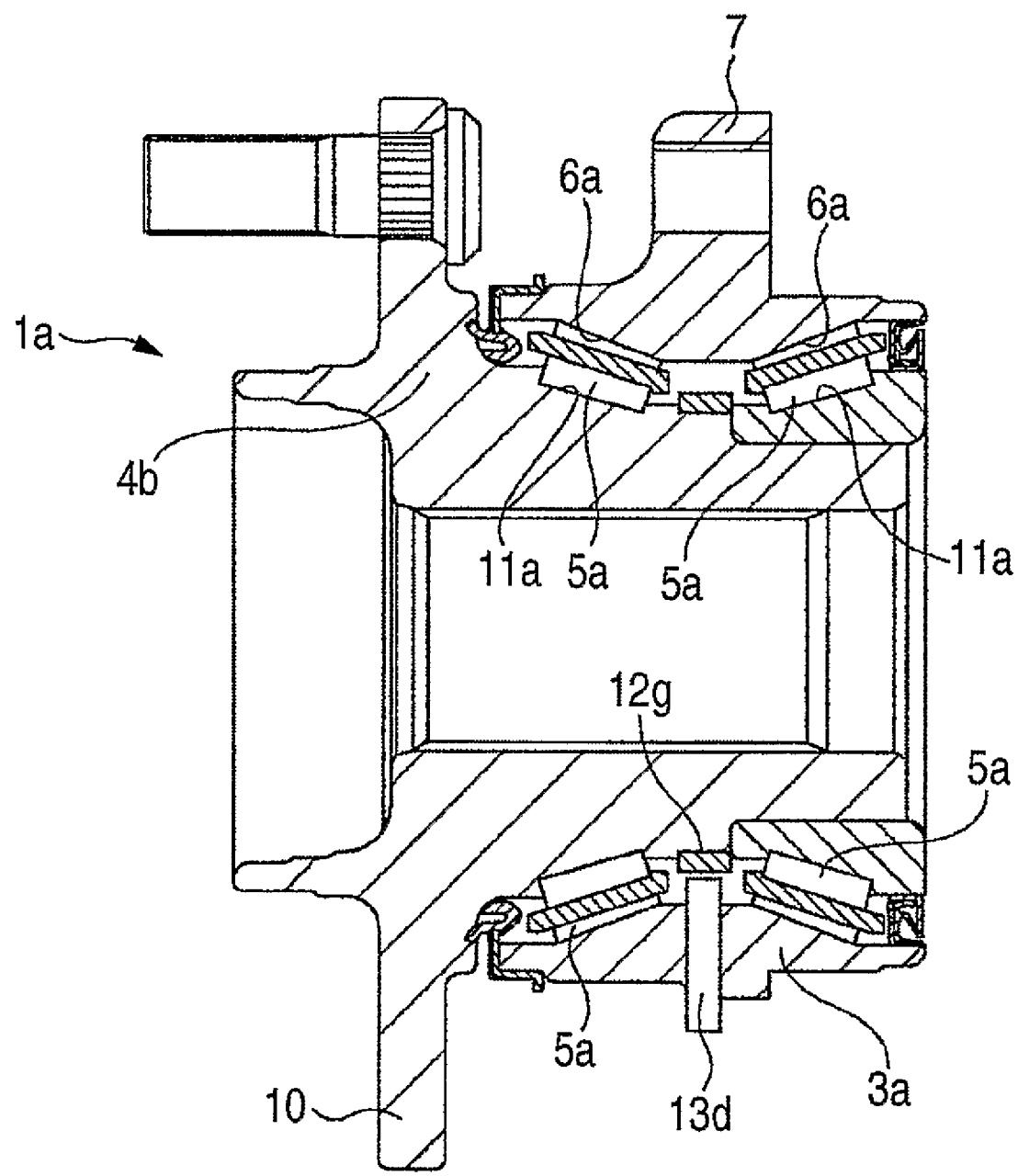
FIG. 31 is a sectional view showing an embodiment 16 of the present invention.
Figure 32:
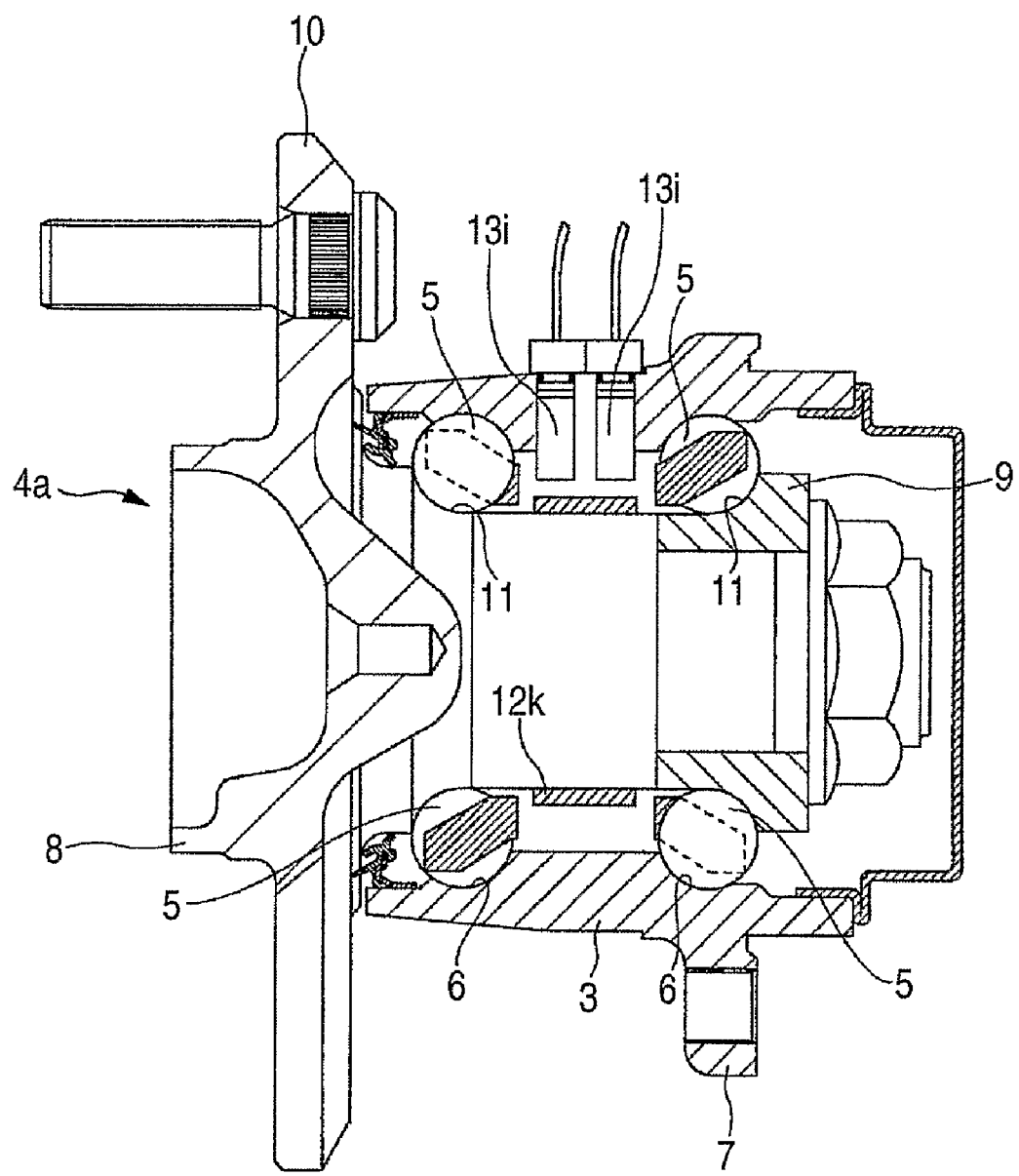
FIG. 32 is a sectional view showing an embodiment 17 of the present invention.
Figure 33:
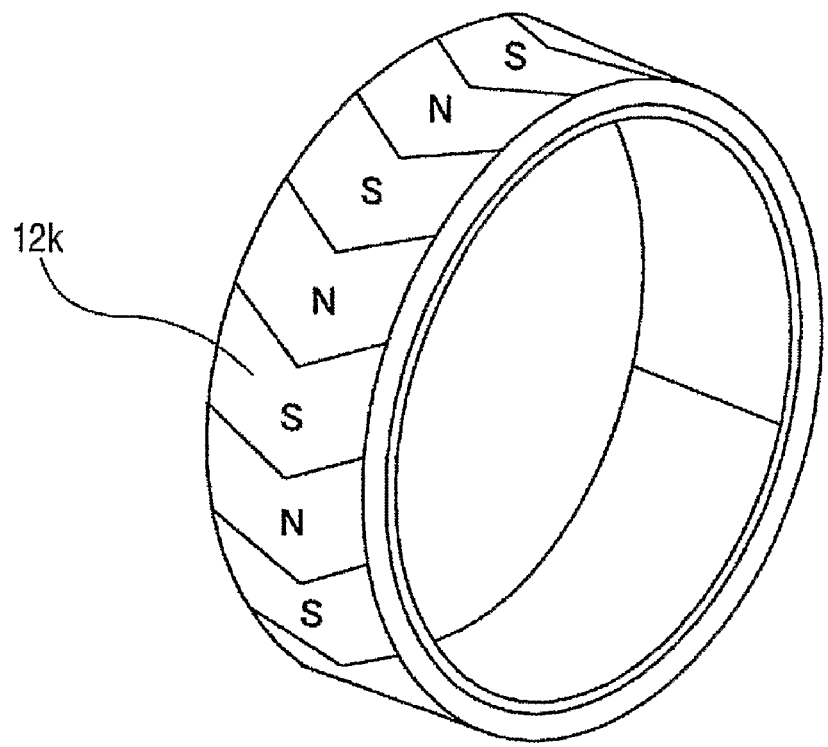
FIG. 33 is a perspective view of an encoder that is built in the embodiment 17.
Figure 34:
FIG. 34 is a development showing the same.
Figure 35:
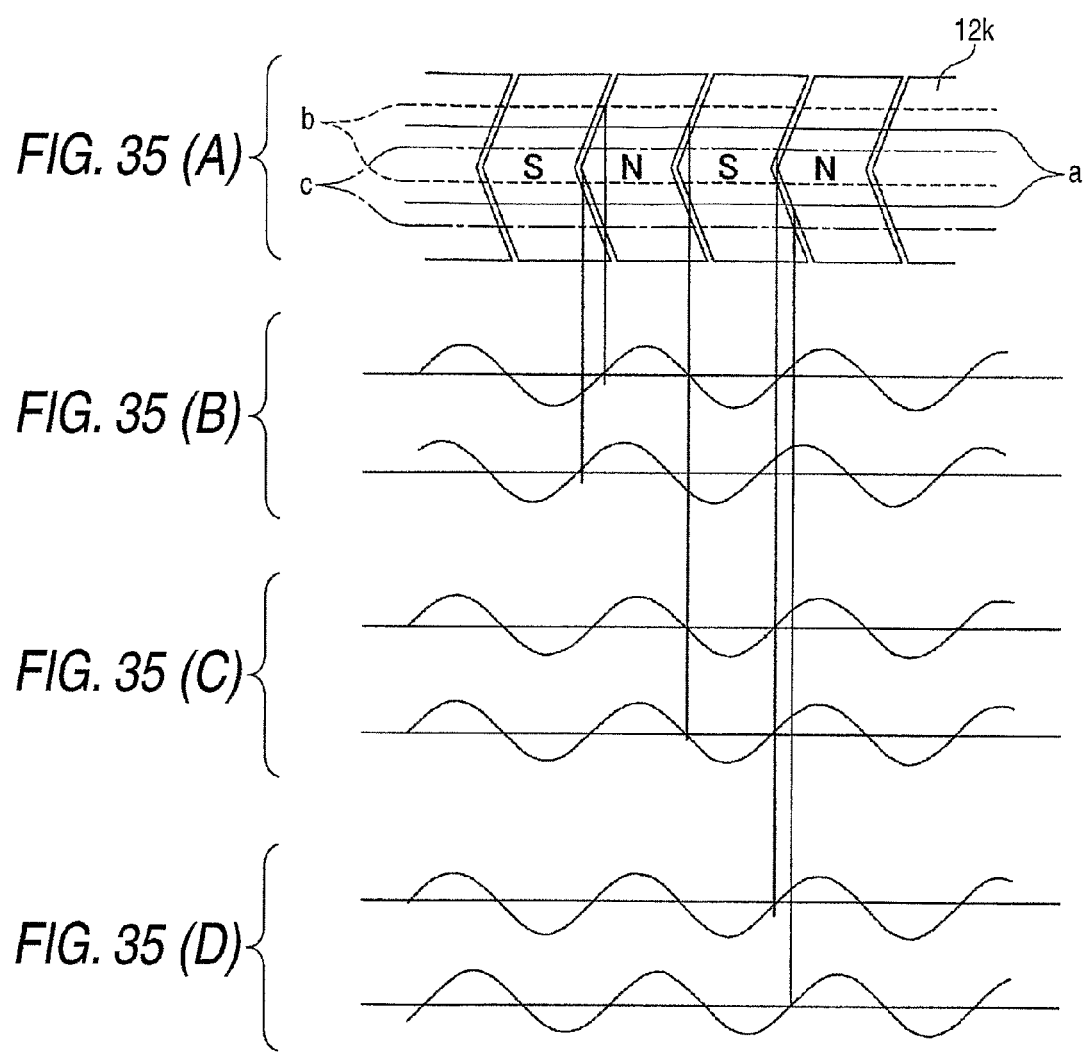
FIG. 35 are views showing a sensor output signal, which is changed together with a variation of an axial load, respectively.

FIG. 31 shows an embodiment 16 of the present invention. Like the structure of the present embodiment, in case the sensor 13d is provided to the middle portion of the outer ring 3a between the rolling elements 5a, 5a arranged in double rows in the axial direction, the effect attained by restricting the directions of the concave portion and the convex portion existing on the sensed surface of the encoder 12g is not so remarkable in contrast to the case where the encoder 12g is provided to the inner end portion of the encoder 12g in the axial direction. In this case, in order to enhance the duty ratio of the output signal of the sensor 13d even a little, it is preferable to restrict the directions. The restricting direction in this case will be discussed as follows.

First, in case the sensor is arranged over the cylindrical encoder 12g whose outer peripheral surface is used as the sensed surface and then the sensing portion of the sensor is opposed to the outer peripheral surface of the encoder 12g in the radial direction, the width of the concave portions in the circumferential direction out of the concave portions and the convex portions existing on the outer peripheral surface of the encoder 12g is increased toward the inner side (right side in FIG. 31) in the axial direction. Conversely, in case the sensor is arranged under the cylindrical encoder 12g and then the sensing portion of the sensor is opposed to the outer peripheral surface of the encoder 12g in the radial direction, the width of the concave portions in the circumferential direction out of the concave portions and the convex portions existing on the outer peripheral surface of the encoder 12g is increased toward the outer side (left side in FIG. 31) in the axial direction. With this structure, like the above embodiment 12 or embodiment 13, the change of the duty ratio of the output signal of the sensor can be amplified by reconciling the direction of the relative displacement between the encoder 12g and the sensor based on the momental load with the direction of the relative displacement between the encoder 12g and the sensor based on the axial load.

Here, suppose that the sensor is provided to the outer end portion of the wheel supporting rolling bearing unit in the axial direction, the structure in which the installing position and the inclination direction of respective portions are reversed totally is preferable from such an aspect that the change of the duty ratio of the output signal of the sensor can be enhanced by mating the direction of the relative displacement between the encoder and the sensor based on the momental load with the direction of the relative displacement between the encoder and the sensor based on the axial load. However, there is little likelihood of providing the sensor to the outer end portion of the wheel supporting rolling bearing unit in the axial direction because of the restriction of space, and thus such structure has little significance.

In contrast, the sensor is often provided to the middle portion of the wheel supporting rolling bearing unit in the axial direction between the rolling elements arranged in double rows. In such case, when the load in which the axial load and the momental load are mixed acts to the hub of the wheel supporting rolling bearing unit from the wheel, the encoder is displaced by the axial load in the lateral direction. Also, the hub 4b tends to rotate owing to the presence of the momental load. However, since the center of rotation is present in the position that corresponds to the installing position of the encoder 12g between the rolling elements 5a, 5a arranged in double rows, the vertical position of the encoder 12g is seldom varied by the momental load.

In this case, because the encoder 12g is displaced vertically to some extent by the influence of the change of the vertical load, the optimum fitting direction of the encoder 12g exists even when the encoder 12g is placed between the rolling elements 5a, 5a arranged in double rows. For example, it is the wheel located on the outer side in turning the car that the axial load acts to toward the inner side of the car body from the road surface, and the vertical load (radial load) is often increased by the influence of a centrifugal force at that time. Conversely, for example, it is the wheel located on the inner side in turning the car that the lateral load acts to toward the outer side of the car body from the road surface, and the vertical load is often decreased at that time.

In light of the above respects, in the above structure shown in FIG. 31, the sensing portion of the sensor 13d located on the lower side (road surface side) between the rolling elements 5a, 5a arranged in double rows is opposed to a lower end portion of the outer peripheral surface of the encoder 12g. For example, when the axial load directed to the outer side of the car body acts to the hub 4b from the road surface, the encoder 12g is displaced to the outer side of the car body (left side in FIG. 31) by this axial load. Since the vertical load is reduced at the same time, the distance (gap) between the sensing portion of the sensor 13d and the encoder 12g, though minute, is reduced. As described above, when this distance becomes smaller, a rate of the portion recognized as the convex portion, which is occupied in one period of the output signal of the sensor 13d, is increased. For this reason, in the case of the present embodiment, the encoder 12g is arranged to increase the width of the concave portion in the circumferential direction toward the outer side of the car body in such a manner that a rate of recognizing the convex portion is increased when the encoder 12g is displaced to the outer side of the car body.

Embodiment 17

FIGS. 32 to 35 show an embodiment 17 of the present invention. In the case of the present embodiment, like the embodiment 5 illustrated in FIGS. 11 to 13, an encoder 12k made of the permanent magnet is fitted/fixed onto the middle portion of the hub 4a. The portion magnetized as the N pole and equivalent to the first sensed portion and the portion magnetized as the S pole and equivalent to the second sensed portion are aligned alternately at an equal space on the outer peripheral surface of the encoder 12k serving as the sensed surface in the circumferential direction. In particular, in the case of the present embodiment, the boundary between the portions magnetized as the N pole and the S pole corresponding to the first and second sensed portions respectively is inclined by the same angle to the axial direction of the encoder 12k, and also respective inclined directions to the axial direction are set in the opposite direction with respect to the middle portion of the encoder 12k in the axial direction mutually. Therefore, the portion magnetized as the N pole and the portion magnetized as the S pole are formed like a "<" shape (dogleg shape) a center portion of which in the axial direction is mostly protruded (or depressed) in the circumferential direction.

Meanwhile, a pair of sensors 13i, 13i are arranged between the rolling elements 5, 5 positioned in the middle portion of the outer ring 3 in double rows in the axial direction, and sensing portions of these sensors 13i, 13i positioned in close vicinity to the outer peripheral surface of the encoder 12k to face thereto. The same positions in regarding to the circumferential direction of the encoder 12k are chosen as the positions in which the sensing portions of both sensors 13i, 13i oppose to the outer peripheral surface of the encoder 12k. In other words, the sensing portions of both sensors 13i, 13i are arranged on virtual straight lines that are parallel with the central axis of the outer ring 3. Also, the installing positions of respective members 12k, 13i, 13i are restricted such that the mostly protruded portions of the portion magnetized as the N pole and the portion magnetized as the S pole in the axial middle area along the circumferential direction (portions at which the inclination direction of the boundary is changed) are located just in the center position between the sensing portions of both sensors 13i, 13i in a state that the axial load does not act between the outer ring 3 and the hub 4a.

In the case of the present embodiment constructed as above, phases through which the output signals of both sensors 13i, 13i are changed are shifted when the axial load acts between the outer ring 3 and the hub 4a. In more detail, the sensing portions of both sensors 13i, 13i face to the portions on solid lines a, a in FIG. 35(A), i.e., the portions deviated from the mostly protruded portions by the same amount in the axial direction in a state that the axial load is not applied between the outer ring 3 and the hub 4a. Therefore, the phases of the output signals of both sensors 13i, 13i coincide with each other, as shown in FIG. 35(C). In contrast, the sensing portions of both sensors 13i, 13i face to the portions on broken lines b, b in FIG. 35(A), i.e., the portions that are deviated differently from the mostly protruded portions mutually in the axial direction when the axial load acts to the hub 4a, to which the encoder 12k is fixed, downward in FIG. 35(A). In this condition, the phases of the output signals of both sensors 13i, 13i are shifted, as shown in FIG. 35(B). In addition, the sensing portions of both sensors 13i, 13i face to the portions on chain lines c, c in FIG. 35(A), i.e., the portions that are deviated oppositely differently from the mostly protruded portions mutually in the axial direction when the axial load acts to the hub 4a, to which the encoder 12k is fixed, upward in FIG. 35(A). In this condition, the phases of the output signals of both sensors 13i, 13i are shifted, as shown in FIG. 35(D).

As described above, in the case of the present embodiment, the phases of the output signals of both sensors 13i, 13i are shifted in the direction that corresponds to the direction of the axial load applied between the outer ring 3 and the hub 4a. Also, an extent of the phase shift of the output signals of both sensors 13i, 13i in response to the axial load is increased as the axial load is increased. As a result, in the case of the present embodiment, the direction and the magnitude of the axial load acting between the outer ring 3 and the hub 4a can be derived respectively based on the presence or absence of the phase shift of the output signals of both sensors 13i, 13i and the direction and the magnitude of the phase shift if such shift is present.

Embodiment 18

Here, the invention in which the load in the axial direction is measured by using the encoder, in which the inclination direction of the boundary between the first sensed portion and the second sensed portion is changed on the way, and a pair of sensors, like the embodiment 17, can be embodied without restriction on the encoder made of the permanent magnet, as illustrated. In other words, even if the encoder in which, out of the first sensed portions and the second sensed portions, one sensed portions are shaped into the though holes or the concave holes or the convex portions and also the other sensed portions are formed as the neighboring through holes in the circumferential direction or the interim portions existing between the concave holes or the concave portions, and the appropriate sensor that is able to meet the property of this encoder are used together with each other, the axial load can be measured. Further, if the structure in which a pair of sensors being opposed to one side surface as the sensed surface of the encoder in the axial direction are arranged to deviate in the radial direction, and the first sensed portion and the second sensed portion arranged on this sensed surface are inclined to the radial direction of the encoder and also the inclination direction is changed in the middle is employed, the radial load can be measured.

Figure 36:
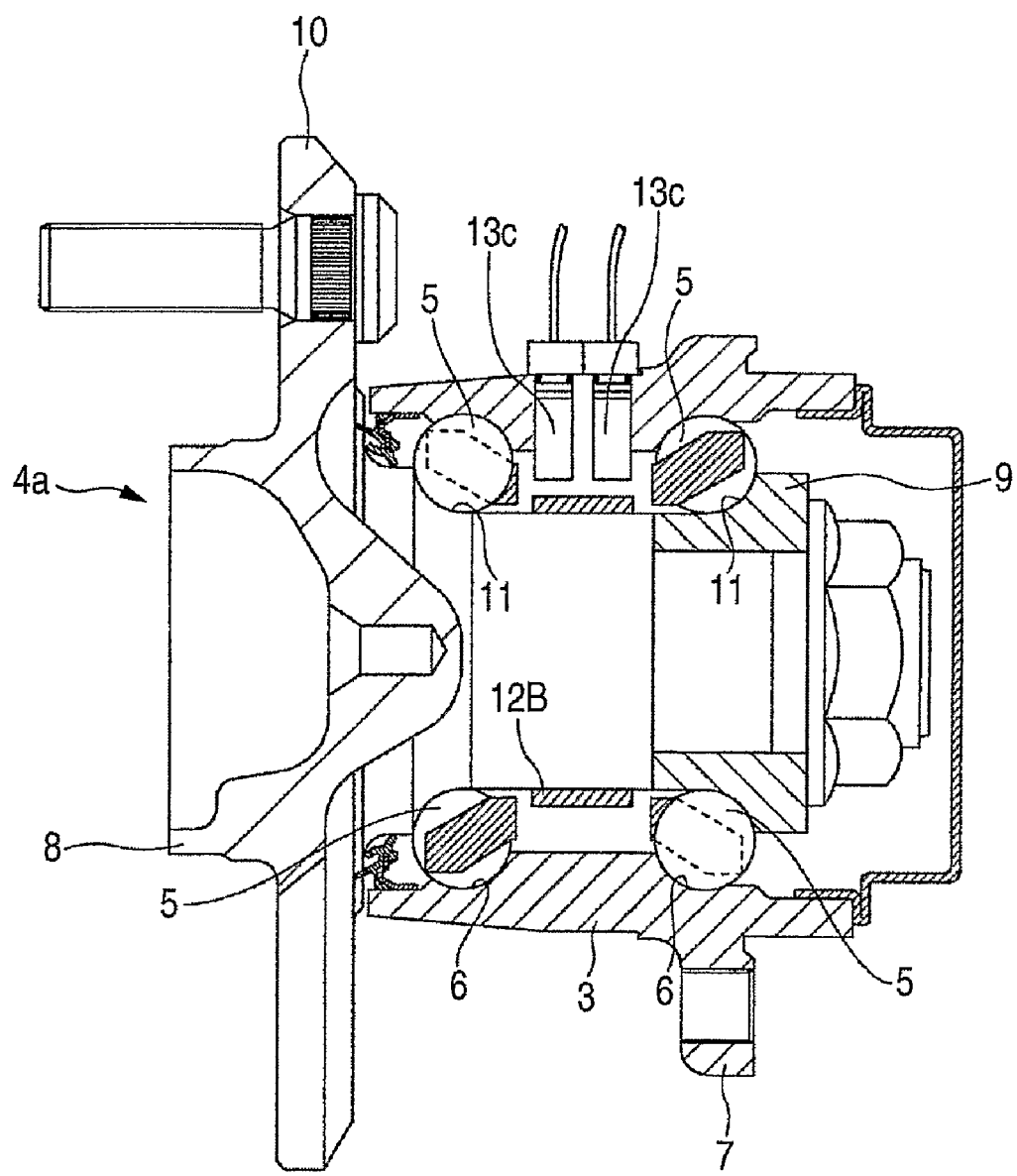
FIG. 36 is a sectional view showing an embodiment 18 of the present invention.
Figure 37:
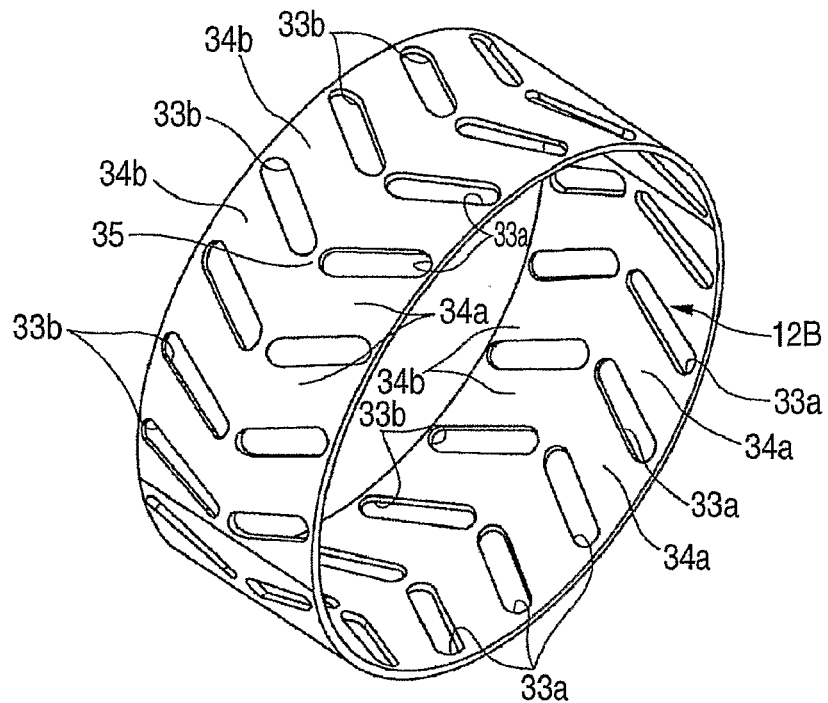
FIG. 37 is a perspective view of an encoder that is built in the embodiment 18.
Figure 38:
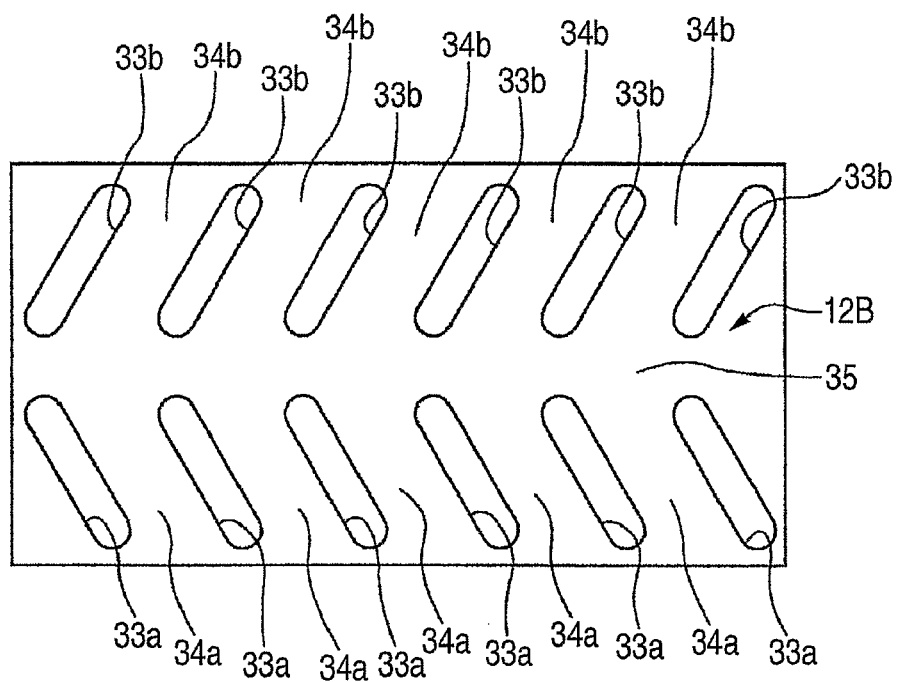
FIG. 38 is a development showing the same.

FIGS. 36 to 38 show an embodiment 18 of the present invention that is created in light of the above circumstances. In the case of the present embodiment, an encoder 12B made of the magnetic metal plate is fitted/fixed onto the middle portion of the hub 4a. Slit-like through holes 33a, 33b equivalent to the first sensed portions and column portion 34a, 34b equivalent to the second sensed portions are arranged alternately at an equal space on the outer peripheral surface of the encoder 12B as the sensed surface in the circumferential direction. In this case, pitches between the neighboring through holes 33a, 33b in the circumferential direction or pitches between the column portions 34a, 34b are made equal mutually, but widths of the through holes 33a, 33b in the circumferential direction and widths of the column portions 34a, 34b in the circumferential direction are not always set equal. Particularly, in the case of the present embodiment, the through holes 33a, 33b corresponding to the first sensed portions and the column portion 34a, 34b corresponding to the second sensed portions are inclined with respect to the axial direction of the encoder 12B by the same angle, and also the inclined angles to the axial direction are set oppositely mutually to the middle portion of the encoder 12B in the axial direction. In other words, in the encoder 12B of the present embodiment, the through holes 33a, 33a that are inclined to the axial direction in a predetermined direction by the same angle are formed on one half portion in the axial direction, and also the through holes 33b, 33b that are inclined in the opposite direction to the predetermined direction by the same angle are formed on the other half portion in the axial direction.

Meanwhile, a pair of sensors 13C, 13C are arranged on the middle portion of the outer ring 3 between the rolling elements 5, 5 arranged in double rows in the axial direction, and also sensing portions of both sensors 13C, 13C are positioned in close vicinity to the outer peripheral surface of the encoder 12B to face thereto. The same positions in regarding to the circumferential direction of the encoder 12B are chosen as the positions in which the sensing portions of both sensors 13C, 13C oppose to the outer peripheral surface of the encoder 12B. Also, installing positions of respective members 12B, 13C, 13C are restricted such that a rim portion 35 formed between the through holes 33a, 33b to continue on the overall circumference are located just in the center position between the sensing portions of both sensors 13C, 13C in a state that the axial load does not act between the outer ring 3 and the hub 4a.

In the case of the present embodiment constructed as above, when that the axial load acts between the outer ring 3 and the hub 4a, phases through which the output signals of both sensors 13C, 13C are changed are shifted, as in the case of the above embodiment 17. In more detail, the sensing portions of both sensors 13C, 13C face to the portions on solid lines a, a in FIG. 39(A), i.e., the portions deviated from the rim portion 35 by the same amount in the axial direction in a state that the axial load is not applied between the outer ring 3 and the hub 4a. Therefore, the phases of the output signals of both sensors 13C, 13C coincide with each other, as shown in FIG. 39(C). In contrast, the sensing portions of both sensors 13C, 13C face to the portions on broken lines b, b in FIG. 39(A), i.e., the portions that are deviated differently from the rim portion 35 mutually in the axial direction when the axial load acts to the hub 4a, to which the encoder 12B is fixed, downward in FIG. 39(A). In this condition, the phases of the output signals of both sensors 13C, 13C are shifted, as shown in FIG. 39(B). In addition, the sensing portions of both sensors 13C, 13C face to the portions on chain lines c, c in FIG. 39(A), i.e., the portions that are deviated oppositely differently from the rim portion 35 mutually in the axial direction when the axial load acts to the hub 4a, to which the encoder 12B is fixed, upward in FIG. 39(A). In this condition, the phases of the output signals of both sensors 13C, 13C are shifted, as shown in FIG. 39(D).

As described above, in the case of the present embodiment, like the case of the embodiment 17, the phases of the output signals of both sensors 13C, 13C are also shifted in the direction that corresponds to the direction of the axial load applied between the outer ring 3 and the hub 4a. Also, an extent of the phase shift of the output signals of both sensors 13C, 13C in response to the axial load is increased as the axial load is increased. As a result, in the case of the present embodiment, the direction and the magnitude of the axial load acting between the outer ring 3 and the hub 4a can also be derived respectively depending on the presence or absence of the phase shift of the output signals of both sensors 13C, 13C and the direction and the magnitude of the phase shift if such shift is present.

In all embodiments, it is preferable that an area (spot diameter) of the sensing portion of the sensor should be made smaller. This is because the change in pattern should be monitored with high precision to sense the change in pattern of the characteristic change of the sensed surface of the encoder. Also, the present invention is not particularly concerned about the structure of the sensor such as the magnetic type, the optical type, or the like. But the magnetic type sensor is preferable because such sensor can be easily obtained with necessary precision at a low cost. Also, when the magnetic type sensor is employed, any type such as the passive type, the active type, or the like can be employed. But the active type sensor can be preferably employed because such sensor can execute the measurement by a small spot diameter with good precision and can start the measurement from the low speed rotation. Further, if the active type sensor is employed, various types of magnetic sensors including the unipolar type, which switches the output (ON/OFF) in response to the change of the magnetic flux density passing through the sensing element, can be employed.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

This application claims priorities based on Japanese patent applications JP 2004-156014, filed on May 26, 2004, JP 2004-231369, filed on Aug. 6, 2004, and JP 2004-279755, filed on Sep. 27, 2004, the contents of which are incorporated herein by reference in its entirety.

The invention claimed is:

1. A rolling bearing unit comprising:
a rolling bearing unit including a stationary side raceway ring not rotated in a state of use, a rotary side raceway ring rotated in a state of use, and a plurality of rolling elements provided between a stationary side raceway and a rotary side raceway, which exist on mutually opposing peripheral surfaces of the stationary side raceway ring and the rotary side raceway ring; and
a load measuring unit including an encoder which is supported on a part of the rotary side raceway ring concentrically with the rotary side raceway ring and a characteristic of a sensed surface of which is changed alternately along a circumferential direction, at least one sensor which is supported on a non-rotated portion in a state that a sensing portion of the at least one sensor is opposed to the sensed surface and an output signal of which is changed in response to a change in characteristic of the sensed surface, and an arithmetic unit for calculating a load applied between the stationary side raceway ring and the rotary side raceway ring based on the output signal,
wherein a pitch or phase through which the characteristic of the sensed surface is changed along the circumferential direction is changed continuously in response to an acting direction of a to-be-sensed load, and the arithmetic unit has a function of calculating the load based on a pattern according to which the output signal of the at least one sensor is changed, and
wherein the to-be-sensed load is a radial load that acts between the stationary side raceway ring and the rotary side raceway ring in a radial direction, the sensed surface includes a side surface of the encoder in an axial direction, a first sensed portion and a second sensed portion having different characteristics mutually are aligned alternately on the sensed surface at an equal interval in the circumferential direction, and a width of the first sensed portion in the circumferential direction is widened toward an outer side in the radial direction and a width of the second sensed portion in the circumferential direction is widened toward an inner side in the radial direction.

2. A rolling bearing unit comprising:

a rolling bearing unit including a stationary side raceway ring not rotated in a state of use, a rotary side raceway ring rotated in a state of use, and a plurality of rolling elements provided between a stationary side raceway and a rotary side raceway, which exist on mutually opposing peripheral surfaces of the stationary side raceway ring and the rotary side raceway ring; and a load measuring unit including an encoder which is supported on a part of the rotary side raceway ring concentrically with the rotary side raceway ring and a characteristic of a sensed surface of which is changed alternately along a circumferential direction, at least one pair of sensors which is supported on a non-rotated portion in a state that a pair of sensing portions of the at least one pair of sensors is opposed to the sensed surface and output signals of which are changed in response to a change in characteristic of the sensed surface, and an arithmetic unit for calculating a load applied between the stationary side raceway ring and the rotary side raceway ring based on the output signals, wherein a phase through which the characteristic of the sensed surface is changed along the circumferential direction is changed continuously in response to an acting direction of a to-be-sensed load, and the arithmetic unit has a function of calculating the load based on a phase shift between the output signals, and wherein the to-be-sensed load is a radial load that acts between the stationary side raceway ring and the rotary side raceway ring in a radial direction, the sensed surface includes a side surface of the encoder in an axial direction, a first sensed portion and a second sensed portion having a different characteristic mutually are aligned alternately on the sensed surface at an equal interval in the circumferential direction, a boundary between the first sensed portion and the second sensed portion is inclined to a diameter direction of the encoder and also an inclined direction of the boundary to the diameter direction is set in an opposite direction with respect to a middle portion of the encoder in the diameter direction mutually, and the pair of sensing portions of the at least one pair of sensors is provided to positions separated in the diameter direction of the encoder to put the middle portion in the diameter direction therebetween.

3. The rolling bearing unit according to any one of claims 1 to 2, wherein the encoder is made of a permanent magnet, and one of the first sensed portion and the second sensed portion is an N pole and the other of the first sensed portion and the second sensed portion is an S pole.

4. The rolling bearing unit according to any one of claims 1 to 2, wherein one of the first sensed portion and the second sensed portion is a through hole or a concave hole, and the other of the first sensed portion and the second sensed portion is an interim portion located between neighboring through holes or concave holes in the circumferential direction.

5. The rolling bearing unit according to any one of claims 1 to 2, wherein one of the first sensed portion and the second sensed portion is a convex portion, and the other of the first sensed portion and the second sensed portion is a concave portion located between neighboring convex portions in the circumferential direction.

6. A rolling bearing unit comprising:

a rolling bearing unit including a stationary side raceway ring not rotated in a state of use a rotary side raceway ring rotated in a state of use, and a plurality of rolling elements provided between a stationary side and rotary side raceway, which exist on mutually opposing peripheral surfaces of the stationary side raceway ring and the rotary side raceway ring; and a load measuring unit including an encoder which is supported on a part of the rotary side raceway ring concentrically with the rotary side raceway ring and a characteristic of a sensed surface of which is changed alternately along a circumferential direction, at least one sensor which is supported on a non-rotated portion in a state that a sensing portion of the at least one sensor is opposed to the sensed surface and an output signal of which is changed in response to a change in characteristic of the sensed surface, and an arithmetic unit for calculating a load applied between the stationary side raceway ring and the rotary side raceway ring based on the output signal, wherein a pitch or phase through which the characteristic of the sensed surface changed along the circumferential direction is changed continuously in response to an action direction of a to-be-sensed load, and the arithmetic unit has a function of calculating the load based on a pattern according to which the output signal of the at least one sensor is changed, and wherein the to-be-sensed load is a radial load that acts between the stationary side raceway ring and the rotary side raceway ring in a radial direction, the sensed surface includes a side surface of the encoder in an axial direction, a plurality of sensed combination portions each including a pair of individualized portions having a characteristic different from other portions are aligned on the sensed surface at an equal interval in the circumferential direction, and an interval between the pair of individualized portions in the circumferential direction is changed continuously over all sensed combination portions in a same direction of the radial direction.

7. A rolling bearing unit comprising:

a rolling bearing unit including a stationary side raceway ring not rotated in a state of use, a rotary side raceway ring rotated in a state of use, and a plurality of rolling elements provided between a stationary side raceway and a rotary side raceway, which exist on mutually opposing peripheral surfaces of the stationary side raceway ring and the rotary side raceway ring; and a load measuring unit including an encoder which is supported on a part of the rotary side raceway ring concentrically with the rotary side raceway ring and a characteristic of a sensed surface of which is changed alternately along a circumferential direction, at least one sensor which is supported on a non-rotated portion in a state that a sensing portion of the at least one sensor is opposed to the sensed surface and an output signal of which is changed in response to a change in characteristic of the sensed surface, and an arithmetic unit for calculating a load applied between the stationary side raceway ring and the rotary side raceway ring based on the output signal, wherein a pitch or phase through which the characteristic of the sensed surface is changed along the circumferential direction is changed continuously in response to an acting direction of a to-be-sensed load and the arithmetic unit has a function of calculating the load based on a pattern according to which the output signal of the at least one sensor is changed, and wherein the to-be-sensed load is an axial load that acts between the stationary side raceway ring and the rotary side raceway ring in an axial direction, the sensed surface includes a peripheral surface of the encoder, a first sensed portion and a second sensed portion having different characteristics mutually are aligned alternately on the sensed surface at an equal interval in the circumferential direction, and a width of the first sensed portion in the circumferential direction is widened toward one end side in the axial direction and a width of the second sensed portion in the circumferential direction is widened toward the other end side in the axial direction.

8. A rolling bearing unit comprising:

a rolling bearing unit including a stationary side raceway ring not rotated in a state of use, a rotary side raceway ring rotated in a state of use, and a plurality of rolling elements provided between a stationary side raceway and a rotary side raceway, which exist on mutually opposing peripheral surfaces of the stationary side raceway ring and the rotary side raceway ring; and a load measuring unit including an encoder which is supported on a part of the rotary side raceway ring concentrically with the rotary side raceway ring and a characteristic of a sensed surface of which is changed alternately along a circumferential direction, at least one pair of sensors which is supported on a non-rotated portion in a state that a pair of sensing portions of the at least one pair of sensors are opposed to the sensed surface and output signals of which are changed in response to a change in characteristic of the sensed surface, and an arithmetic unit for calculating a load applied between the stationary side raceway ring and the rotary side raceway ring based on the output signals, wherein a phase through which the characteristic of the sensed surface is changed along the circumferential direction is changed continuously in response to an acting direction of a to-be-sensed load and the arithmetic unit has a function of calculating the load based on a phase shift between the output signals, and wherein the to-be-sensed load is an axial load that acts between the stationary side raceway ring and the rotary side raceway ring in an axial direction, the sensed surface includes a peripheral surface of the encoder, a first sensed portion and a second sensed portion having different characteristics mutually are aligned alternately on the sensed surface at an equal interval in the circumferential direction, a boundary between the first sensed portion and the second sensed portion is inclined to an axial direction of the encoder and also an inclined direction of the boundary to the axial direction is set in an opposite direction with respect to a middle portion of the encoder in the axial direction mutually, and the sensing portions of the at least one pair of sensors are provided to positions separated in the axial direction of the encoder to put the middle portion in the axial direction therebetween.

9. The rolling bearing unit according to any one of claims 7 and 8, wherein the encoder is made of a permanent magnet, and the first sensed portion is an N pole and the second sensed portion is an S pole.

10. The rolling bearing unit according to any one of claims 7 and 8, wherein the first sensed portion is a through hole or a concave hole, and the second sensed portion is an interim portion located between neighboring through holes or concave holes in the circumferential direction.

11. The rolling bearing unit according to any one of claims 7 and 8, wherein the first sensed portion is a convex portion, and the second sensed portion is a concave portion located between neighboring convex portions in the circumferential direction.

12. The rolling bearing unit according to claim 11, wherein the rolling bearing unit is a wheel supporting rolling bearing unit, the stationary side raceway ring is supported/fixed onto a suspension system in a state of use, and the rotary side raceway ring supports/fixes a wheel and rotates together with the wheel.

13. The rolling bearing unit according to claim 11, wherein the rolling bearing unit supports rotatably a spindle of a machine tool onto a housing, an outer ring as the stationary side raceway ring is fitted/fixed into the housing or a portion fixed to the housing in a state of use, and an inner ring as the rotary side raceway ring is fitted/fixed onto the spindle or a portion that rotates together with the spindle.

14. The rolling bearing unit according to claim 2 or 8, wherein the at least one of sensors comprises a plurality of pairs of sensors, each of the pairs of the sensors having said pair of sensing portions, and the pairs of sensing portions of the plurality of pairs of sensors oppose to equally-spaced positions on the sensed surface of the encoder along the circumferential direction.

15. The rolling bearing unit according to claim 2 or 8, wherein the at least one pair of sensors comprises three or more pairs of sensors, each of the pairs of the sensors having said pair of sensing portions, and the pairs of sensing portions of the pairs of sensors oppose to different positions on the sensed surface of the encoder in the circumferential direction respectively, and the arithmetic unit has a function of calculating a momental load applied between the stationary side raceway ring and the rotary side raceway ring.

16. A rolling bearing unit comprising:

a rolling bearing unit including a stationary side raceway ring not rotated in a state of use, a rotary side raceway ring rotated in a state of use, and a plurality of rolling elements provided between a stationary side raceway and a rotary side raceway, which exist on mutually opposing peripheral surfaces left stationary side raceway ring and the rotary side raceway ring; and a load measuring unit including an encoder which is supported on a part of the rotary side raceway ring concentrically with the rotary side raceway ring and a characteristic of a sensed surface of which is changed alternately along a circumferential direction, at least one sensor which is supported on a non-rotated portion in a state that a sensing portion of the at least one sensor is opposed to the sensed surface and an output signal of which is changed in response to a change in characteristic of the sensed surface, and an arithmetic unit for calculating a load applied between the stationary side raceway ring and the rotary side raceway ring based on the output signal, wherein a pitch or phase through which the characteristic of the sensed surface is changed along the circumferential direction is changed continuously in response to an acting direction of a to-be-sensed load, and the arithmetic unit has a function of calculating the load based on a pattern according to which the output signal of the at least one sensor is changed, and wherein the to-be-sensed load is an axial load that acts between the stationary side raceway ring and the rotary side raceway ring in an axial direction, the sensed surface includes a peripheral surface of the encoder, a plurality of sensed combination portions each including a pair of individualized portions having a characteristic different from other portions are aligned on the sensed surface at an equal interval in the circumferential direction, and an interval between the pair of individualized portions in the circumferential direction is changed continuously over all sensed combination portions in a same direction of the axial direction.

17. The rolling bearing unit according to any one of claims 1, 6, 7 and 16, wherein the at least one sensor comprises a plurality of sensors, each of the sensors having said sensing portion, and the sensing portions of the plurality of sensors oppose to equally-spaced positions on the sensed surface of the encoder along the circumferential direction.

18. The rolling bearing unit according to any one of claims 1, 2, 6, 7, 8 and 16, wherein the rolling bearing unit is a wheel supporting rolling bearing unit, the stationary side raceway ring is supported/fixed onto a suspension system in a state of use, and the rotary side raceway ring supports/fixes a wheel and rotates together with the wheel.

19. The rolling bearing unit according to any one of claims 1, 2, 6, 7, 8 and 16, wherein the rolling bearing unit supports rotatably a spindle of a machine tool onto a housing, an outer ring as the stationary side raceway ring is fitted/fixed into the housing or a portion fixed to the housing in a state of use, and an inner ring as the rotary side raceway ring is fitted/fixed onto the spindle or a portion that rotates together with the spindle.

20. The rolling bearing unit according to any one of claims 1, 6, 7 and 16, wherein the at least on sensor comprises three or more sensors, each of the sensors having said sensing portion, and the sensing portions of the sensors oppose to different positions on the sensed surface of the encoder in the circumferential direction respectively, and the arithmetic unit has a function of calculating a momental load applied between the stationary side raceway ring and the rotary side raceway ring by comparing the output signals of the sensors mutually.

* * * * *